US009584558B2

(12) United States Patent
Yoakum et al.

(10) Patent No.: US 9,584,558 B2
(45) Date of Patent: Feb. 28, 2017

(54) METHODS, APPARATUSES, AND COMPUTER-READABLE MEDIA FOR INITIATING AN APPLICATION FOR PARTICIPANTS OF A CONFERENCE

(75) Inventors: John H. Yoakum, Cary, NC (US); James R. Gutcher, Sammamish, WA (US); Alan E. Baratz, Los Altos Hills, CA (US)

(73) Assignee: Avaya Inc., Basking Ridge, NJ (US)

( * ) Notice: Subject to any disclaimer, the term of this patent is extended or adjusted under 35 U.S.C. 154(b) by 179 days.

(21) Appl. No.: 13/228,261

(22) Filed: Sep. 8, 2011

(65) Prior Publication Data
US 2013/0066974 A1    Mar. 14, 2013

(51) Int. Cl.
G06F 15/16 (2006.01)
H04L 29/06 (2006.01)

(52) U.S. Cl.
CPC ...... *H04L 65/1069* (2013.01); *H04L 65/1089* (2013.01); *H04L 65/1093* (2013.01); *H04L 65/4015* (2013.01); *H04L 65/4038* (2013.01)

(58) Field of Classification Search
CPC ............ H04L 12/1813; H04L 12/1818; H04L 12/1822; H04L 12/1827; H04L 29/06401;
(Continued)

(56) References Cited

U.S. PATENT DOCUMENTS 5,905,860 A  5/1999  Olsen et al.
6,430,567 B2  8/2002  Burridge
(Continued)

FOREIGN PATENT DOCUMENTS

EP  1898552 A2  3/2008
EP  2290524 A2  3/2011

OTHER PUBLICATIONS

Rosenberg, J., et al., "SIP: Session Initiation Protocol," Request for Comments (RFC) 3261, Internet Engineering Task Force (IETF) Network Working Group, Jun. 2002, http://tools.ietf.org/pdf/rfc3261.pdf, 270 pages.

(Continued)

*Primary Examiner* — Moustafa M Meky
*Assistant Examiner* — Kidest Mendaye
(74) *Attorney, Agent, or Firm* — Sheridan Ross P.C.

(57) ABSTRACT

Methods, apparatuses, and computer-readable media for initiating an application for participants of a conference are disclosed. In one embodiment, a method is provided for concurrently initiating an application for participants of a conference. A conference may be established including a plurality of participant user devices. A request may be received from a participant user device in the conference to assign an application to the conference after the conference has been established. The application may be assigned to the conference. In response to the assigning the application to the conference, initiation of the application for use on each of the plurality of participant user devices in the conference may be concurrently requested. Apparatuses and computer-readable media having instructions for providing the method are also disclosed. These may provide multiple application instances for different participants of the conference, and may result in increased collaboration and/or productivity for participants of a conference.

21 Claims, 32 Drawing Sheets

(58) Field of Classification Search
CPC ............... H04L 41/5093; H04L 63/065; H04L 65/1069; H04L 65/4015
See application file for complete search history.

(56) References Cited

U.S. PATENT DOCUMENTS

| | | |
|---|---|---|
| 7,421,469 B1 | 9/2008 | Liu et al. |
| 7,734,551 B1 | 6/2010 | Lindeman et al. |
| 7,774,281 B2 | 8/2010 | Okamoto et al. |
| 7,991,916 B2* | 8/2011 | Meek ................ G06F 9/541 709/204 |
| 8,041,642 B2 | 10/2011 | Lenard et al. |
| 8,407,289 B2 | 3/2013 | Chen et al. |
| 8,972,485 B1* | 3/2015 | French ............... G06F 9/5044 709/203 |
| 2001/0016872 A1* | 8/2001 | Kusuda ............... G06Q 30/02 709/205 |
| 2002/0198846 A1 | 12/2002 | Lao |
| 2003/0070072 A1 | 4/2003 | Nassiri |
| 2003/0167304 A1* | 9/2003 | Zhu .................. H04L 12/1827 709/205 |
| 2003/0167339 A1 | 9/2003 | Zhu et al. |
| 2005/0149340 A1 | 7/2005 | Murakami et al. |
| 2006/0021025 A1 | 1/2006 | Okamoto et al. |
| 2006/0117382 A1 | 6/2006 | Karabulut |
| 2008/0165391 A1* | 7/2008 | Chen ................ G06F 21/6218 358/453 |
| 2008/0168140 A1 | 7/2008 | Chen et al. |
| 2008/0262968 A1 | 10/2008 | Saxena et al. |
| 2010/0057703 A1* | 3/2010 | Brandt .................. G06F 21/10 707/E17.014 |
| 2010/0094630 A1 | 4/2010 | Yoakum |
| 2010/0174789 A1* | 7/2010 | Pena .................... G06F 9/54 709/206 |
| 2010/0299762 A1* | 11/2010 | Jouret .................. G06F 21/10 726/28 |
| 2011/0055329 A1* | 3/2011 | Abt, Jr. .............. G06F 17/3089 709/205 |
| 2011/0238759 A1* | 9/2011 | Spataro ............... G06Q 10/10 709/205 |
| 2011/0271129 A1 | 11/2011 | Flannagan et al. |
| 2012/0263168 A1 | 10/2012 | Petrack |
| 2012/0275349 A1* | 11/2012 | Boyer ................ H04L 12/1822 370/261 |
| 2013/0073619 A1 | 3/2013 | Tumuluri |
| 2014/0012903 A2* | 1/2014 | Shen .................... G06Q 10/10 709/204 |

OTHER PUBLICATIONS

Rosenberg, J., et al., "A Session Initiation Protocol (SIP) Event Package for Conference State," Request for Comments (RFC) 4575, Internet Engineering Task Force (IETF) Network Working Group, Aug. 2006, http://tools.ietf.org/pdf/rfc4575.pdf, 49 pages.

Johnston, A., et al., "Session Initiation Protocol (SIP) Call Control—Conferencing for User Agents," Request for Comments (RFC) 4579, Internet Engineering Task Force (IETF) Network Working Group, Aug. 2006, http://tools.ietf.org/pdf/rfc4579.pdf, 44 pages.

Rosenberg, J., "A Framework for Conferencing with the Session Initiation Protocol (SIP)". Cisco Systems. Network Working Group, Request for Comments (RFC) 4353. http://tools.ietf.org/pdf/rfc4353.pdf. Feb. 2006. 30 pages.

Fox, G. et al., "Global Multimedia Collaboration System," Concurrency and Computation: Practice and Experience, vol. 16 Issue 5, Mar. 26, 2004, 6 pages.

Mitchell, J. et al., "Agile Management of Dynamic Collaboration," Date Unknown, 29 pages.

Roach, A. B., "Session Initiated Protocol (SIP)—Specific Event Notification," Network Working Group, Request for Comments: 3265, Jun. 2002, 39 pages.

Non-final Office Action for U.S. Appl. No. 13/281,753 mailed Jun. 10, 2013, 9 pages.

Non-Final Office Action for U.S. Appl. No. 13/281,753, mailed Jan. 3, 2014, 10 pages.

Author Unknown, "Series T: Terminals for Telematic Services, Data Protocols for Multimedia Conferencing (T.128)," International Telecommunications Union (ITU-T), Jun. 2008, 204 pages.

Ohmori, T. et al., "Cooperative Control for Sharing Applications Based on Distributed Multiparty Desktop Conferencing System: MERMAID," Proceedings of the International Conference on Communications, Jun. 14, 1992, pp. 1069-1075.

European Search Report for European Patent Application No. 12183565.6, mailed Feb. 6, 2014, 7 pages.

Final Office Action for U.S. Appl. No. 13/281,753, mailed Aug. 15, 2014, 13 pages.

Non-Final Office Action for U.S. Appl. No. 13/281,753, mailed Oct. 7, 2015, 13 pages.

* cited by examiner

METHODS, APPARATUSES, AND COMPUTER-READABLE MEDIA FOR INITIATING AN APPLICATION FOR PARTICIPANTS OF A CONFERENCE

RELATED APPLICATIONS

This application is related to U.S. patent application Ser. No. 12/948,140 filed Nov. 17, 2010, entitled "METHOD AND SYSTEM FOR CONTROLLING AUDIO SIGNALS IN MULTIPLE CONCURRENT CONFERENCE CALLS," which is hereby incorporated herein by reference in its entirety.

This application is also related to U.S. patent application Ser. No. 12/971,380 filed Dec. 17, 2010, entitled "METHOD AND SYSTEM FOR GENERATING A COLLABORATION TIMELINE ILLUSTRATING APPLICATION ARTIFACTS IN CONTEXT," which is also hereby incorporated herein by reference in its entirety.

BACKGROUND

Field of the Disclosure

The technology of the disclosure relates to conferences, such as audio conferences, video conferences, and/or text chat conferences.

Technical Background

Conference calls allow two or more people to communicate. Typically, to setup a conference call among multiple participants, a meeting organizer schedules a meeting time, and reserves a conference bridge for availability during that time. The meeting organizer distributes the conference bridge phone number for the meeting. At the appropriate time, participants dial the conference bridge phone number to join the conference.

Though conference calls allow a plurality of participants to remotely communicate, participants of such calls may encounter various impediments to productivity. For example, if a conference participant wishes the participants of the conference to start a particular application to facilitate or be used during a call, problems may be encountered. For example, some conference participants may not have the application available on their personal computer. The conference participant may not have conceived of a need to use the application for the conference until participation in the conference began. Thus, there may have been insufficient notice for an information technology (IT) department to have installed the application on personal computers of the conference participants before the conference. Furthermore, the members of the conference may work for different organizations within a company or for different companies altogether. Thus there may be no common information technology (IT) department for providing the application for all the conference participants before the conference. Different conference participants may have different versions of a same application installed on their personal computer. The different application versions may be incompatible. Some members of a conference may not have a valid software license to execute the application.

One approach is for a conference participant to share their desktop with other participants of the conference. In this manner, the conference participant may present one instance of an application to the users of a conference. The conference participant may share her desktop in two ways: read-only, or with full access. If the shared desktop is shared read-only, other participants may not collaboratively manipulate the application. If the shared desktop is shared with full access, conference participants may also view or change other portions of her desktop. All conference participants may not have the same screen sharing application software and/or version on their personal computer. Firewalls may restrict screen sharing applications running on the personal computers of the participants from communicating with one another. Further, screen sharing only provides one instance of an application. Accordingly, screen sharing also does not address instances where greater collaboration or productivity could be achieved with multiple application instances for the participants of the conference.

SUMMARY OF THE DETAILED DESCRIPTION

Embodiments disclosed in the detailed description include methods, apparatuses, and computer-readable media for initiating an application for participants of a conference. In one embodiment, a method is provided for concurrently initiating an application for participants of a conference. The method includes establishing a conference that includes a plurality of participant user devices. The method further includes receiving a request from a participant user device in the conference to assign an application to the conference after the conference has been established. The method further includes assigning the application to the conference. The method further includes in response to the assigning the application to the conference, concurrently requesting initiation of the application for use on each of the plurality of participant user devices in the conference. This method may provide multiple application instances for different participants of the conference, and may also result in increased collaboration and/or productivity for the participants of a conference.

In another embodiment, an apparatus for concurrently initiating an application for participants of a conference is disclosed. In this embodiment, the apparatus includes a communications interface adapted to interface with a network. The apparatus further includes a control system coupled to the communications interface. The control system is configured to establish a conference that includes a plurality of participant user devices. The control system is further configured to receive a request from a participant user device in the conference to assign an application to the conference after the conference has been established. The control system is further configured to, in response to the assigning the application to the conference, concurrently request an initiation of the application for use on each of the plurality of participant user devices in the conference. As a non-limiting example, the apparatus may be a conference controller.

In another embodiment, a computer-readable medium is disclosed. The computer-readable medium has stored thereon computer executable instructions to cause an electronic device to implement a method for concurrently initiating an application for participants of a conference. The computer executable instructions include establishing, by a computing device comprising a processor, a conference that includes a plurality of participant user devices. The computer executable instructions further include receiving a request from a participant user device in the conference to assign an application to the conference after the conference has been established. The computer executable instructions further include assigning the application to the conference. The computer executable instructions further include in response to the assigning the application to the conference, concurrently requesting an initiation of the application for use on each of the plurality of participant user devices in the conference. As a non-limiting example, the computer-readable instructions may be computer-readable instructions for a conference controller.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
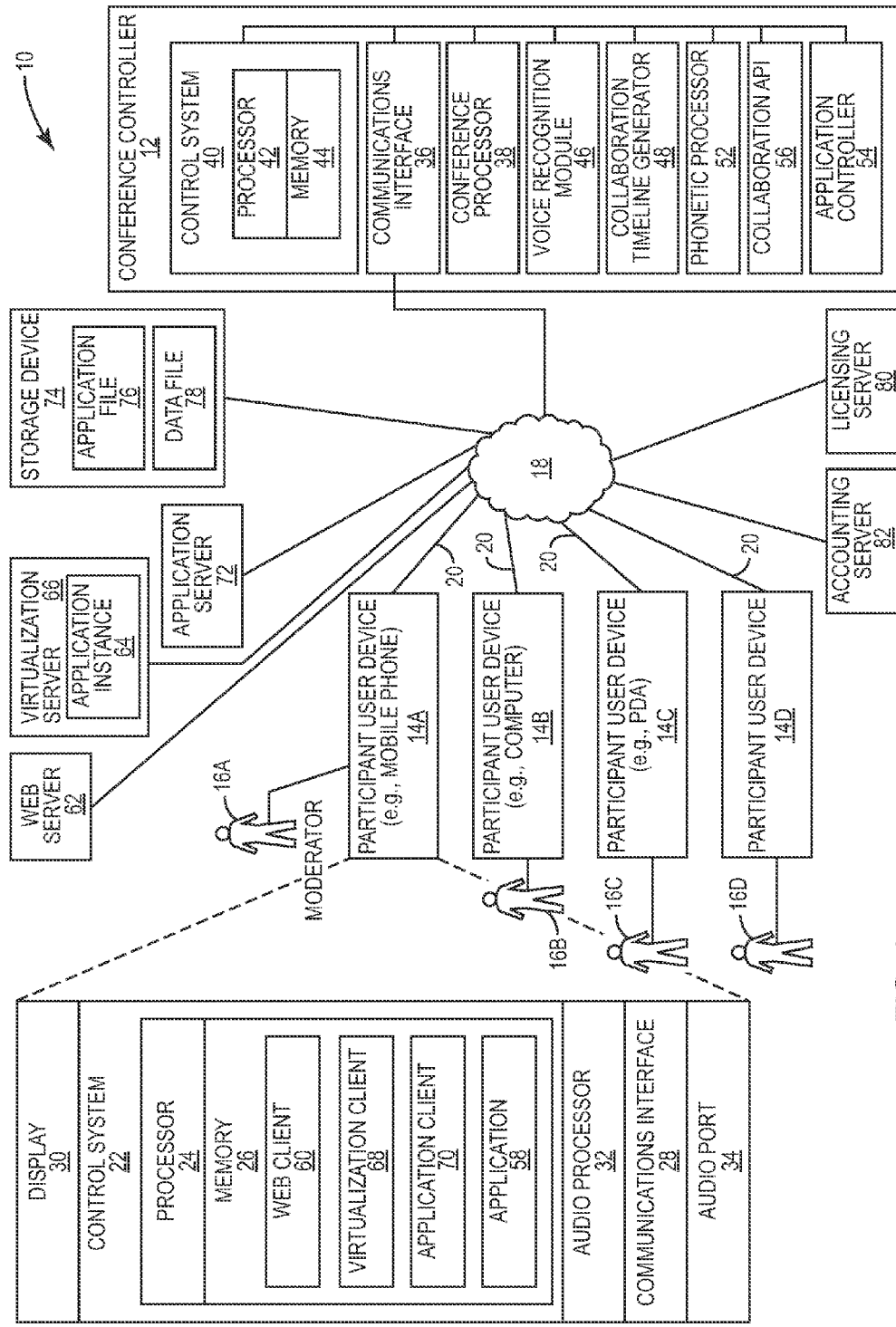
FIG. 1 is a block diagram illustrating a system in which embodiments disclosed herein may be practiced.

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed in the detailed description include methods, apparatuses, and computer-readable media for initiating an application for participants of a conference. In one embodiment, a method is provided for concurrently initiating an application for participants of a conference. The method includes establishing a conference that includes a plurality of participant user devices. The method further includes receiving a request from a participant user device in the conference to assign an application to the conference after the conference has been established. The method further includes assigning the application to the conference. The method further includes in response to the assigning the application to the conference, concurrently requesting initiation of the application for use on each of the plurality of participant user devices in the conference. As a non-limiting example, the method may be executed by a conference controller. This method may provide multiple application instances for different participants of the conference, and may also result in increased collaboration and/or productivity for the participants of a conference.

Before embodiments of methods, apparatuses, and computer-readable media for initiating an application for participants of a conference are further discussed, an exemplary system in which these functions may be provided is first discussed. In this regard, FIG. 1 is a block diagram illustrating a system 10 in which embodiments disclosed herein may be practiced. The system 10 includes a plurality of processing devices, such as a conference controller 12 and a plurality of participant user devices 14A-14D (generally, participant user device 14 or participant user devices 14). The participant user devices 14A-14D are used by corresponding participants 16A-16D (generally, participant 16 or participants 16) in a conference. A conference is a session in which real-time information is exchanged between participants without the need for separate and repeated message initiation triggering by a user. As non-limiting examples, the information exchanged may be audio information, video information, text chat information (for example, text messaging information), and/or a combination of any of these. For purposes of illustration, the embodiments described herein will be discussed in the context of a conference in which audio information is exchanged; however, the embodiments are not limited to the exchange of audio information.

In one embodiment, the participant user device 14 is a device capable of sending and receiving voice signals, and is capable of providing a conference application for display and/or control to a participant 16 as further described below. The participant user device 14 may comprise, for example, a computer; a personal digital assistant (PDA); a mobile phone, such as an Apple® iPhone®, a Google® Android® phone, or the like.

While for purposes of illustration embodiments are described herein in the context of a single participant user device 14 that is capable of both audio processing and conference application functionality, the embodiments are not limited to the use of a single processing device. One or more of the participants may participate in the conference with multiple processing devices, one of which (e.g., a telephone) handles and otherwise processes the audio aspects of the collaboration session, and another of which (e.g., a computer) handles the conference application aspects of the conference. In particular, a participant may use a conventional telephone to dial into a particular conference bridge, and may also direct a program on a computer, such as a web browser program, to a particular location, such as a particular website, in order to communicatively couple the computer to the conference. Of course, the participant user device 14 may also comprise a single processing device, such as a computer with a microphone and headset, or a smartphone, such that both the audio aspects and the conference application aspects of the embodiments described herein are handled by a single processing device.

The participant user devices 14 are communicatively coupled to the conference controller 12 and to one another via one or more networks 18. While only a single network 18 is illustrated in FIG. 1, it will be appreciated that communications may travel over multiple networks, such as a private local area network (LAN) in a participant's house, a public access network, an enterprise network, and so on, between the processing devices. The participant user devices 14A-14D may connect to the network 18 via any suitable network access paths 20, such as, for example, telephony technology, digital subscriber line technology, cable modem technology, cellular technology, Wi-Fi®, Bluetooth®, or the like. Data, such as control signals, audio signals, and the like, are typically carried over a network access path 20.

An exemplary participant user device 14, such as the participant user device 14A, includes a control system 22, which may include a processor 24 and a random access memory (RAM) 26, for controlling the overall operation of the participant user device 14A, and for executing collaboration applications as discussed in greater detail herein.

The participant user device 14A may also include a communications interface 28 that is adapted to communicate with the network 18 to facilitate communications between the participant user device 14A and external devices, such as the conference controller 12. The participant user device 14A also includes, or is coupled to, a display 30 upon which visual artifacts of conference applications may be rendered, and via which, with the aid of an input device such as a mouse, keyboard, or touch screen interface it is possible to interact with conference applications. The participant user device 14A also preferably includes a media processor, such as an audio processor 32, which generates a media stream that includes voice signals of the participant 16A and sends the media stream to the conference controller 12 continuously during the conference, or continuously for as long as the participant user device 14A detects that the participant 16A is speaking. The media stream is typically, although not necessarily, a digitized data stream that is generated by the audio processor 32 and represents the voice signals of the participant 16A. Over the course of a conference, the media stream of any particular participant 16 may be discontinuous, in that the media stream may be generated only when the participant 16 is actually speaking. As used herein, the phrase "incoming media stream" will refer to a media stream that is sent from a participant user device 14 to the conference controller 12, and the phrase "outgoing media stream" will refer to a media stream that is sent from the conference controller 12 to a participant user device 14.

For purposes of illustration only, the embodiments herein will be discussed in the context of a telephone conference, and the media stream is thus an audio stream. However, the embodiments herein are not limited to media streams that contain only audio streams, and are equally applicable to media streams that include video only, and to media streams that include both video and audio. The embodiments herein are also equally applicable to media streams that include text chat only, and to media streams that include any combination of audio, video, text chat, or other media.

The audio processor 32 receives outgoing media streams from the conference controller 12 and provides the outgoing media streams to an audio port 34 to which an audio device, such as a headset or speakers, may be coupled. Alternatively, if the participant user device 14A is a smartphone, for example, the audio device would be integral with the participant user device 14A.

Each of the participant user devices 14 establishes a conference with the conference controller 12. A conference may comprise any type of session or connection between a respective participant user device 14 and the conference controller 12 that enables the transmission of a media stream from the respective participant user device 14 to the conference controller 12, and the receipt of a media stream from the conference controller 12 to the respective participant user device 14, irrespective of the underlying physical infrastructure used to carry the media stream, or the particular protocol used to establish the communication session between the respective participant user device 14 and the conference controller 12. As non-limiting examples, suitable protocols may include, for example, Transport Control Protocol (TCP), User Datagram Protocol (UDP), Internet Protocol (IP), Hypertext Transport Protocol (HTTP), Session Initiation Protocol (SIP), ITU-T H.323, Media Gateway Control Protocol (MGCP), conventional public switched telephone network (PSTN) signaling, or the like. If implemented with support for the SIP protocol, for example, the conference controller 12 may be implemented as a user agent or a back-to-back user agent (B2BUA). A network access path 20, such as a wired or wireless access path, typically couples a participant user device 14 to the network 18. Certain embodiments disclosed herein are illustrated using SIP protocol signaling and novel extensions to SIP protocol signaling. However, embodiments disclosed herein are not limited to using the SIP protocol. The embodiments disclosed herein may be provided as an extension of any protocol, signaling, or messaging that may be used for collaboration and/or conferencing.

The conference controller 12 includes a communications interface 36 that is adapted to communicate with the communication network 18, and can comprise any suitable combination of hardware and/or software necessary to receive incoming media streams from the participant user devices 14, and to send outgoing media streams to the participant user devices 14.

The conference controller 12 also includes a conference processor 38 that may establish a conference between the participants 16. The conference processor 38 includes a mixer that enables the conference processor 38 to mix or combine multiple media streams and provide a mixed outgoing media stream to one or more participant user devices 14. During a conference, the conference processor 38 operates to generate a conference media stream that comprises the media streams of the participants 16 during a particular period of time during the collaboration session. The conference media stream may comprise a plurality of video streams of all the participants if the media stream is a video stream. The conference media stream may comprise a combination of a combined audio stream and a plurality of video streams where the media streams include both audio and video, for example.

The conference controller 12 also includes a control system 40, which may include a processor 42 and a memory 44, for controlling the overall operation of the conference controller 12. A voice recognition module 46 may enable one or more of the participants 16 to issue commands during a conference, such as a command issued by one of the participants 16 to initiate an application for all participants of the conference.

A collaboration timeline generator 48 represents functionality in the conference controller 12 that generates a collaboration timeline 50 which corresponds to a particular conference. A phonetic processor 52 may be used to generate a phonetic index that corresponds to the collaboration media stream where the media stream includes audio signals. A phonetic index enables a participant 16 or other entity to subsequently search the collaboration media stream for the occurrence of words or phrases that may have been spoken during the collaboration session. Phonetic indexes may be generated using phonetic indexing technology, which is available from, for example, Nexidia Inc., 3565 Piedmont Road NE, Building Two, Suite 400, Atlanta, Ga. 30305. Additional details relating to the generation of a particular phonetic index are detailed in U.S. Patent Application Publication No. 2010/0094630 A1 entitled "ASSOCIATING SOURCE INFORMATION WITH PHONETIC INDICES," which is hereby incorporated herein by reference in its entirety. Additional detail regarding collaboration timelines is discussed in greater detail in U.S. patent application Ser. No. 12/971,380 filed Dec. 17, 2010, entitled "METHOD AND SYSTEM FOR GENERATING A COLLABORATION TIMELINE ILLUSTRATING APPLICATION ARTIFACTS IN CONTEXT," which is hereby incorporated herein by reference in its entirety.

The conference controller 12 also includes an application controller 54, for concurrently initiating applications for a plurality of participant user devices 14 in a conference, such as participant user devices 14A-14D. In this regard, the application controller 54 may be configured to initiate an application for each participant of a conference. For example, the application controller 54 may initiate an application 58 for a participant user device 14 for each participant of a conference.

The application 58 may be provided to a participant 16 for a participant user device 14 in any one of several ways. In one embodiment, a web client 60 executing on the participant user device 14 may present an application 58 from a web server 62. Portions of the content of the application 58 may be generated on the web server 62, for example using Hypertext Markup Language (HTML), and/or Extensible Markup Language (XML). Further portions of the content of the application 58 may be generated on the web client 60, for example using client-executed instructions, such as Javascript. One of skill in the art will appreciate that, in accordance with this disclosure, the web server 62 may be a plurality of web servers 62.

In a further embodiment, the application controller 54 may initiate the application 58 by initiating an application instance 64 on a virtualization server 66. The application instance 64 executing on the virtualization server 66 may provide display and control of the application 58 to a conference participant 16 by streaming display and control of the application instance 64 to a virtualization client 68 executing on a participant user device 14 of the conference participant 16. This embodiment may be referred to as a cloud computing implementation of the application 58.

In one embodiment, the application controller 54 may initiate the application 58 by initiating an application client 70 on a participant user device 14 of the conference participant 16. The application client 70 may be configured to communicate with an application server 72. The application client 70 and application server 72 communicate to provide display and control of an application 58 to a conference participant 16 on the participant user device 14 of the conference participant 16. This embodiment may be referred to as a client-server implementation of the application 58. An application client may also be referred to as a client application.

In another embodiment, the application controller 54 may initiate the application 58 for execution directly on participant user device 14. The application 58 may be a standalone application. This embodiment may be referred to as a local application, a native application, or a standalone application.

The application 58 may be configured to communicate to the conference controller 12 using an application programming interface (API) of the conference controller 12. The application 58 may be configured to communicate with other applications 58 executing for other participants 16 of the conference using the application programming interface (API) of the conference controller 12.

Regardless of the method of implementation of the application 58, portions of the application 58 or the entire application 58 may not be available in memory of the participant user device 14 or and/or the servers 62, 66, 72. Accordingly, when the application controller 54 of the conference controller 12 initiates the application 58, those portions not already available in memory may be downloaded from a storage device 74 to memory of the participant user device 14 and/or the servers 62, 66, 72. Storage device 74 may provide remote storage or local storage. Accordingly, one or more application files 76 and/or one or more data files 78 may be downloaded to one or more of the participant user devices 14 and/or servers 62, 66, 72 to provide the application 58 for the conference participant 16 through the participant's participant user device 14. Thus, the downloaded application file 76 and/or data file 78 may provide portions or all of the application 58, including all or portions of a web client 60, web server 62, application instance 64, virtualization client 68, application client 70, and/or application server 72. The storage device 74 may be a network storage device. Those of skill in the art will appreciate that, in accordance with this disclosure, an application 58 may be implemented using a combination of any of the above methods. For example, portions of the application 58 may be provided from a web client 60 and web server 62, further portions of the application 58 may be provided from an application client 70 and application server 72, further portions of the application 58 may be provided from an application instance 64 executing on a virtualization server 66, and further portions of the application 58 may be provided as an application 58 executing directly on the participant user device 14. Any combination of such methods may provide the application 58 on the participant user device 14 for a conference participant 16. In one embodiment, the conference controller 12 may determine whether an application 58 is available on a participant user device 14 in the conference. In response to determining that the application 58 is not available on the participant user device 14 in the conference, the application 58 may be downloaded from the storage device 74 to the participant user device 14 in the conference.

The system 10 may also provide a licensing server 80. The licensing server 80 may license the application 58 for execution. For example, the licensing server 80 may license all or portions of web client 60, virtualization client 68, application client 70, web server 62, virtualization server 66, application instance 64, application server 72, and/or other portions of application 58 for execution. In one embodiment, the conference controller 12 may determine whether a participant user device 14 in the conference is licensed to execute the application 58. In response to determining that the participant user device is not licensed to execute the application 58, the conference controller 12 may request a license for the participant user device 14 in the conference for the duration of the conference from the licensing server 80. In other words, a license may be requested and provided that is valid only for the duration of the conference, and installed so as to allow the application 58 to execute for the duration of the conference.

In one embodiment, conference controller 12 may provide at least one license to execute the application 58 for at least one participant user device 14 in the conference for the duration of the conference. In a further embodiment, conference controller 12 may first determine whether each participant user device 14 in the conference is licensed to execute the application 58. In response to determining that at least one participant user device 14 is not licensed to execute the application 58, conference controller 12 may request at least one license for the at least one participant user device 14 in the conference for the duration of the conference. Thereafter, conference controller 12 may provide the at least one license to execute the application 58 for the at least one participant user device 14 in the conference for the duration of the conference to the at least one participant user device 14 in the conference.

The system 10 may also provide an accounting server 82. The accounting server 82 may be configured to receive at least one accounting record comprising application usage information for conference applications. The conference controller 12 may create the at least one accounting record comprising application usage information for conference applications. The conference controller 12 may transmit the accounting record to the accounting server 82.

Various usage information about the use of a conference application 58 may be provided in an accounting record. In this regard in one embodiment, the at least one accounting record may include a timestamp indicating when an application 58 or application instance 64 was started for at least one participant user device 14 in the conference. The at least one accounting record may include a timestamp indicating when the application 58 or application instance 64 of the application 58 was terminated for the at least one participant user device in the conference. The at least one accounting record may include a duration of usage of the application 58 on the at least one participant user device 14 in the conference. The at least one accounting record may include a duration of usage of the application 58 by at least one participant 14 in the conference. The at least one accounting record may include a duration of usage of the application 58 by all participants 14 in the conference. The at least one accounting record may include an amount of network data transmitted by the application 58 or application instance 64 of the application 58 started for the at least one participant user device 14 in the conference. The at least one accounting record may include an amount of network data received by the application 58 or the application instance 64 of the application 58 started for the at least one participant user device 14 in the conference. The at least one accounting record may include a number of messages transmitted by the application 58 or application instance 64 of the application 58 started for the at least one participant user device 14 in the conference. The at least one accounting record may include a number of messages received by an application 58 or application instance 64 of the application 58 started for the at least one participant user device 14 in the conference. The at least one accounting record may include a maximum number of concurrent participants 16 in the conference. The at least one accounting record may include a maximum number of concurrent applications 58 or application instances 64 of the application 58 that may be concurrently used for the plurality of participant user devices 14 in the conference. In one embodiment, the conference controller 12 may communicate with the accounting server 82 using a RADIUS protocol and/or a DIAMETER protocol. One of skill in the art will appreciate other protocols that may also be used in accordance with this disclosure.

As may be appreciated by one of skill in the art from the disclosures provided herein, any of the servers, devices, or other components herein disclosed may be provided as a plurality of those servers, devices, or components. Providing a plurality of the servers, devices, or other components may increase the capacity and/or redundancy of those servers, devices, or other components. Certain non-limiting examples are now provided. Conference controller 12 may be provided as a plurality of conference controllers 12. Any one participant user device 14A, 14B, 14C, and/or 14D may be provided as a plurality of participant user devices 14A, 14B, 14C, and/or 14D. Web server 62 may be provided as a plurality of web servers 62. Virtualization server 66 may be provided as a plurality of virtualization servers 66. Storage device 74 may be provided as a plurality of storage devices 74. Licensing server 80 may be provided as a plurality of licensing servers 80. Accounting server 82 may be provided as a plurality of accounting servers 82.

The application 58 or application instance 64 may provide any type of application for the conference participants 16 of a conference. As non-limiting examples, the application 58 or application instance 64 may be any of or any combination of a whiteboard application, a spreadsheet application, a text editing application, a slide presentation application, a database client application, a web browser application, an action item management application, a task management application, a personal agent application (for example, a personal agent application for gathering group information), a transcription application, a translation application, a polling application, a personal productivity application, a business application, an application for integrating business processes, and/or any type of business productivity application.

Embodiments described herein may be implemented in hardware, software, or a combination thereof. When implemented in software, the software comprises software instructions which may be executed on a processor, such as the processor 42, to cause the processing device, such as the conference controller 12, to implement the functionality described herein. Thus, embodiments may be implemented as a computer program product, such as a computer-usable or computer-readable medium having a computer-readable program code embodied therein. The computer-readable program code can include the software instructions for implementing the functionality of the embodiments described herein.

In one embodiment, the conference controller 12 offers a collaboration application programming interface (API) 56 which enables a conference application 58 to communicate with the conference controller 12. Each separate application instance of the application 58 may be configured to communicate to the conference controller 12 through an application programming interface (API) of the conference controller. The collaboration application programming interface (API) 56 may also be used as an interface for a participant user device 14 to communicate to other participant user devices 14 participating in a conference. In this regard, each separate application instance of the application 58 may be configured to communicate through the application programming interface (API) of the conference controller to each of the other application instances initiating and executing for other participant user devices in the conference. For example, in one embodiment, any of the above mentioned implementations of application 58 provided on a participant user device 14A for a conference participant 16A may use the collaboration application programming interface (API) 56 to communicate with other applications 58 executing on other participant user devices 14B, 14C, 14D for other participants 16B, 16C, 16D of a same conference through the collaboration application programming interface (API) of the conference controller 12.

Figure 2A:
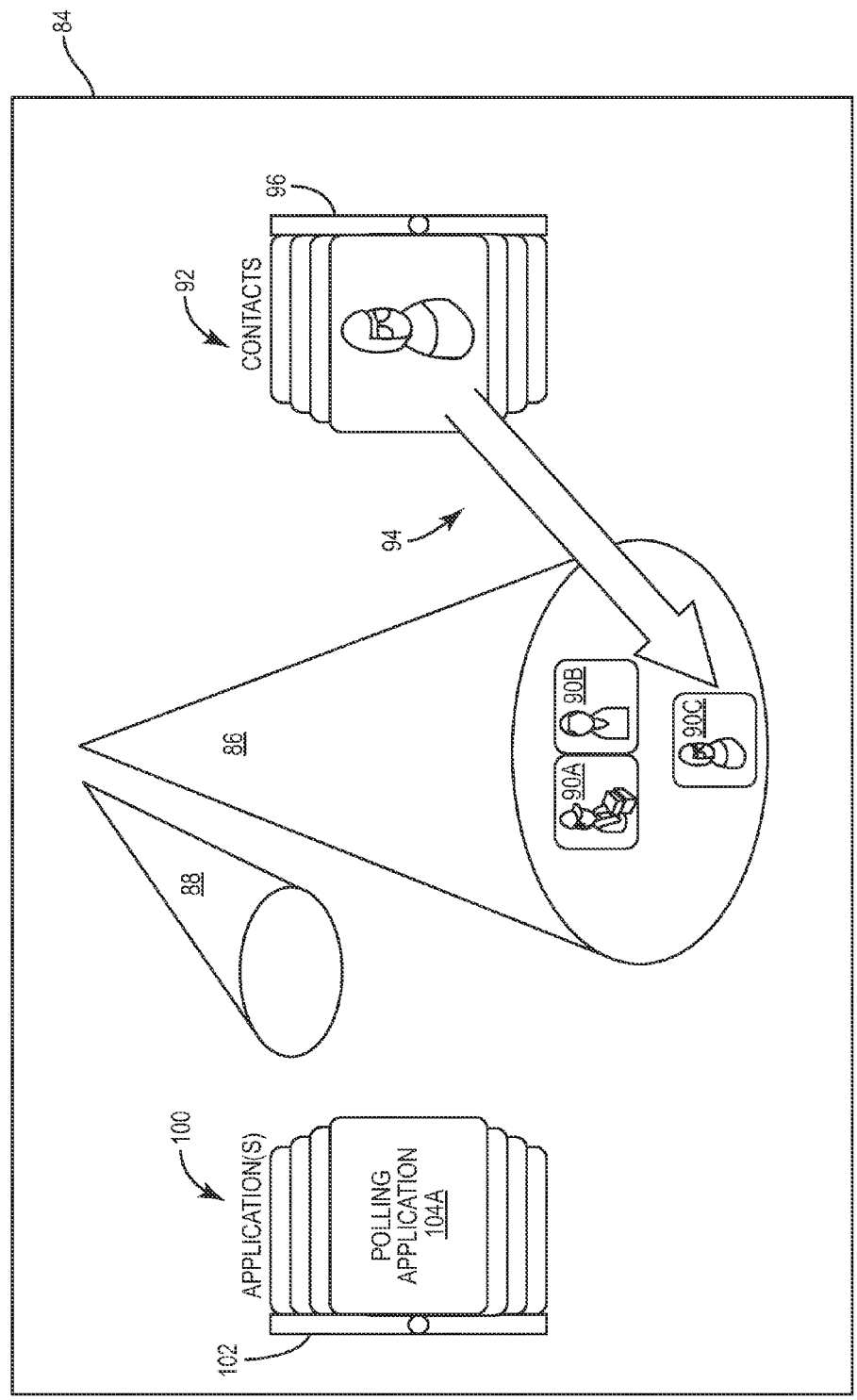
FIG. 2A illustrates an exemplary user interface according to one embodiment, and an exemplary user interface manipulation for establishing a conference on the graphical user interface.
Figure 2B:
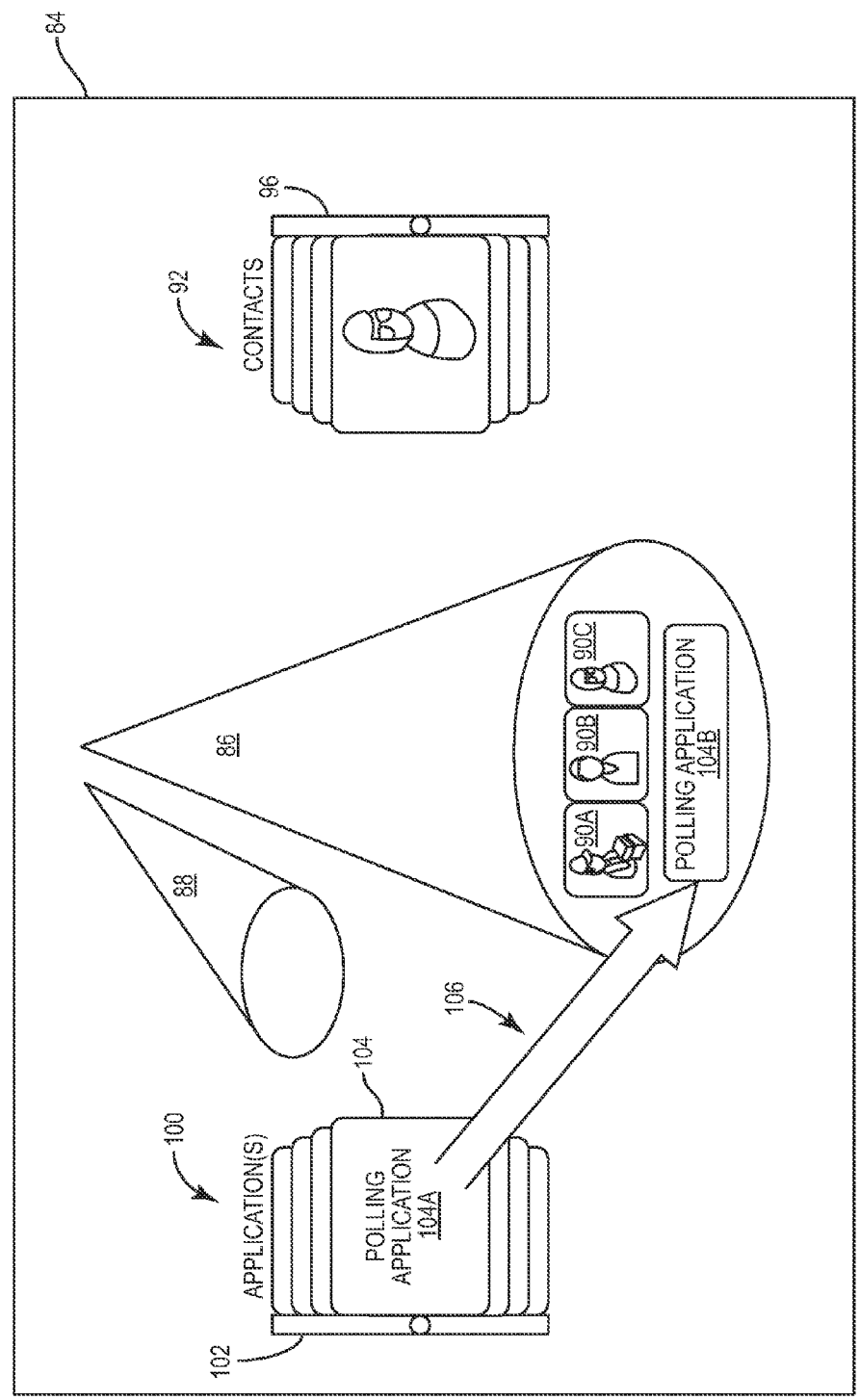
FIG. 2B illustrates the exemplary user interface illustrated in FIG. 2A, and an exemplary user interface manipulation to associate an application with the conference.

FIGS. 2A and 2B illustrate a user interface 84 according to one embodiment. User interface 84 may be provided for display and control of the conference on at least one of the participant user devices 14 (FIG. 1). The user interface 84 has a first defined area 86 and a second defined area 88. The defined areas 86, 88 are preferably visually distinguishable from one another, and from other portions of the user interface 84. In the embodiments illustrated in FIGS. 2A and 2B, the defined areas 86, 88 comprise images of light beams emanating from above (each of which may also be referred to as a spotlight), but it will be apparent that any visually distinguishing characteristic may be used to depict defined areas in accordance with the embodiments disclosed herein.

The first defined area 86 is associated with a first conference and the second defined area 88 is associated with a second conference. A first plurality of participant identifiers 90 (for example in FIG. 2A, participant identifiers 90A, 90B, and 90C) are displayed in association with the first defined area 86. In one embodiment, a user interface manipulation 94 may be used by a participant 16 (FIG. 1) to select a plurality of participant identifiers 90A-90C from a contact list 92. The user interface manipulation action 94 may include any of a variety of user interface manipulation actions. For example, as non-limiting examples, the user interface manipulation 94 may comprise selecting, clicking, moving, dragging, and/or dropping a participant identifier 90 for each of the participant identifiers 90A-90C from the contact list 92 to the first defined area 86. As each participant identifier 90 is dragged from the contact list 92 and dropped into the first defined area 86, the participant user device 14A may send a control signal to the conference processor 38 of the conference controller 12, requesting that the conference processor 38 initiate a conference with the participant user device 14 identified by the contact information associated with that participant identifier 90. Alternatively, the first conference may be a conference that was initiated by one of the other participants 14B-14D of the conference, and the user interface 84, at the initiation of the conference, may depict the first defined area 86 and request the controlling participant 16A join the first conference. The contact list 92 may provide a scrollbar (or scrollwheel) 96 for scrolling among a plurality of contacts in the contact list 92.

While the participant identifiers 90 are depicted as iconic images for purposes of illustration, the participant identifiers 90 may be still images or photographs of the corresponding participants 16, or may display actual video of the participants 16 by virtue of video data that is captured by the corresponding participant user devices 14 associated with the participants 16 and provided to the participant user device 14A of a controlling participant 16A.

In one embodiment, the controlling participant 16A may select one of the conferences associated with defined areas 86, 88 to be a selected conference. The selected conference may, for example, be the conference which the controlling participant 16A wishes to speak to at a given point in time. The audio signal of the controlling participant 16A may be provided to those participants 16 participating in the selected conference, but not provided to those in a non-selected conference. The controlling participant 16A may select the first conference (associated with first defined area 86) or the second conference (associated with second defined area 88) to be the selected conference for the controlling participant 16A as desired. In one embodiment, the controlling participant 16A may select a conference by selecting the first defined area 86 or the second defined area 88 that is associated with the conference which the controlling participant 16A seeks to make the selected conference.

The selection may be made via an input device such as a mouse, trackball, trackwheel, keyboard, or, if the display is a touch display, via touching the display. The selected conference may be distinguished from non-selected conference using any visual distinguishing characteristic. For example, the defined area for the selected conference may be positioned in a center potion of the display, displayed larger than non-selected conference(s), displayed with thicker lines than the non-selected conference(s), and/or displayed using a different color palette than the non-selected conference(s).

User interface 84 may also provide an application list 100 comprised of a plurality of applications 104 which may be associated with a conference. A scrollbar or scrollwheel 102 may be provided for scrolling among the plurality of applications 104 in the application list 100. For example, FIGS. 2A and 2B depict the application list 100 scrolled to a certain polling application 104, such that an icon 104A representing the polling application 104 is displayed.

As illustrated in FIG. 2B, a user interface manipulation 106 may be used to associate an application 104 with the conference. The user interface manipulation 106 may be provided by any of the above discussed methods. The user interface manipulation 106 to associate an application 104 with the conference may occur after a conference including a plurality of participant user devices 14 has been established. The user interface manipulation 106 is a request to assign the application 104 to the conference after the conference has been established. As a result of the user interface manipulation 106, a request message may be transmitted from a participant user device 14A in the conference to the conference controller 12. The transmitted request message is a request to assign the application 104 to the conference after the conference has been established. The conference controller 12 may assign the application 104 to the conference. In response to the assigning the application 104 to the conference, the conference controller 12 may concurrently request initiation of the application 104 for use on each of the plurality of participant user devices 14 in the conference (14A-14D, in this example).

Figure 3:
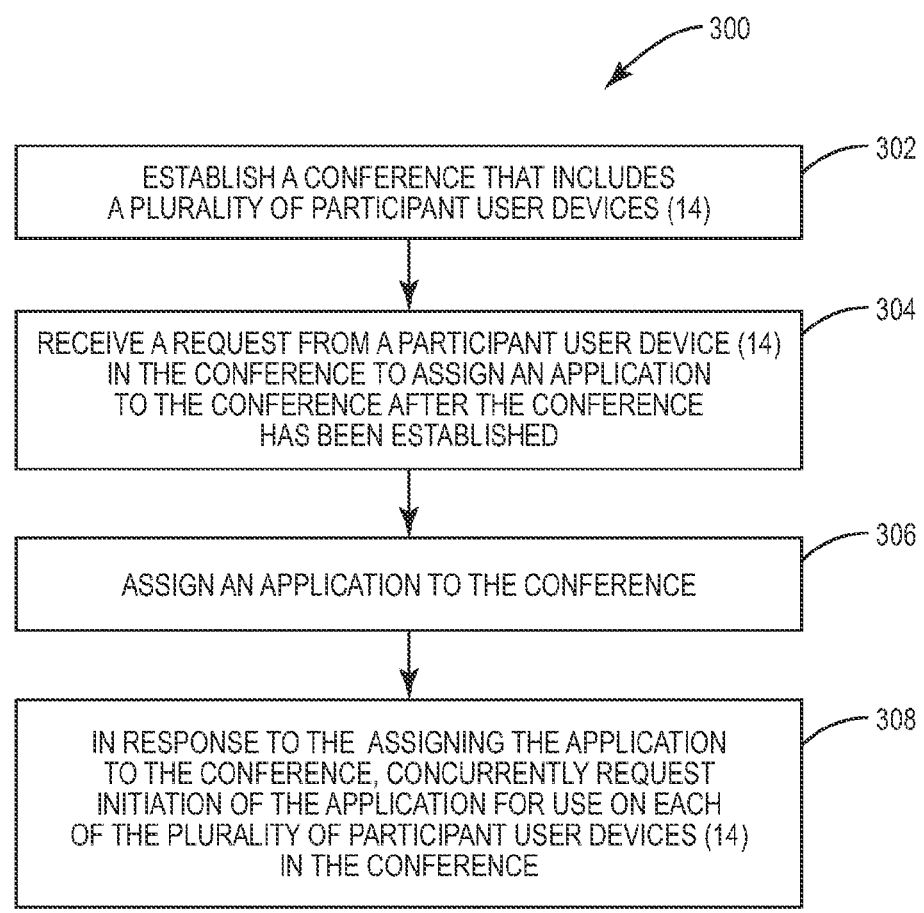
FIG. 3 is an exemplary flowchart illustrating an exemplary method for initiating an application for a plurality of participant user devices in a conference.

In this regard, FIG. 3 is a high-level flowchart illustrating a method 300 for concurrently initiating an application for participants of a conference. The method comprises establishing a conference that includes a plurality of participant user devices (step 302). The method further comprises receiving a request from a participant user device in the conference to assign an application to the conference after the conference has been established (step 304). The method further comprises assigning an application to the conference (step 306). The method further comprises in response to the assigning the application to the conference, concurrently requesting initiation of the application for use on each of the plurality of participant user devices in the conference (step 308). In one embodiment, a conference controller 12 may be configured to execute method 300.

FIGS. 4A-4D illustrate one such embodiment of the method 300, using Session Initiation Protocol (SIP) signaling. SIP is described in further detail in Internet Engineering Task Force (IETF) Request For Comments (RFC) document RFC3261, available at http://tools.ietf.org/pdf/rfc3261.pdf, which is hereby incorporated herein by reference in its entirety. The message flows hereafter described utilize both existing SIP syntax as well as novel extensions to SIP to provide the embodiments herein described. In this embodiment, SIP conference event package messaging is used to signal state changes of the conference. SIP conference event package messaging is described in further detail in IETF RFC4575, available at http://tools.ietf.org/pdf/rfc4575.pdf, which is hereby incorporated by reference herein in its entirety.

This embodiment also provides a novel SIP event package, the "conference-application" package. The conference-application package provides event signaling for conference applications in accordance with embodiments herein described. For example, the conference-application package provides signaling that a participant of a conference should start an application 58 assigned to the conference (e.g., "START-CONFERENCE-APPLICATION: APPLICATION A"). The conference-application package also provides signaling to allow a participant user device 14 to confirm that it is starting an application 58 (e.g., "APPLICATION A.STATE=STARTING").

The conference-application package also provides signaling to allow a participant user device 14 to notify a conference controller 12 that the requested application 58 has successfully started (e.g., "APPLICATION A.STATE=STARTED"). The conference-application package may also provide signaling to allow a participant user device 14 to notify a conference controller 12 that the application 58 cannot be started. For example, the conference-application package provides signaling to allow a participant user device 14 to notify a conference controller 12 that an application 58 was not started because all or a portion of the application 58 was not found for execution (e.g., "496 APPLICATION NOT FOUND"). By way of further example, the conference-application package provides signaling to allow a participant user device 14 to notify a conference controller 12 that an application 58 was not started because all or a portion of the application 58 is not licensed for execution (e.g., "497 APPLICATION LICENSE REQUIRED").

The conference-application package also provides signaling to allow a participant user device 14 in the conference to request termination of a conference application 58 associated with the conference (e.g., "TERMINATE-CONFERENCE-APPLICATION: APPLICATION A"). The conference-application package also provides signaling to allow the conference controller 12 to signal at least one participant user device 14 in the conference to terminate a conference application 58 associated with the conference (e.g., "TERMINATE-CONFERENCE-APPLICATION: APPLICATION A").

The conference-application package also provides signaling to allow a participant user device 14 to signal the conference controller 12 that it is terminating its instance(s) of the conference application 58 associated with the conference (e.g., "APPLICATION A.STATE: TERMINATING"). The conference-application package also provides signaling to allow a participant user device 14 to signal the conference controller 12 that it has terminated its instance(s) of the conference application 58 associated with the conference (e.g., "APPLICATION A.STATE: TERMINATED"). The conference-application package may use exemplary syntax provided above or alternative syntax for accomplishing the same steps. As a non-limiting example, the conference-application package may use an Extensible Markup Language (XML) syntax for accomplishing the same steps. Further conference application related signaling may also be provided in the conference-application package. Use of the novel conference-application package and its novel signaling message are hereinafter illustrated.

In accordance with the method 300 illustrated in FIG. 3, FIGS. 4A-4C provide one embodiment for concurrently initiating an application 58 for participants 16 of a conference. In this embodiment, steps 402-484 establish a conference that includes a plurality of participant user devices (in this embodiment, participant user devices 14A (CLIENT 1), 14B (CLIENT 2), and 14C (CLIENT 3). Steps 486-492 provide receiving a request from a participant user device 14 in the conference to assign an application to the conference after the conference has been established. In step 493, the conference controller 12 assigns the application 58 to the conference. In response to the assigning the application to the conference (in step 493), the conference controller 12 concurrently requests an initiation of the application 58 for use on each of the plurality of participant user devices 14 in the conference (see generally steps 494-528) and note specifically steps 494, 502, and 508. These steps are now discussed in further detail.

FIGS. 4A-4D provide an exemplary method 400 for concurrently initiating an application for participants of a conference. Method 400 comprises establishing a conference that includes a plurality of participant user devices. Method 400 also comprises receiving a request from a participant user device in the conference to assign an application to the conference after the conference has been established. Method 400 further comprises assigning an application to the conference. Message flow further comprises in response to the assigning of the application to the conference, concurrently requesting an initiation of the application for use on each of the plurality of participant user devices in the conference.

Figure 4A:
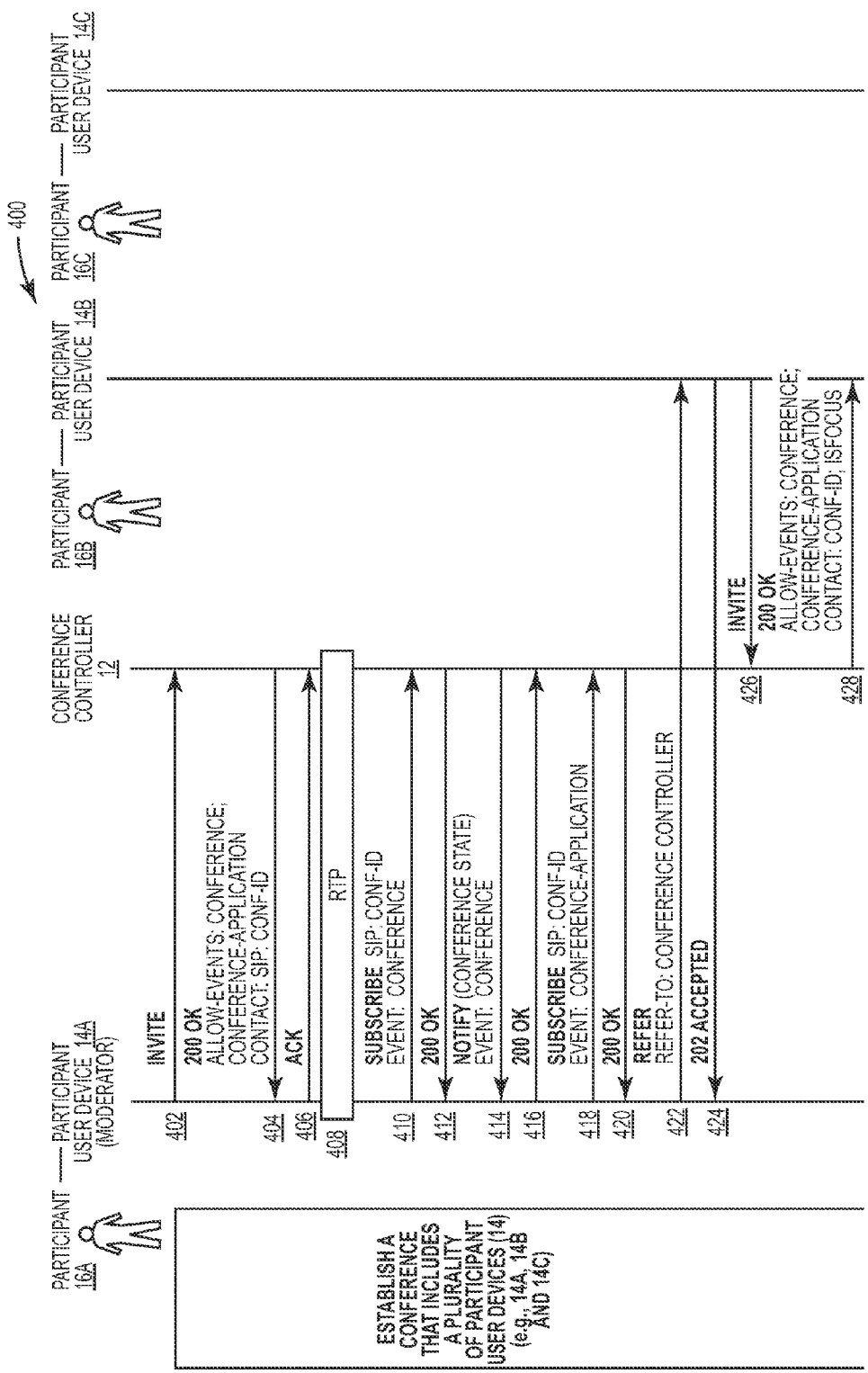
FIGS. 4A-4D are exemplary message flow diagrams illustrating a method 400 for establishing a conference that includes a plurality of participant user devices, for assigning an application to the conference, and for, in response to the assigning of the application to the conference, concurrently requesting an initiation of the application for use on each of the plurality of participant user devices in the conference.

Referring now to FIG. 4A, a participant user device 14A transmits a Session Initiation Protocol (SIP) INVITE for establishing a conference with the conference controller 12 (step 402). Conference controller 12 accepts the invite, indicating that it supports the "conference" event package as well as the "conference-application" event package (step 404). In step 404, conference controller 12 also provides (in the Contact header of the 200 OK message) a Uniform Resource Locator (URL) indicating a conference identifier for the conference. Participant user device 14A acknowledges the response from conference controller 12 (step 406). Thereafter, a bidirectional media stream is established between participant user device 14A and conference controller 12 (step 408). Participant user device 14A subscribes for "conference" events associated with the conference (steps 410, 412). Participant user device 14A also subscribes for "conference-application" events associated with the conference (steps 414, 416).

In continuing reference to FIG. 4A, participant user device 14A refers participant user device 14B to the conference (step 422). Participant user device 14B accepts the referral (step 424). In response to the referral, participant user device 14B transmits a SIP INVITE for requesting to join the conference to the conference controller 12 (step 426). Conference controller 12 accepts the request, and advertises to participant user device 14B that it supports "conference" and "conference-application" event packages (step 428). Participant user device 14B acknowledges the response from conference controller 12 (step 430).

Figure 4B:
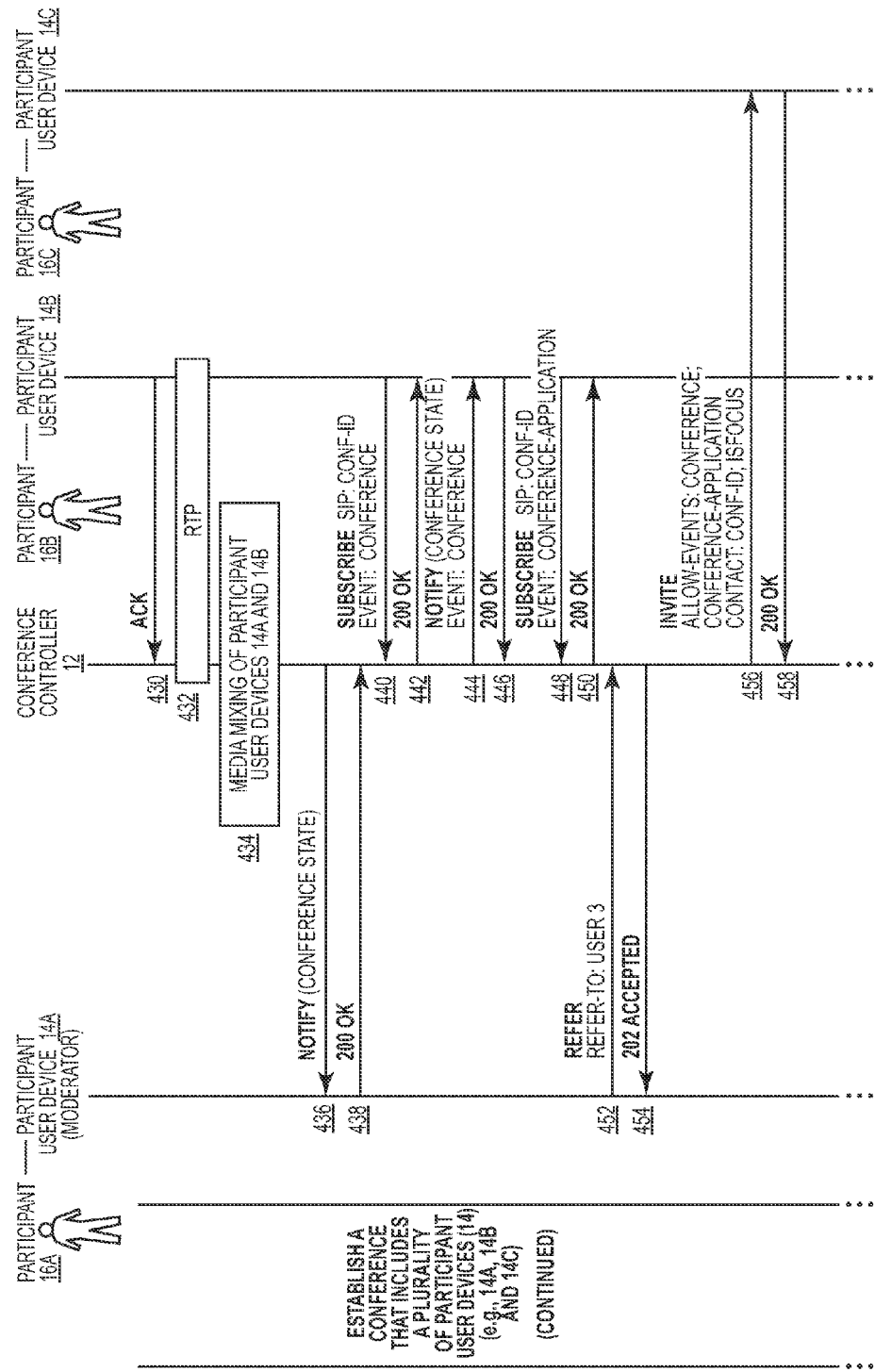

Referring now to FIG. 4B, in step 432, a bidirectional media stream is established between participant user device 14B and conference controller 12. Conference controller 12 begins media mixing of the media of participant user devices 14A and 14B, allowing participants 16A and 16B to communicate in the conference (step 434). When the state of the conference changes (for example, when a participant joins the conference or when a participant leaves the conference) that state change may be signaled to one or more participants of the conference. Step 436 illustrates a conference state change being notified from conference controller 12 to participant user device 14A to signal that a new participant user device (participant user device 14B) has joined the conference (step 436). The notification is acknowledged by participant user device 14A (step 438). Conference state change notifications may be sent by conference controller 12 to the participant user devices 14 of the conference whenever a participant user device 14 joins or leaves the conference.

Participant user device 14B may also subscribe to conference controller 12 to receive "conference" events (steps 440, 442). Upon joining an existing conference, the joining participant user device (e.g., 14B) may receive a notification from the conference controller regarding the existing state of the conference (steps 444, 446). Participant user device 14B may also subscribe to the conference controller 12 to receive "conference-application" events (steps 448, 450).

Figure 4C:
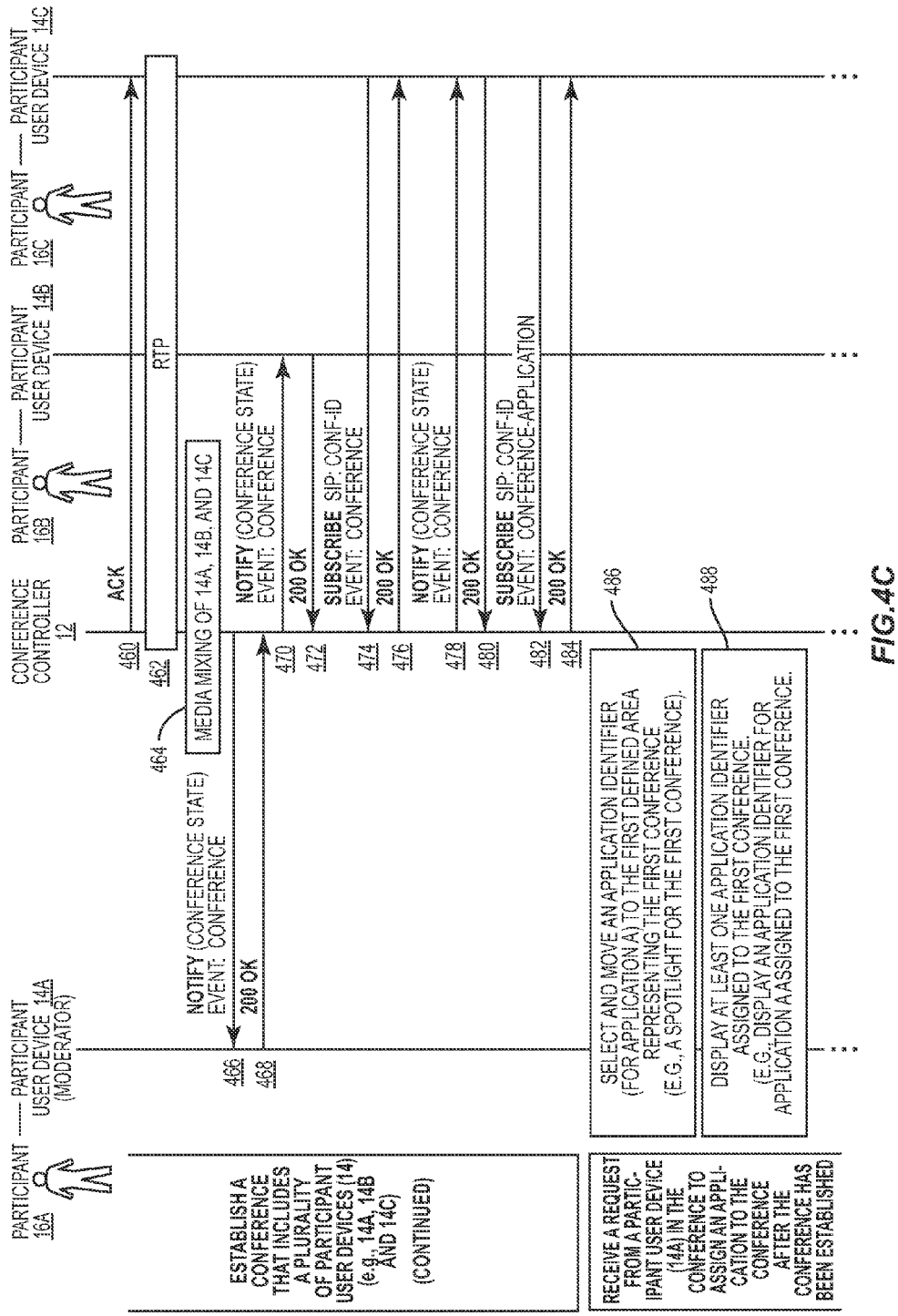

A participant 16A may also invite another participant 16C to the conference by referring conference controller 12 to call the other participant 16C. In this regard in step 452, participant 16A refers conference controller 12 to invite participant 16C to the conference, and conference controller 12 acknowledges the referral (step 454). In response to the referral, conference controller 12 invites participant 16C's participant user device 14C to join the conference (step 456). The invitation also advertises conference controller 12 support for "conference" and "conference-application" event packages, and that conference controller 12 is the focus for the conference (step 456). Participant user device 14C accepts the invitation to join the conference (step 458) and conference controller 12 acknowledges the response (step 460). Referring now to FIG. 4C, in step 462, a bidirectional media stream is established between participant user device 14C and conference controller 12. Conference controller 12 begins media mixing of the media of participant user devices 14A, 14B, and 14C, allowing participants 16A, 16B, and 16C to communicate with each other in the conference (step 464). At this point in the message flow, a conference has been established including a plurality of participant user devices 14A, 14B, and 14C among the plurality of participant user devices 14A, 14B, 14C. Additional participants 16 and participant user devices 14 may also be added to the conference using these or other signaling mechanisms.

Steps 422-434, discussed in greater detail above, illustrate one exemplary method of joining a participant to the conference. Steps 422-434 illustrate a participant user device 14A referring another participant user device 14B to the conference. In one embodiment, a participant user device 14A provides a conference URL for the conference to the participant user device 14B in message 422. Participant user device 14B may use the provided conference URL (for example, in message 426) to join the conference. In another embodiment, participant user device 14B may learn the conference URL and/or a time to join the conference via some other mechanism. As a non-limiting example, the conference URL and/or a time to join the conference may be received by participant user device 14B from an email, a Short Message Service (SMS) message, a voicemail, a text message, a web page, and/or by any other means. In any of these embodiments, the participant user device 14B may use the conference URL to join the conference without being referred to the conference by another participant (for example, without messages 422, 424).

Steps 452-464, discussed in greater detail above, illustrate another exemplary method of joining a participant to the conference. Steps 452-464 illustrate participant user device 14A referring conference controller 12 to invite participant user device 14C to join the conference.

One of skill in the art may appreciate that other methods of joining a participant to the conference may also be used in accordance with this disclosure. As a non-limiting example, the established conference may be an ad-hoc conference. An ad-hoc conference is established from a call between two participant user devices of two participants which does not initially include a conference bridge. One of the existing participants of the call may join a third participant (and the third participant's participant user device) to the call. The joining of the third participant may result in the call being converted to a conference involving a conference bridge, for example, conference controller 12.

As other non-limiting examples, certain exemplary methods of joining a participant to a conference are described in further detail in IETF RFC4579 entitled "Session Initiation Protocol (SIP) Call Control—Conferencing for User Agents," available at http://tools.ietf.org/pdf/rfc4579.pdf, which is hereby incorporated by reference herein in its entirety.

Conference controller 12 may notify existing participant user devices 14 in the conference (e.g., participant user devices 14A and 14B) that participant user device 14C has joined the conference (steps 466, 468, 470, 472). Participant user device 14C may also subscribe to the "conference" event package (steps 474, 476) and be notified of current conference state (steps 478, 480). Participant user device 14C may also subscribe to the "conference-application" event package (482, 484) so that it will receive corresponding events if an application 58 is later associated with the conference.

Figure 4D:
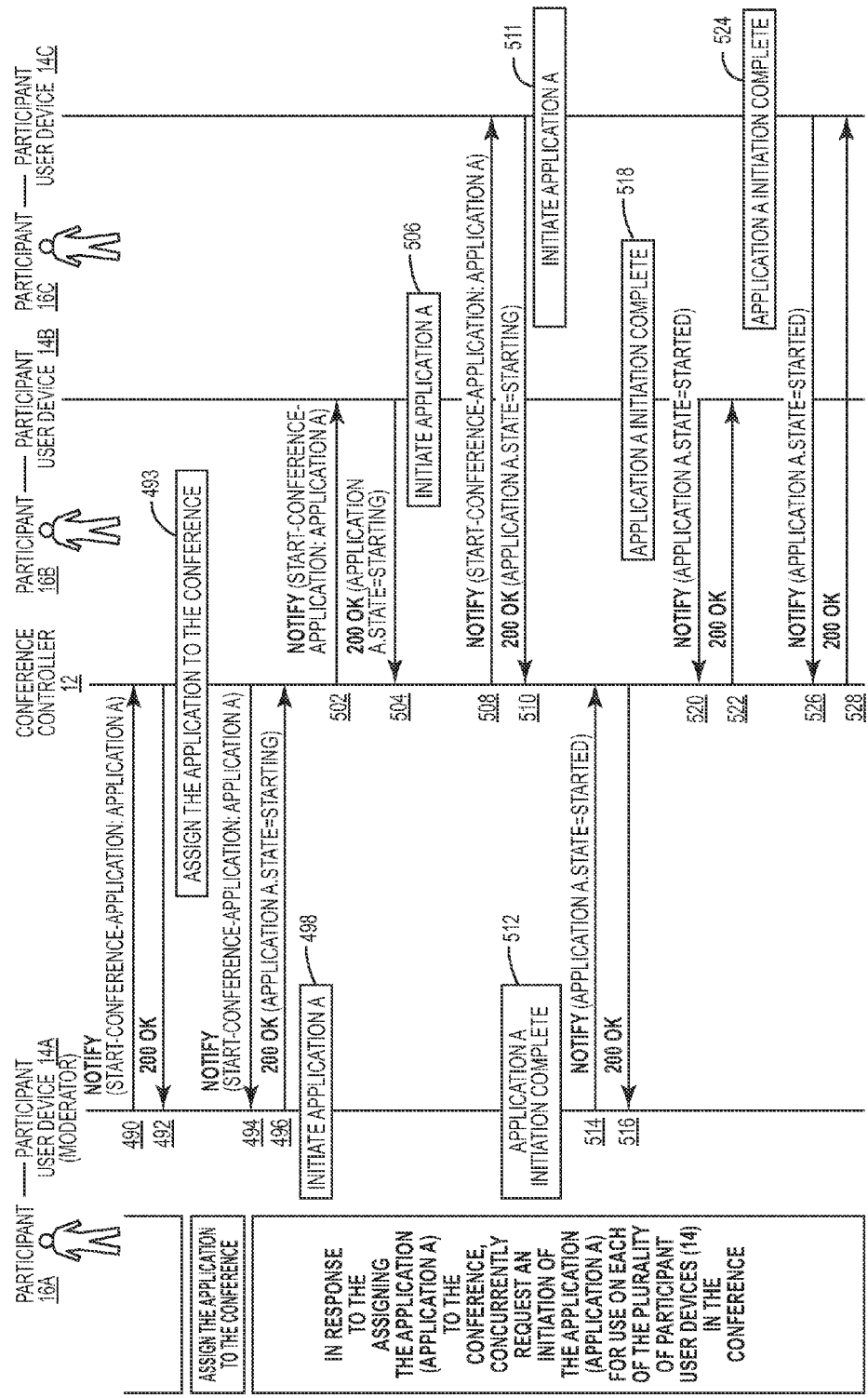

In continuing reference to FIG. 4C, conference controller 12 may receive a request from a participant user device 14 in the conference (in this embodiment, participant user device 14A) to assign an application 58 to the conference after the conference has been established. In this regard, in step 486, a participant 16A may manipulate the user interface 84 of a participant user device 14A to select and move an application identifier (e.g., Application A) to a first defined area 86 of the user interface representing the first conference. In one embodiment, this user interface manipulation 94 occurs as illustrated in FIG. 2B. As depicted in FIG. 2B, the first defined area 86 representing the first conference may depict an image of a "spotlight," or any other image. The participant user device 14A may display the at least one application identifier assigned to the first conference (step 488), for example, at least partially within the first defined area 86 associated with the first conference. Referring now to FIG. 4D, in response to the user interface manipulation 94, participant user device 14A may transmit a request to conference controller 12 to assign the application 58 to the conference after the conference has been established (step 490). Conference controller 12 may acknowledge the request (step 492). Conference controller 12 assigns the application 58 to the conference (step 493). In response to the assigning the application 58 to the conference, conference controller 12 may concurrently request initiation of the application 58 for use on each of the plurality of participant user devices 14 in the conference (steps 494, 502, and 508). This allows the participants 16A, 16B, 16C to experience shorter initiation times for initiating the application 58 than would otherwise be experienced.

As used herein, the term "concurrently" is defined as "at least partially overlapping in time." In other words, at least some portions of the transactions for initiating the application on each of the plurality of participant user devices 14A, 14B, 14C occur at least in part during a same period of time. In the embodiment illustrated in FIG. 4D, the steps for initiating the application for participant user device 14A comprise steps 494, 496, 498, 512, 514, and 516. The steps for initiating the application for participant user device 14B comprise steps 502, 504, 506, 518, 520, and 522. The steps for initiating the application for participant user device 14C comprise steps 508, 510, 511, 524, 526, and 528. As illustrated in FIG. 4D, portions of each of these transactions overlap in time. Thus, these transactions are concurrently initiated.

These messages are now described in additional detail. In the embodiment depicted in FIG. 4D, conference controller 12 notifies each of the participant user devices 14A, 14B, 14C to associate and start an application ("APPLICATION A") with the conference (steps 494, 502, and 508). Each of the participant user devices 14A, 14B, 14C positively acknowledges this notification (496, 504, 510) and begin initiating the application (steps 498, 506, and 511). When application initiation for a particular user device 14 completes (steps 512, 518, and 524), the participant user device 14 notifies conference controller 12 that the application (Application A) has started (steps 514, 520, and 526), and conference controller 12 acknowledges the notifications of the participant user devices 14 (steps 516, 522, and 528).

Applications for use on each of the plurality of participant user devices 14 in the conference may be provided a variety of ways. Accordingly, the concurrently requesting an initiation of an application for use on each of the plurality of participant user devices 14 in the conference may be provided in any one of numerous embodiments. All manners of initiating an application for the participants 16 of the conference are intended to be encompassed herein. In this regard, several embodiments for initiating a conference application for the plurality of participant user devices 14 in a conference are hereafter discussed. Such embodiments are provided by FIGS. 5A-5B, 6A-6C, 7A-7B, 8A-8B, and 9A-9B. Each of these embodiments is in accordance with steps 490-528 of FIG. 4D, and each of these embodiments may be understood as providing embodiments for steps 304-308 of FIG. 3.

Figure 5A:
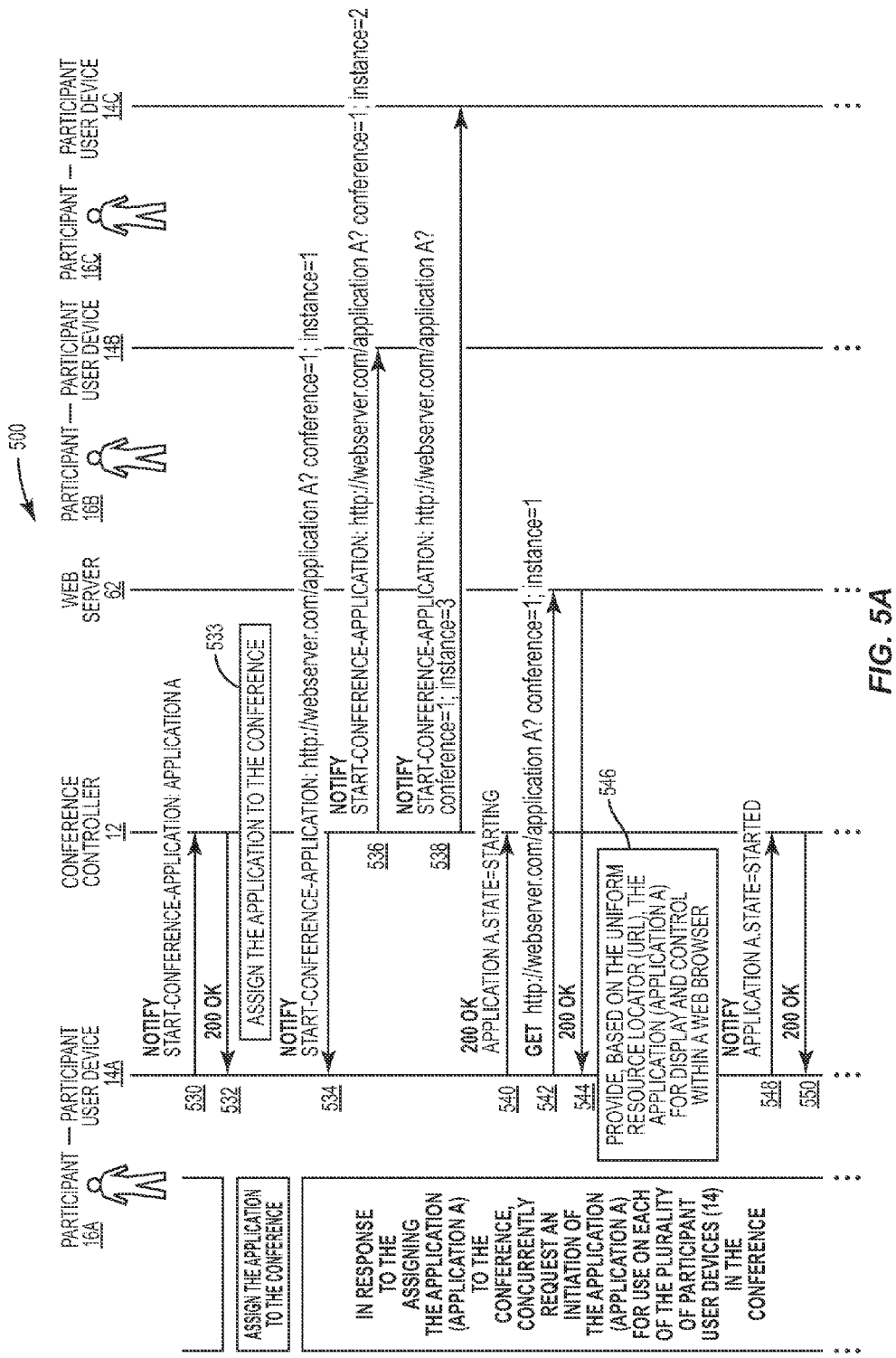
FIGS. 5A and 5B are exemplary message flow diagrams illustrating an exemplary method 500 according to FIG. 4D, in which the concurrently requesting initiation of the application for use on each of the plurality of participant user devices in the conference comprises concurrently transmitting a uniform resource locator (URL) for initiating the application to each of the plurality of participant user devices in the conference.
Figure 5B:
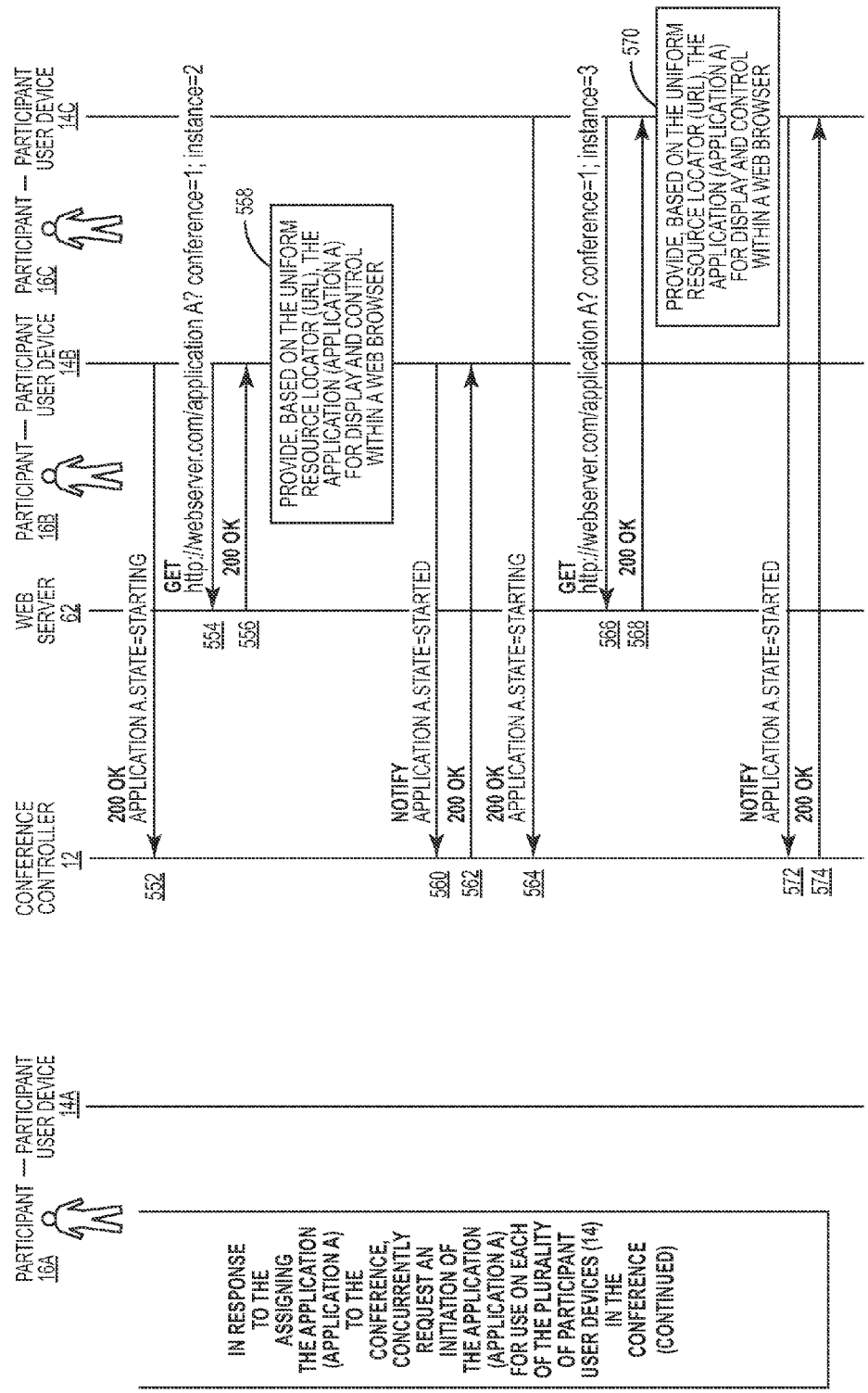

In one embodiment, concurrently requesting initiation of the application for use on each of the plurality of participant user devices 14 in the conference (FIG. 3, step 308) may comprise concurrently transmitting a uniform resource locator (URL) for initiating the application to each of the plurality of participant user devices 14 in the conference. FIGS. 5A and 5B provide a method 500 illustrating one such embodiment. In this embodiment, participant user device 14A transmits a request to conference controller 12 to assign an application (Application A) to the conference after the conference has been established (step 530), which is acknowledged by conference controller 12 (step 532). Conference controller 12 assigns the application to the conference (step 533). In response to the assigning the application to the conference, conference controller 12 may concurrently transmit a uniform resource locator (URL) for initiation of the application (Application A) to each of the plurality of participant user devices 14 in the conference (steps 534, 536, and 538).

As a non-limiting example, exemplary URLs are depicted in FIGS. 5A and 5B, such as "http://webserver.com/applicationA?conference=1;instance=1", "http://webserver.com/applicationA?conference=1;instance=2", and "http://webserver.com/applicationA?conference=1;instance=3". However, the URL for initiating the application may be provided using any syntax for providing a URL. The URL(s) depicted in FIGS. 5A and 5B identify the domain name or address of a web server 62 (e.g., "webserver.com") and may also provide syntax ("applicationA") identifying the particular application (Application A) that should be provided by the web server 62 to the web client 60 of the participant user devices 14A, 14B, 14C. As also depicted in FIGS. 5A and 5B, the URL(s) may also identify a conference identifier (e.g., "conference=1") representing the particular conference with which the application is to be associated. As further depicted in FIGS. 5A and 5B, the URL(s) may also identify an instance identifier (e.g., "instance=1") which may be used by the web server 62 to uniquely identify which participant user device 14A, 14B, 14C a particular instance of the application should be associated. As depicted in FIG. 5A, the request 530 from the participant user device 14A to conference controller 12 may or may not provide the URL which is thereafter transmitted to the participant user devices 14A, 14B, and 14C in steps 534, 536, and 538.

With continuing reference to FIG. 5A, participant user device 14A may acknowledge the notification (step 540). Thereafter, the participant user device 14A may transmit a request to the web server 62 to receive the application or a presentation of the application for display and control in a web client 60 of the participant user device 14A (step 542). Web server 62 may respond with one or more messages to provide the application to participant user device 14A (one or more steps 544). Thereafter, the participant user device 14A provides, based on the uniform resource locator (URL), the application (Application A) for display and control within a web client/browser 60 of the participant user device 14A (step 546). Other notifications previously discussed with regards to FIG. 4D may also be transmitted and acknowledged (e.g., steps 548 and 550). Referring now to FIG. 5B, transactions for participant user device 14B (steps 552, 554, 556, 558, 560, and 562) and participant user device 14C (steps 564, 566, 568, 570, 572, and 574) may proceed similarly to those discussed above for participant user device 14A.

In one embodiment, web server 62 may be provided as a plurality of web servers 72. In this embodiment, different web clients 60 may or may not communicate with different web servers 62 among the plurality of web servers 62. The plurality of web servers 62 may provide an increased capacity and/or redundancy for communications with web clients 60.

Figure 6A:
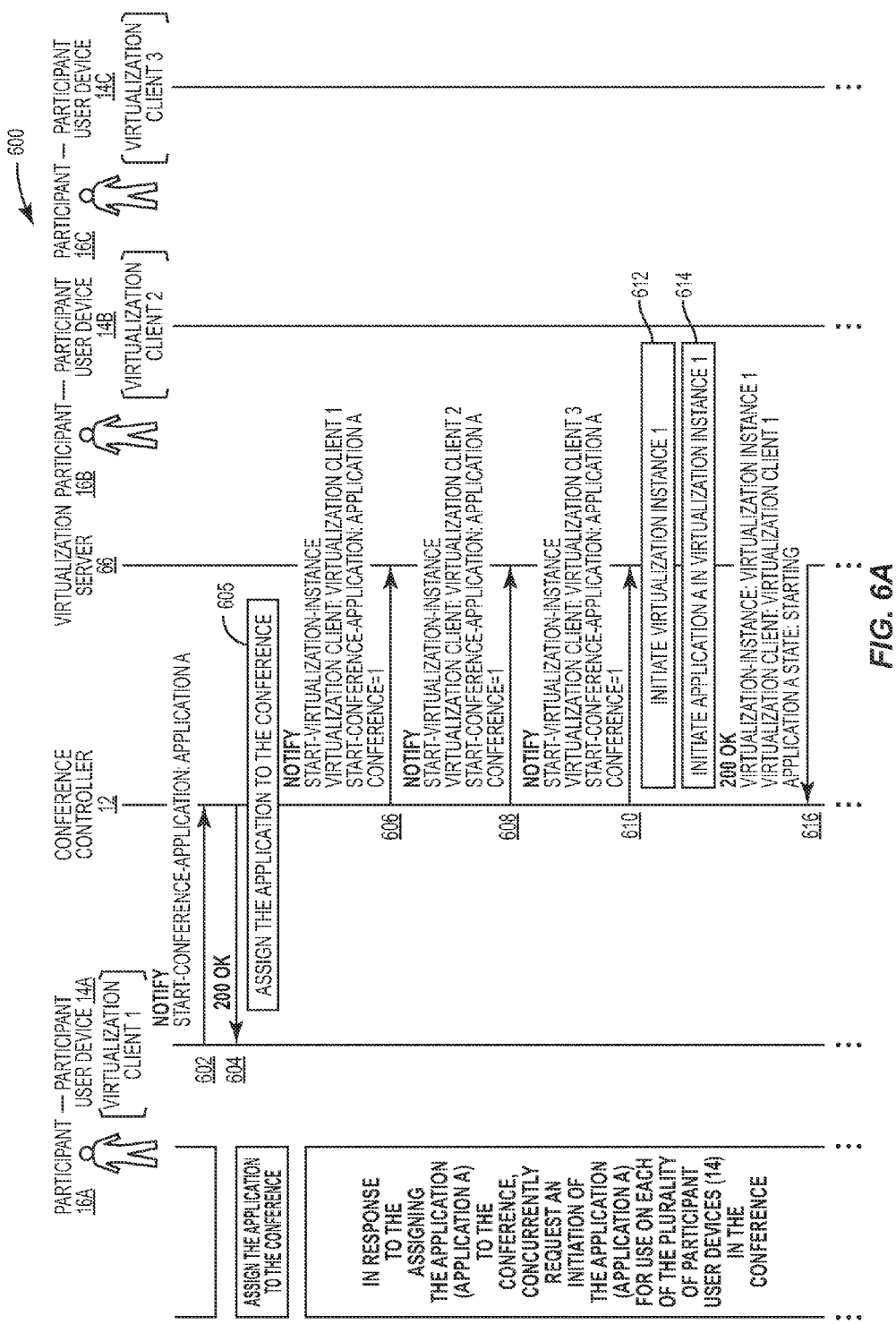
FIGS. 6A, 6B, and 6C are exemplary message flow diagrams illustrating an exemplary method 600 according to FIG. 4D, in which the concurrently requesting initiation of the application for use on each of the plurality of participant user devices in the conference comprises concurrently requesting initiation of at least one application instance on at least one virtualization server for each of the plurality of participant user devices in the conference.
Figure 6B:
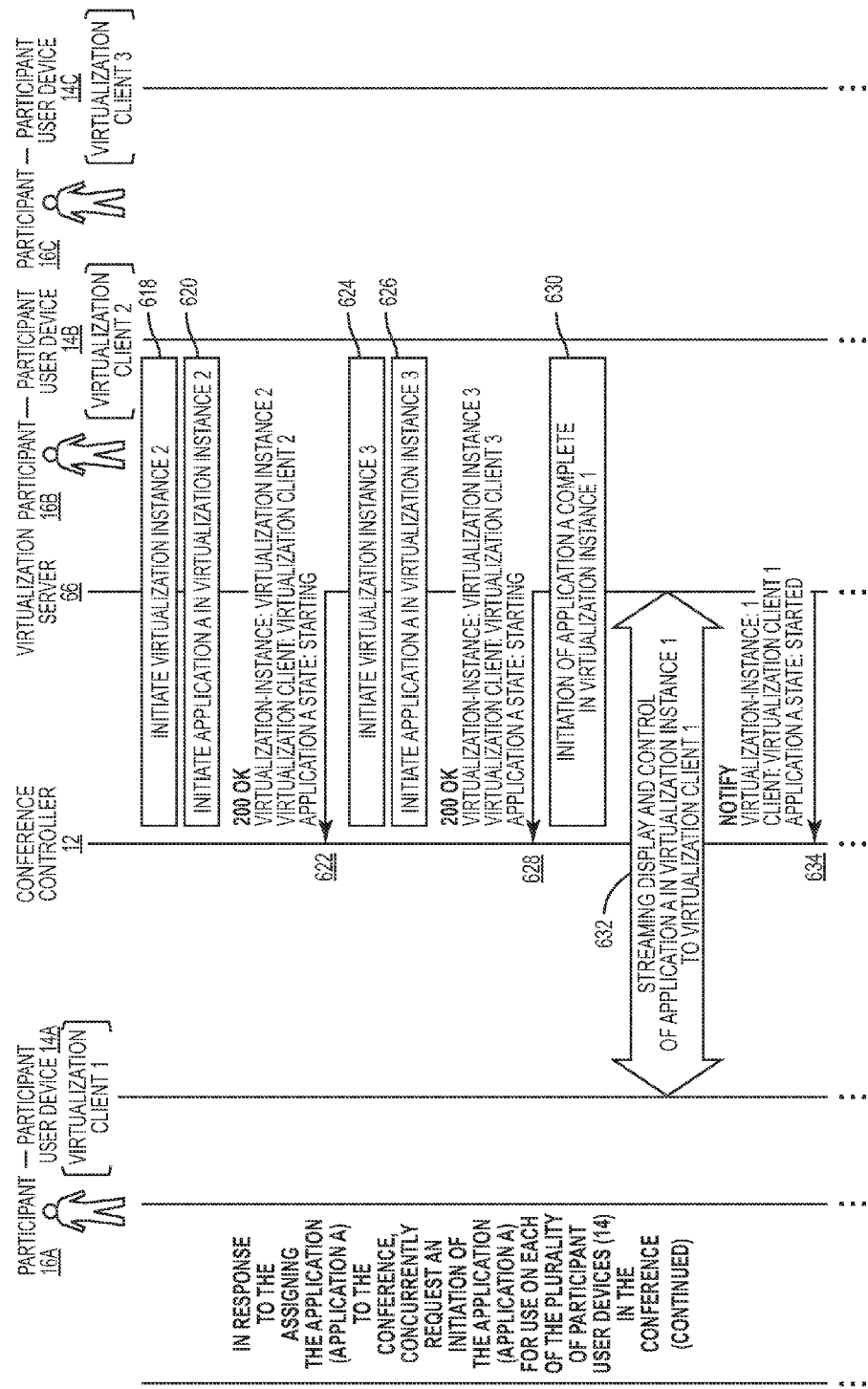
Figure 6C:
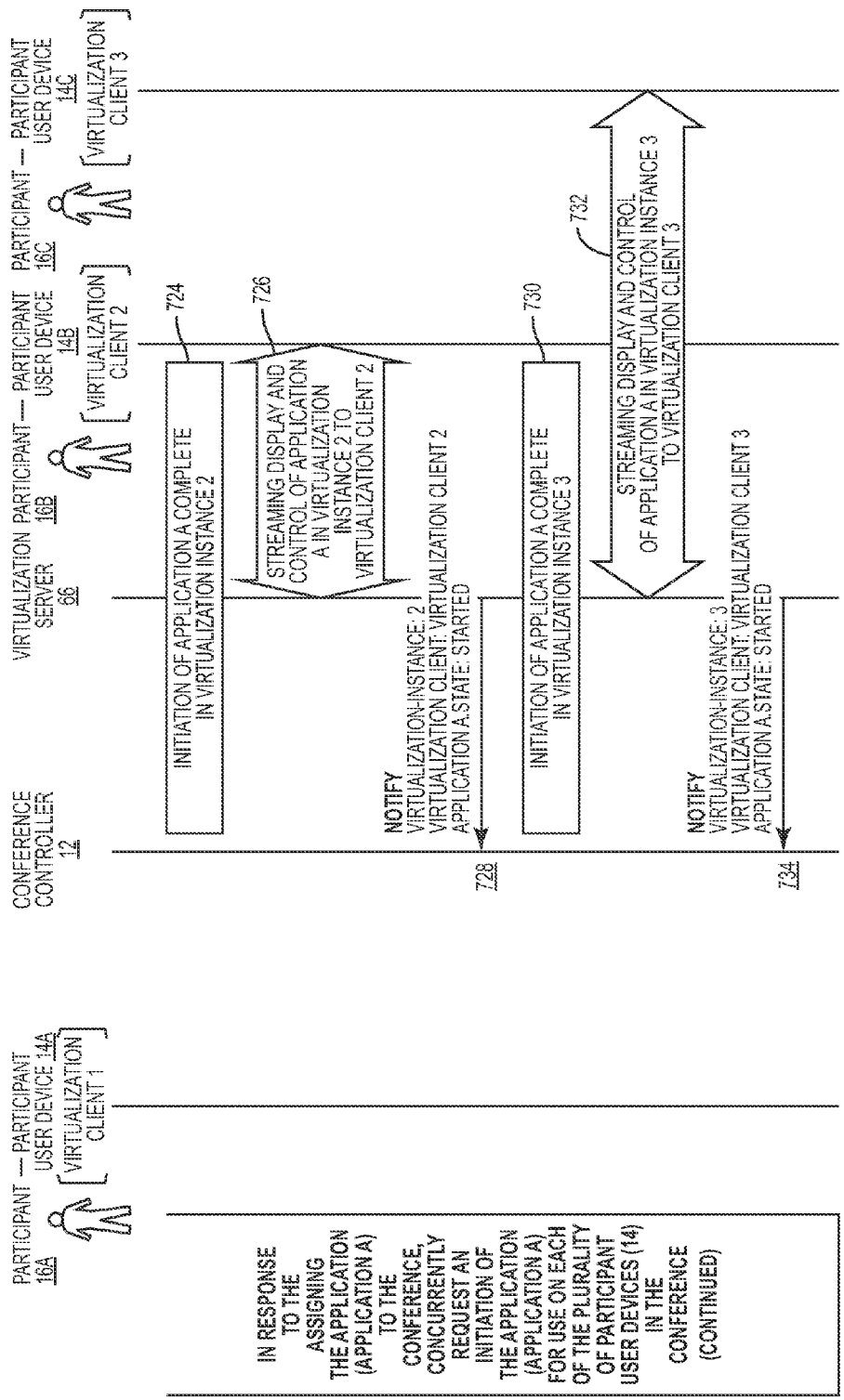

Referring now to FIGS. 6A, 6B, and 6C, in one embodiment, concurrently requesting initiation of the application for use on each of the plurality of participant user devices 14 in the conference (FIG. 3, step 308) may comprise concurrently requesting initiation of an application instance 64 on a virtualization server 66 for each of the plurality of participant user devices 14 in the conference. Each such application instance 64 initiated on the virtualization server 66 may be configured to provide display and control of the application instance 64 to a different participant user device 14 in the conference. FIGS. 6A, 6B, and 6C provide a method 600 illustrating one such embodiment. Such embodiments may be referred to as cloud computing embodiments. Virtualization server 66 may comprise a plurality of virtualization servers 66. Accordingly, a first application instance 64 may execute on a first virtualization server 66 whereas a second application instance 64 may execute on a second virtualization server 66. In this regard, concurrently requesting initiation of an application instance 64 on a virtualization server 66 for each of the plurality of participant user devices 14 in the conference may comprise concurrently requesting initiation of an application instance 64 on one among a plurality of virtualization servers 66 for each of the plurality of participant user devices 14 in the conference. Some or all of the application instances 64 may execute on a same virtualization server 66. Some of the application instances 64 may execute on different virtualization servers 66. Each of the application instances 64 may execute on a different virtualization server 66. Accordingly, concurrently requesting initiation of the application for use on each of the plurality of participant user devices 14 in the conference (FIG. 3, step 308) may comprise concurrently requesting initiation of at least one application instance 64 on at least one virtualization server 66 for each of the plurality of participant user devices 14 in the conference. Each such application instance 64 is configured to provide display and control of the application instance 64 to a different participant user device 14 in the conference.

Referring now to FIG. 6A, in this embodiment, a participant user device 14A may transmit a request to conference controller 12 to assign an application (Application A) to the conference after the conference has been established (step 602). The request may be acknowledged (step 604). Conference controller 12 assigns the application (Application A) to the conference (step 605). In response to assigning the application to the conference, conference controller 12 concurrently requests initiation of the application for use on each of the plurality of participant user devices in the conference (14A, 14B, 14C). In this embodiment, the concurrently requesting initiation of the application for use on each of the plurality of participant user devices in the conference (14A, 14B, 14C) comprises concurrently requesting initiation of an application instance 64 on a virtualization server 66 for each of the plurality of participant user devices 14 in the conference (steps 606, 608, 610). As depicted in FIG. 6A, in response to the request to initiate an application instance 64 on the virtualization server 66 for participant user device 14A, virtualization server 66 initiates a first virtualization instance (step 612), and thereafter initiates the application (e.g., Application A) in that first virtualization instance (step 614). The virtualization server may acknowledge the request from the conference controller 12 (step 616). Once initiation of the application (Application A) completes in the first virtualization instance (step 630) (FIG. 6B), display and control of the application (Application A) executing in virtualization instance 1 is provided to virtualization client 68 of participant user device 14A (step 632). This enables participant 16A to view and control the application (Application A) on the participant user device 14A. The completion of the initiation of the application (Application A) in virtualization instance 1 may also trigger a notification to be transmitted from the virtualization instance 1 executing on the virtualization server 66 to the conference controller 22, indicating that the application (Application A) for participant 16A has started (step 634). As depicted in FIGS. 6B and 6C, similar transactions may concurrently occur for participant user device 14B (steps 618, 620, 622, 724, 726, and 728) and participant user device 14C (steps 624, 626, 628, 630, 730, 732, and 734).

In one embodiment, virtualization server 66 may be provided as a plurality of virtualization servers 66. In this embodiment, different application instances 64 may or may not execute on different virtualization servers 66 among the plurality of virtualization servers 66. The plurality of virtualization servers 66 may provide an increased capacity and/or redundancy for providing application instances 64 to participant devices 14.

Figure 7A:
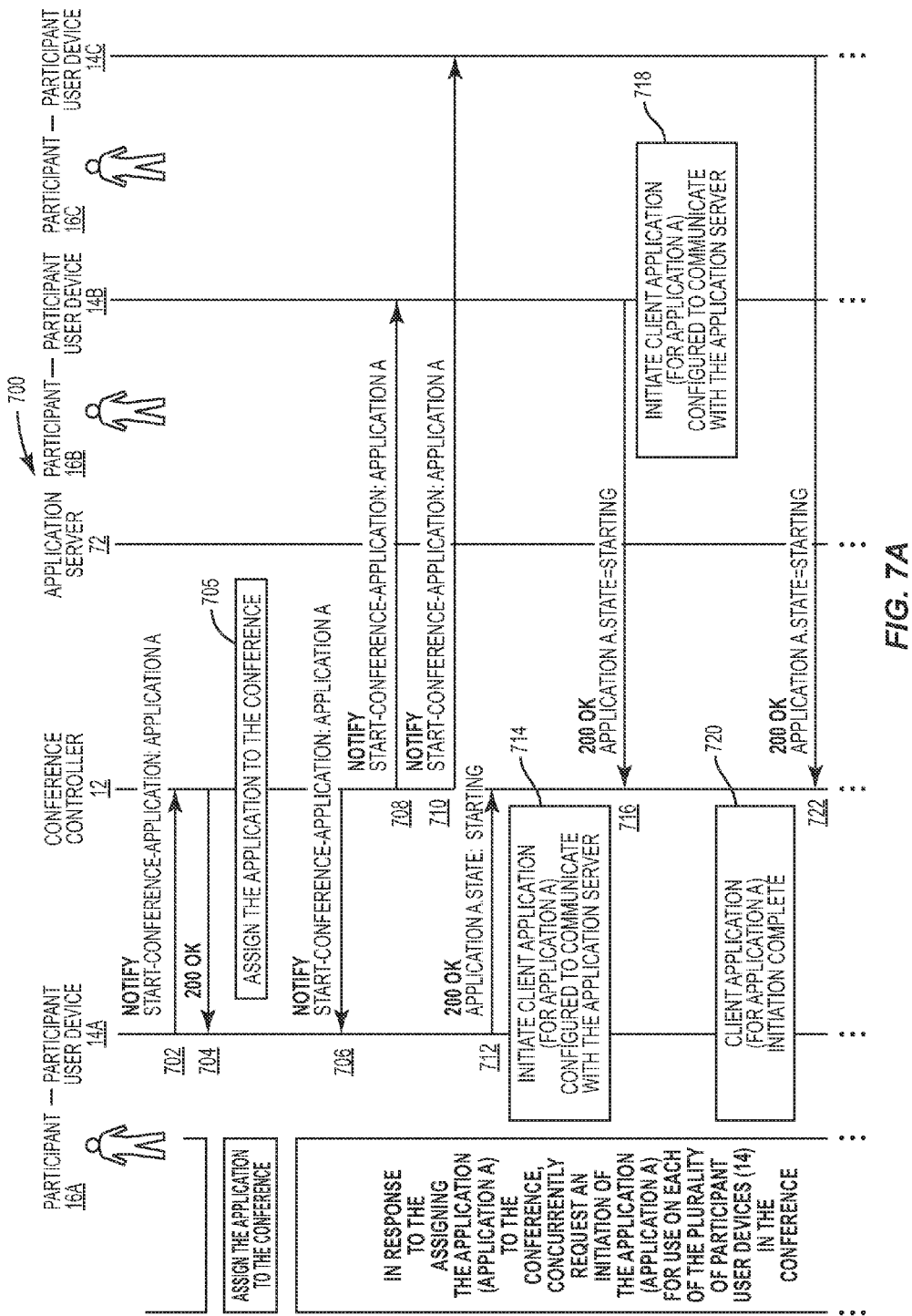
FIGS. 7A and 7B are exemplary message flow diagrams illustrating an exemplary method 700 according to FIG. 4D, in which the concurrently requesting initiation of the application for use on each of the plurality of participant user devices in the conference comprises concurrently initiating a client application on each of the plurality of participant user devices in the conference.
Figure 7B:
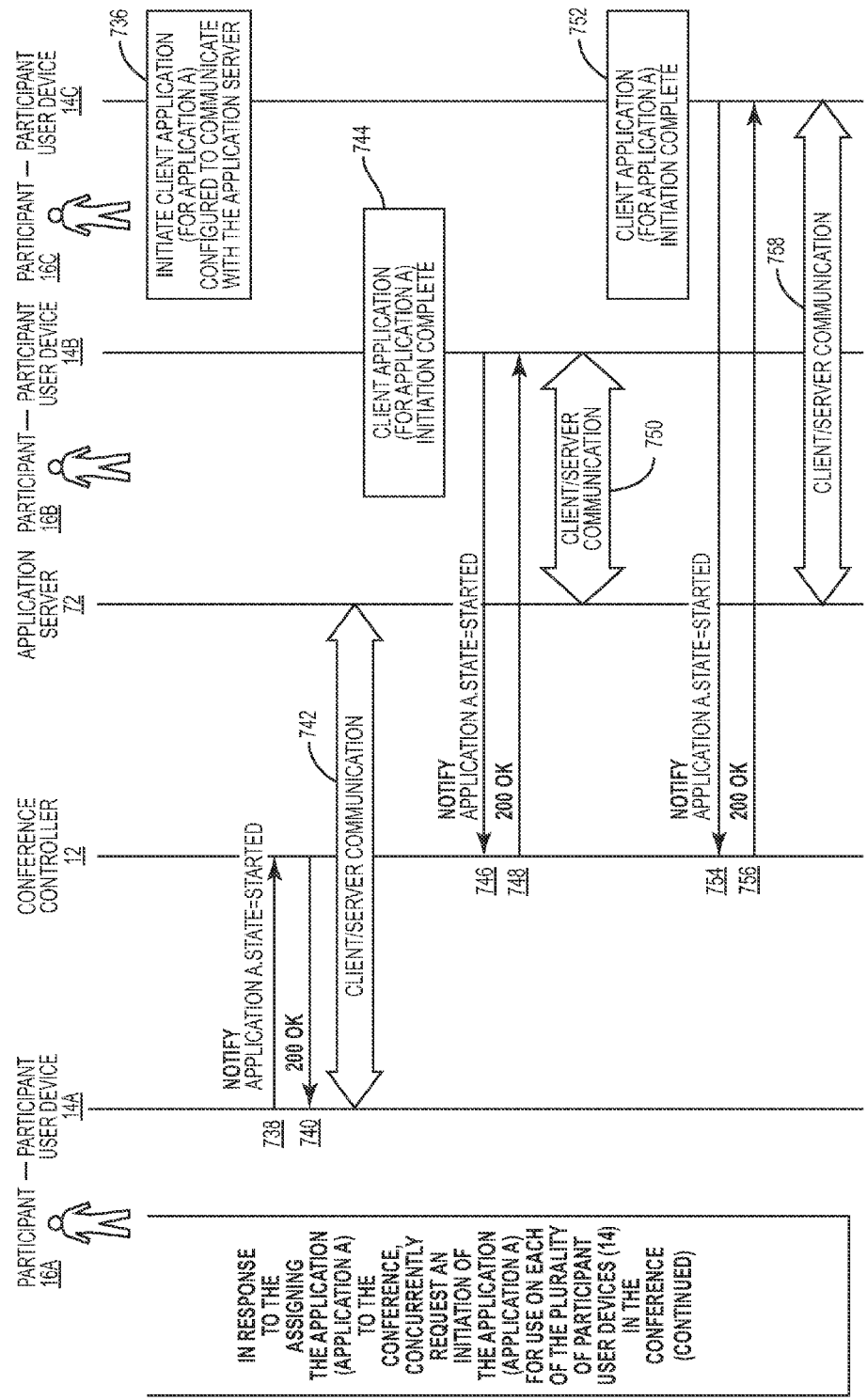

Referring now to FIGS. 7A and 7B, the concurrently requesting initiation of the application for use on each of the plurality of participant user devices 14 in the conference (FIG. 3, step 308) may comprise concurrently initiating an application client 70 on each of the plurality of participant user devices 14 (e.g., 14A, 14B, 14C) in the conference. Each such application client 70 may be configured to communicate with a server application on a server (such as application server 72). FIGS. 7A and 7B provide a method 700 illustrating one such embodiment. Referring now to FIG. 7A, participant user device 14A may transmit a request to conference controller 12 to assign an application (Application A) to the conference after the conference has been established (step 702). Conference controller 12 may acknowledge the request (step 704). Conference controller 12 assigns the application (application A) to the conference (step 705). In response to the assigning the application to the conference, conference controller 12 concurrently requests initiation of the application for use on each of the plurality of participant user devices 14 (such as 14A, 14B, and 14C) in the conference (steps 706, 708, 710).

Focusing now on the transaction for participant user device 14A, participant user device 14A may acknowledge the request from conference controller 12 (step 712). Participant user device 14A may initiate an application client 70 (FIG. 1) (for Application A) configured to communicate with an application server 72 (step 714). Upon completion of the initiation of the application client 70 (for Application A) (step 720), application client 70 of participant user device 14A may notify conference controller 12 that the application (Application A) has started (step 738). Conference controller 12 may acknowledge this notification (step 740). Accordingly, participant user device 14A and application server 72 may communicate (step 742) to provide the application (Application A) for display and control on the participant user device 14A.

As depicted in FIGS. 7A and 7B, similar transactions may concurrently occur for participant user device 14B (steps 716, 718, 744, 746, 748, and 750) and participant user device 14C (steps 722, 736, 752, 754, 756, and 758). The client/server communication among other participant user devices 14A, 14B, 14C and the conference controller 12 may or may not affect the display and control of the application provided to each participant user devices 14A, 14B, 14C. In other words, the application running on each participant user device 14A, 14B, 14C may or may not interact with other application clients running on other participant user devices 14 due to the client/server communication (steps 742, 750, and 758).

In one embodiment, application server 72 may be provided as a plurality of application servers 72. In this embodiment, different application clients 70 may or may not communicate with different application servers 72 among the plurality of application servers 72. The plurality of application servers 72 may provide an increased capacity and/or redundancy for communications with application clients 70.

Figure 8A:
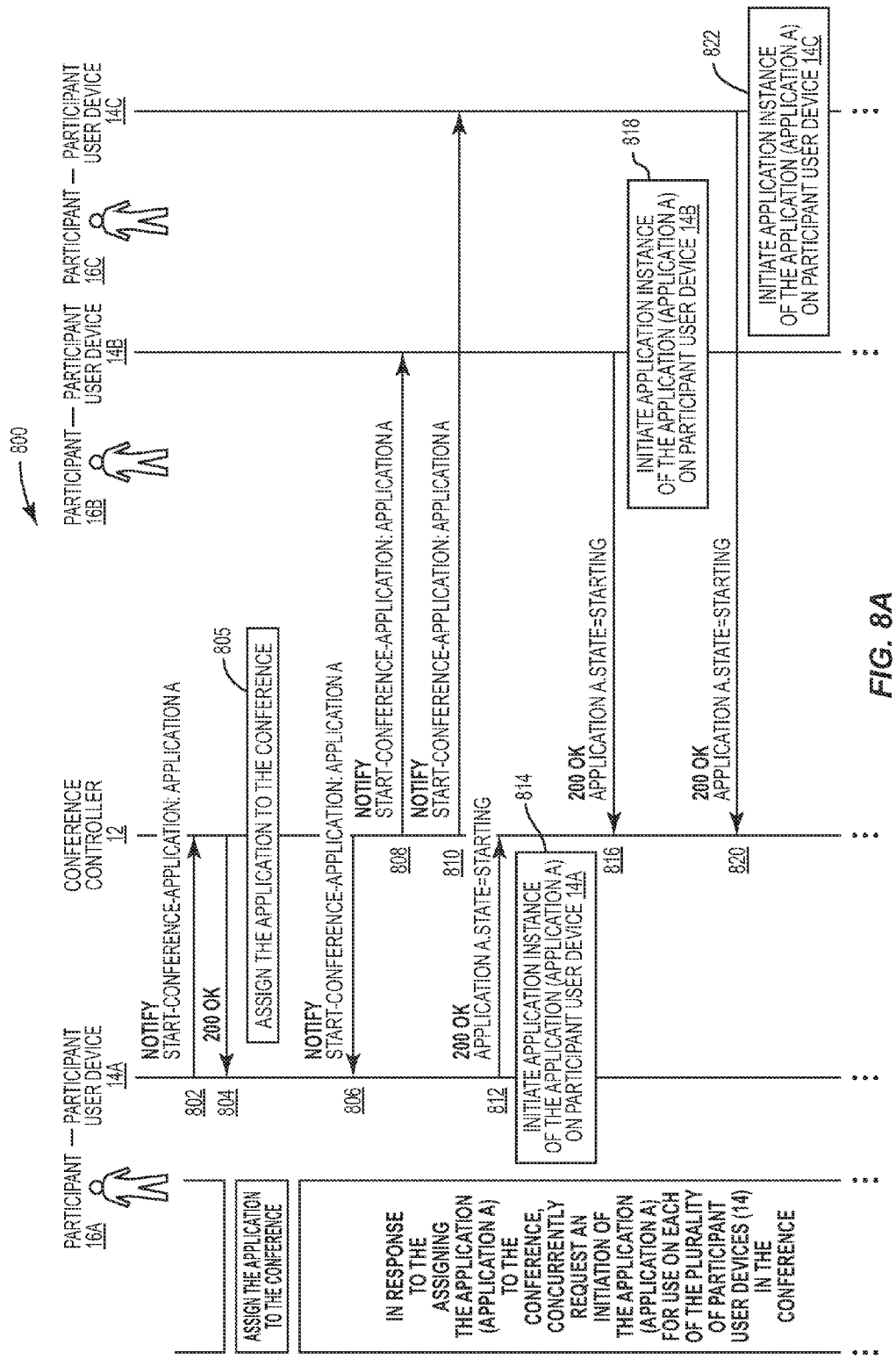
FIGS. 8A and 8B are exemplary message flow diagrams illustrating an exemplary method 800 according to FIG. 4D, in which the concurrently requesting initiation of the application for use on each of the plurality of participant user devices in the conference comprises concurrently initiating an application instance on each of the plurality of participant user devices in the conference.
Figure 8B:
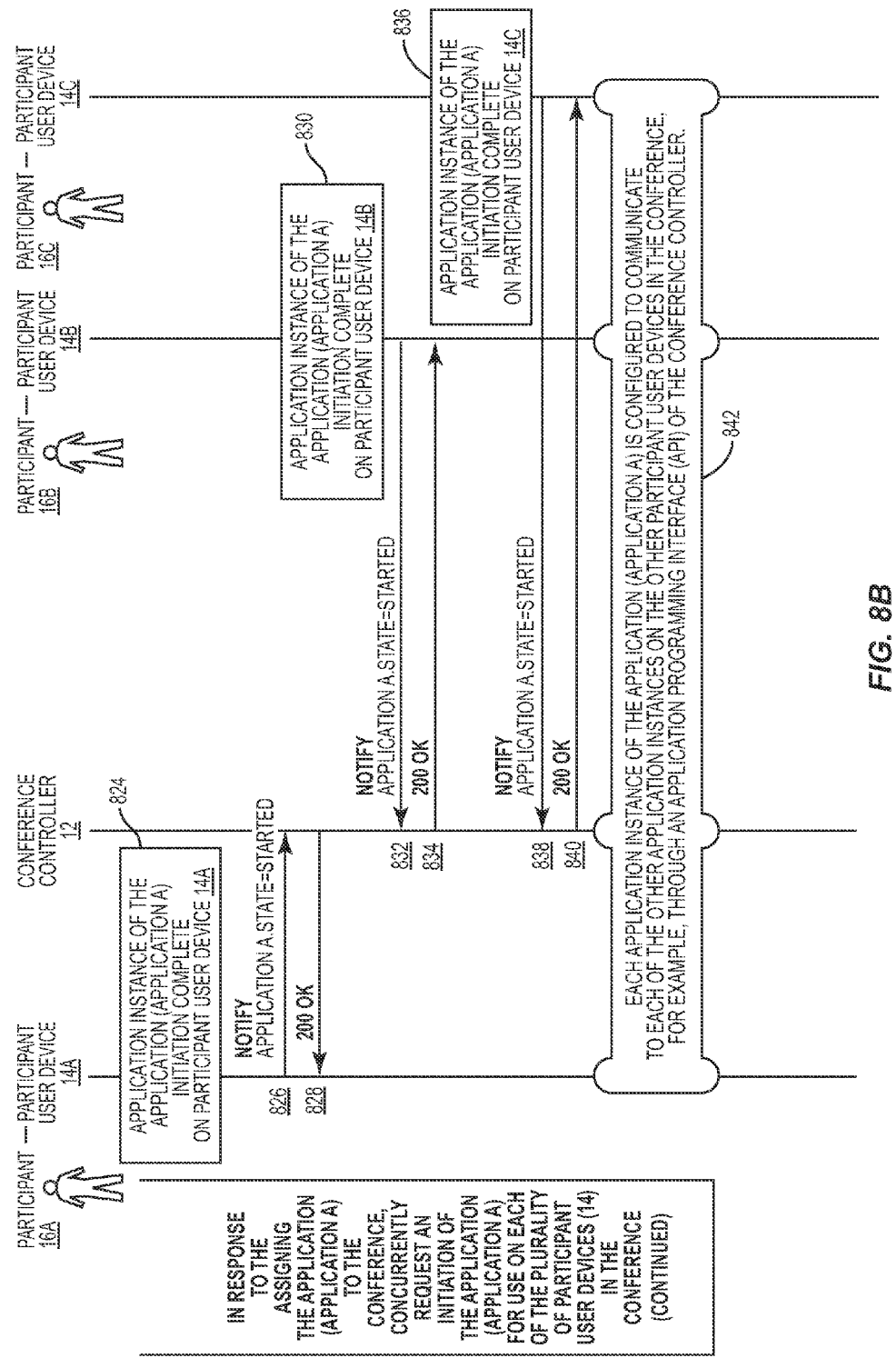

Referring now to FIGS. 8A and 8B, the concurrently requesting initiation of the application for use on each of the plurality of participant user devices 14 in the conference (FIG. 3, step 308) may comprise concurrently initiating an application instance directly on each of the plurality of participant user devices 14 in the conference. Each such application instance may be configured to communicate to each of the other application instances on the other participant user devices in the conference.

One such embodiment is provided by method 800 illustrated in FIGS. 8A and 8B. In this embodiment, participant user device 14A transmits a request to conference controller 12 to assign an application (Application A) to the conference after the conference has been established (step 802). Conference controller 12 may positively acknowledge the request (step 804). Conference controller 12 may assign the requested application (Application A) to the conference (step 805). In response to the assigning the application (Application A) to the conference, conference controller 12 may concurrently request initiation of the application (Application A) for use on each of the plurality of participant user devices 14 in the conference (steps 806, 808, and 810). Focusing now on the transaction for participant user device 14A, participant user device 14A may positively acknowledge the request from conference controller 12 (step 812). Participant user device 14A may initiate the application instance 58 (for Application A) on participant user device 14A (step 814). Upon completion of initiation of the application instance 64 for the application (Application A) (step 824), participant user device 14A may notify conference controller 12 that the application (Application A) has started (step 826). Conference controller 12 may positively acknowledge the notification (step 828). As depicted in FIGS. 8A and 8B, similar transactions may concurrently occur for participant user device 14B (steps 816, 818, 830, 832, and 834) and participant user device 14C (steps 820, 822, 836, 838, and 840).

According to this and other embodiments discussed herein, the concurrently requesting initiation of the application 58 for use on the plurality of participant user devices 14 in the conference (FIG. 3, step 308) may comprise concurrently requesting initiation of a separate application instance 64 of the application 58 for each of the plurality of participant user devices 14 in the conference. Each separate application instance 64 of the application 58 may provide a different display of the application 58 for each of the participant user devices 14. Each separate application instance 64 of the application 58 may only be controllable on the participant user devices 14 for which it was initiated.

As also depicted in FIG. 8B, each application instance 64 of the application (Application A) may be configured to communicate to the conference controller 12. As a non-limiting example, this communication may occur through an application programming interface (API) of the conference controller (e.g., collaboration API 56 in FIG. 1). In one embodiment, each application instance 64 may be configured to communicate through the application programming interface (API) of the conference controller 12 to each of the other application instances 64 executing for the other participant user devices 14 in the conference. Such an application programming interface (API) may or may not be used by any other embodiments herein discussed.

Referring back to FIG. 3, the method 300 may comprise additional steps. For example, method 300 may further comprise determining whether the application 58 is available on at least one participant user device 14 in the conference. In response to determining that the application 58 is not available on the participant user device 14 in the conference, the application 58 may be downloaded to the participant user device 14 in the conference. For example, conference controller 12 may download the application 58 to the at least one participant user device 14 directly, or alternatively, conference controller 12 may instruct the at least one participant user device 14 to download the application 58 from a particular address (e.g., a URL).

Figure 9A:
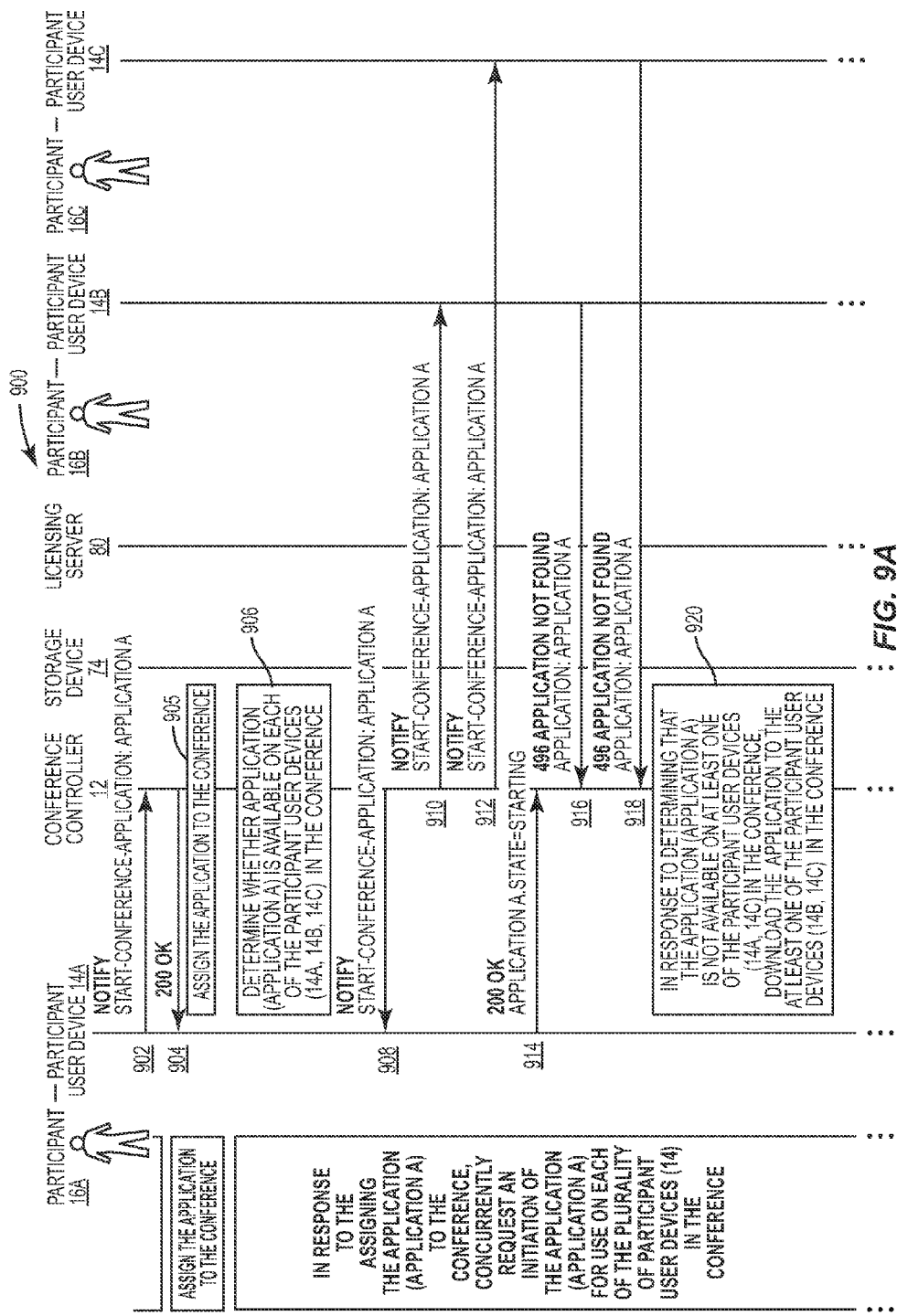
FIGS. 9A and 9B are exemplary message flow diagrams illustrating an exemplary method 900 according to FIG. 4D, further comprising determining whether the application is available on the participant user devices in the conference, and if not available on a participant user device in the conference, downloading the application to the participant user device in the conference.
Figure 9B:
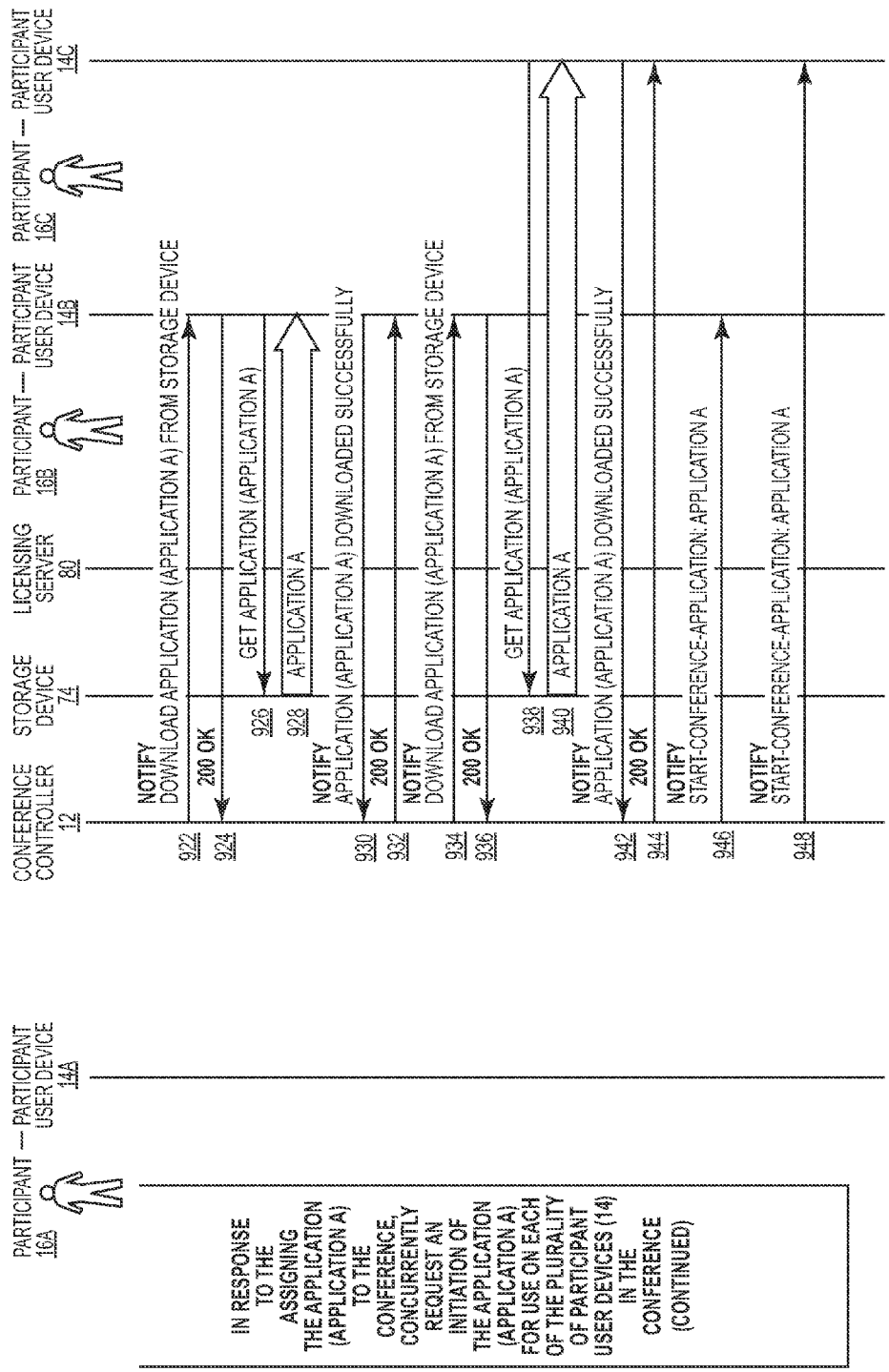

In this regard, FIGS. 9A and 9B provide a method 900 illustrating one such embodiment. In this embodiment, participant user device 14A may transmit a request to conference controller 12 to assign an application 58 to the conference after the conference has been established (step 902). Conference controller 12 may positively acknowledge this request (step 904). Conference controller 12 may assign the application (Application A) to the conference (step 905). Conference controller 12 may determine whether the application (Application A) is available on each of the participant user devices (14A, 14B, 14C) in the conference (step 906). In this regard, in response to the concurrently requesting initiation of the application (Application A) for use on each of the plurality of participant user devices 14 in the conference (steps 908, 910, 912), at least one of the participant user devices 14 may negatively acknowledge the request (steps 916, 918) indicating that the application (Application A) cannot be started because the application (Application A) was not found (steps 910, 912). Other participant user devices 14 may positively acknowledge the request (step 908), indicating that the application (Application A) was found. In this manner, conference controller 12 may determine whether the application (Application A) is available on a participant user device 14 in the conference. One of skill in the art will recognize other methods consistent with this disclosure for conference controller 12 to determine whether the application 58 is available on a participant user device 14 in the conference.

In response to determining that the application (Application A) is not available on at least one of the participant user devices 14 (such as 14B and 14C) in the conference, the application (Application A) may be downloaded to the at least one participant user devices (14B, 14C) in the conference. One such embodiment is provided in FIG. 9B, though one of skill in the art will recognize other embodiments, in accordance with this disclosure, for downloading the application to the at least one participant user devices (14B, 14C) in the conference.

Referring now to the embodiment depicted in FIG. 9B, conference controller 12 may notify the at least one participant user devices (14B, 14C) to download the application (Application A) from a storage device 74 (steps 922, 934). The at least one participant user devices (14B, 14C) may acknowledge the notification (steps 924, 936). The at least one participant user device (14B, 14C) may request the application (Application A) from a storage device 74 (steps 926, 938). The storage device 74 may be any type of storage device. As non-limiting examples, the storage device 74 may be a File Transfer Protocol (FTP) server, a Secure File Transfer Protocol (SFTP) server, a Hypertext Transfer Protocol (HTTP) server, a Secure Hypertext Transfer Protocol (HTTPS) server, a Network File System (NFS) drive, a network drive, an encrypted or non-encrypted drive, or any other remote or local storage device.

In response to the request for the application from the storage device 74, the storage device 74 may transmit the application (Application A) to the at least one participant user device (14B, 14C) (steps 928, 940). Upon completion of the download of the application, each participant user device 14 downloading the application (e.g., 14B, 14C) may notify conference controller 12 that the download completed (steps 930, 942). Conference controller 12 may acknowledge the notification (steps 932, 944). In response to the notification, conference controller 12 may re-notify the at least one participant user device 14 to start the application (Application A) (steps 946, 948). Alternatively, the at least one participant user device (e.g., 14B, 14C) may automatically attempt to start the application (Application A) without further notification from conference controller 12.

Figure 10A:
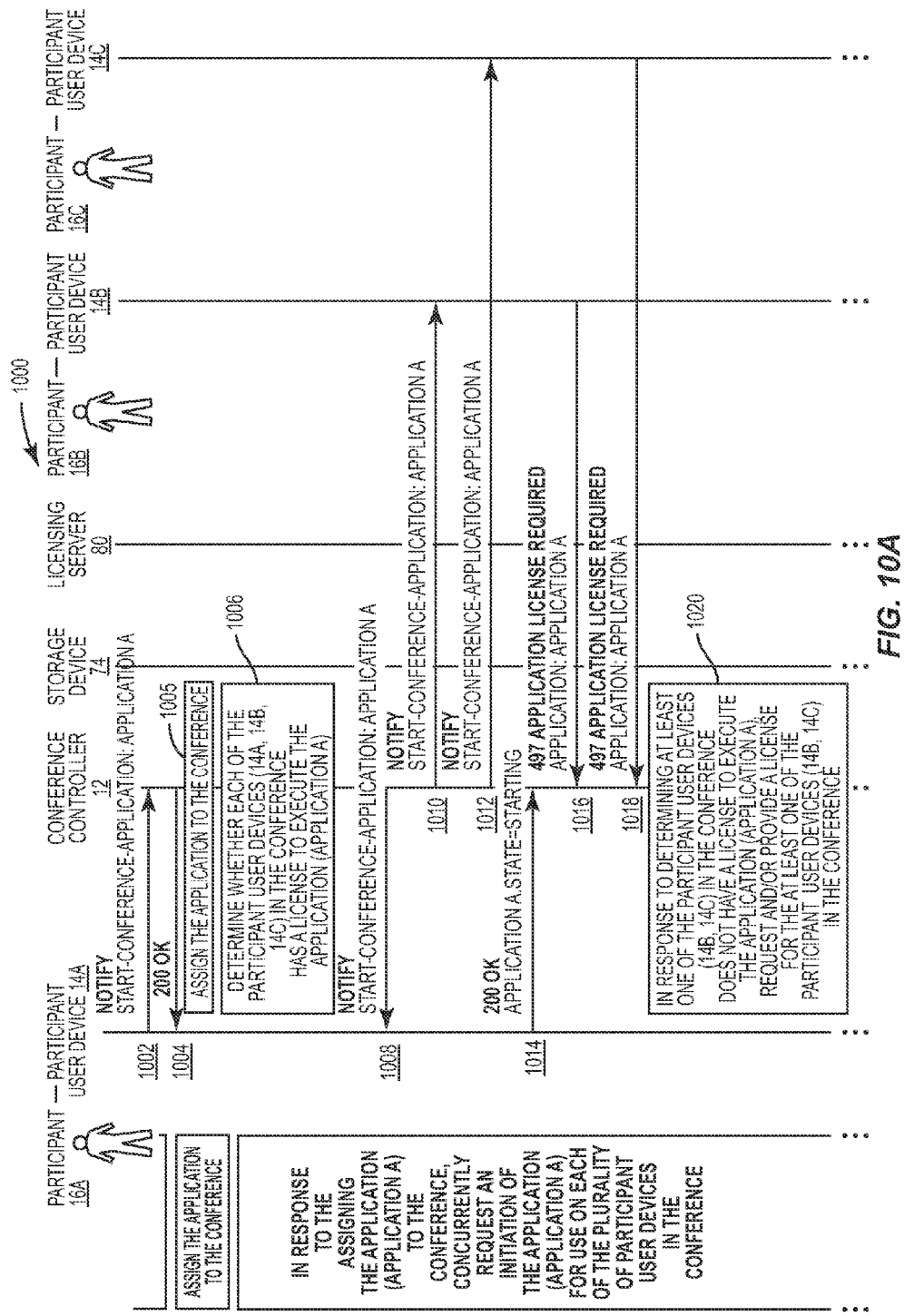
FIGS. 10A and 10B are exemplary message flow diagrams illustrating an exemplary method 1000 according to FIG. 4D, further comprising determining whether the participant user devices in the conference are licensed to execute the application, and if not licensed for a participant user device in the conference, requesting a license for the participant user device in the conference for the duration of the conference.
Figure 10B:
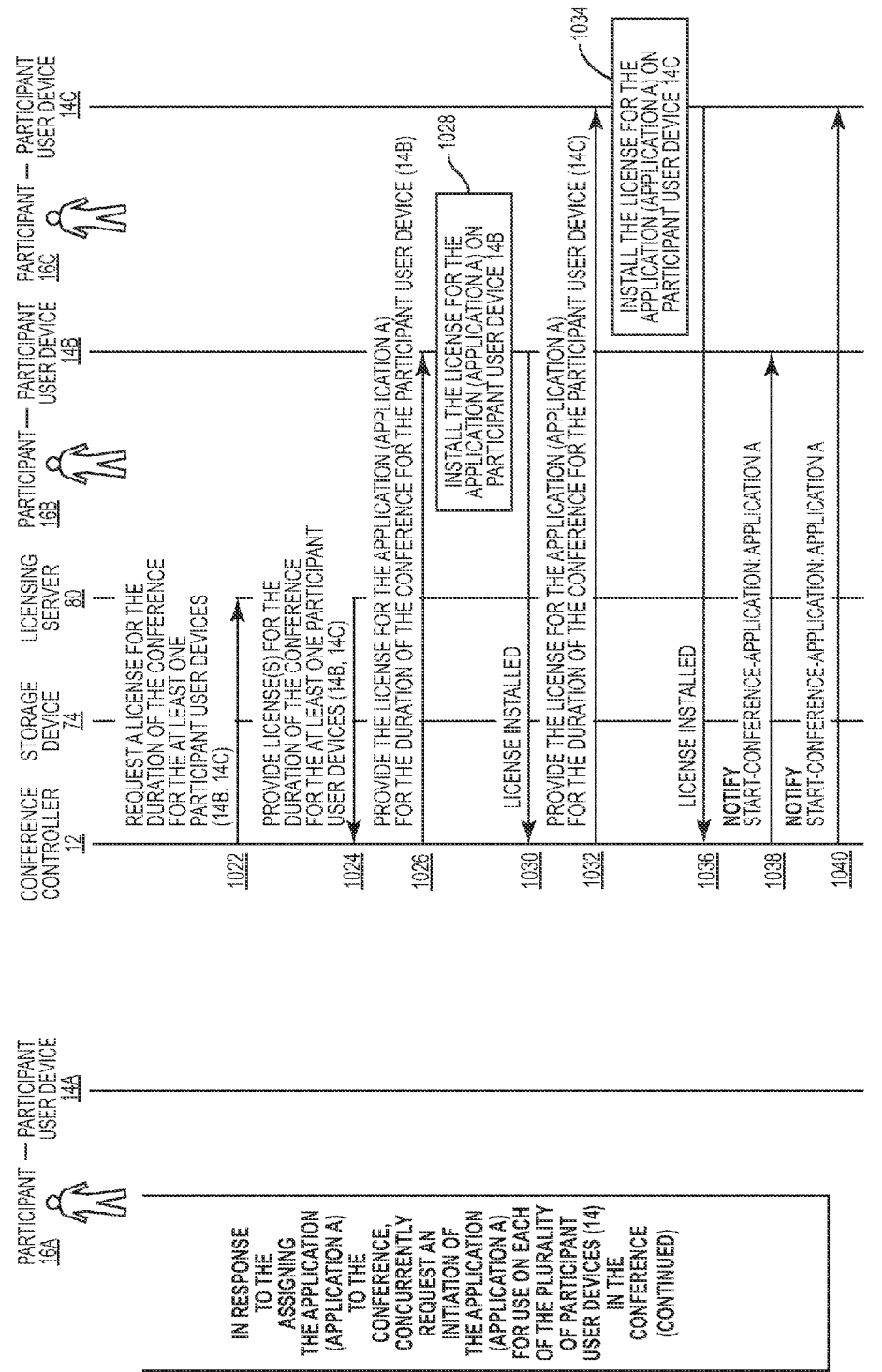

In some instances, licensing may be required to execute an application assigned to a conference. Accordingly, method 300 (FIG. 3) may comprise additional licensing related steps. For example, conference controller 12 may determine whether a participant user device 14 in the conference is licensed to execute the application 58 assigned to the conference. In response to determining that the participant user device 14 is not licensed to execute the application 58, conference controller 12 may request as license for the participant user device 14 in the conference. The license may license the participant user device 14 to execute the application 58 for the duration of the conference. In some embodiments, the license may license the participant user device 14 to execute the application 58 for only the duration of the conference. FIGS. 10A and 10B provide one such embodiment. One of skill in the art will appreciate other such embodiments that may be provided in accordance with this disclosure.

Referring now to FIG. 10A, participant user device 14A may transmit a request to conference controller 12 to assign an application (Application A) to the conference after the conference has been established (step 1002). Conference controller 12 may positively acknowledge the request (step 1004). Conference controller 12 may assign the application (Application A) to the conference (step 1005). Conference controller 12 may determine whether each of the participant user devices 14 (e.g., 14A, 14B, 14C) in the conference has a license to execute the application (Application A) (step 1006). For example, after concurrently requesting initiation of the application (Application A) for use on each of the plurality of participant user devices 14 (e.g., 14A, 14B, 14C) (steps 1008, 1010, 1012), conference controller 12 may receive negative acknowledges from at least one participant users devices (e.g., 14B, 14C) indicating that the application cannot be started for those at least one participant user devices (e.g., 14B, 14C) because an application license is required (steps 1016, 1018).

Other participant user devices (e.g., 14A) may positively acknowledge the request, indicating that no additional application license is required for executing the application for those participant user devices (e.g., 14A) (step 1014). In response to determining at least one of the participant user devices (e.g., 14B, 14C) in the conference does not have a license to execute the application (Application A), conference controller 12 may request and/or provide a license for the at least one of the participant user devices (e.g., 14B, 14C) in the conference (step 1020).

Referring now to FIG. 10B, conference controller 12 may request a license from a licensing server 80 for the duration of the conference for the at least one participant user devices (e.g., 14B, 14C) in the conference (step 1022). In response, the licensing server 80 may provide license(s) for the duration of the conference for the at least one participant user devices (e.g., 14B, 14C) in the conference (step 1024). Thereafter, conference controller 12 may transmit the license for the application (Application A) for the duration of the conference for the participant user device (14B) to the participant user device (14B) (step 1026). Participant user device 14B may install the license for the application (Application A) on the participant user device 14B (step 1028). Participant user device 14B may notify conference controller 12 that the license has been installed (step 1030). Conference controller 12 may also transmit the license for the application (Application A) for the duration of the conference for the participant user device (14C) to the participant user device (14C) (step 1032).

The license provided to participant user device 14B may be the same or different from the license provide to participant user device 14C. For example, a same license may be provided to both participant user device 14B and 14C when the license is valid for all participants of a same conference. Regardless, participant user device 14C may install the license for the application (Application A) on participant user device 14C (step 1034). Thereafter, participant user device 14C may notify the conference controller 12 that the license has been installed (step 1036). The license may be provided for a participant user device 14 in the conference only for the duration of the conference.

Upon completion of the installation of the license, each participant user device installing the license (e.g., 14B, 14C) may notify conference controller 12 that the license installation has completed (steps 1030, 1036). Conference controller 12 may acknowledge the notification (not shown). In response to the notification, conference controller 12 may re-notify the at least one participant user device (e.g., 14B, 14C) to start the application (Application A) (steps 1038, 1040).

In an alternative embodiment, the at least one participant user device (e.g., 14B, 14C) may automatically attempt to start the application (Application A) without further notification from conference controller 12. In this embodiment, each at least one participant user device (e.g., 14B, 14C) may notify conference controller 12 when the application has successfully started for that participant user device 14. Conference controller 12 may acknowledge the notifications.

In one embodiment, conference controller 12 and/or licensing server 80 is notified whenever an application instance 64 of an application 58 has terminated for a participant user device 14 (e.g., 14A, 14B, 14C). This may allow the conference controller 12 and/or licensing server 80 to become aware and maintain awareness of the number of concurrent licenses that are in use for a conference. As a non-limiting example, each participant user device 14 may notify the conference controller 12 when the application instance 64 for that participant user device 14 terminates. In response to such a notification from a participant user device 14, the conference controller 12 may notify the licensing server 80 that the application instance 64 has terminated for the participant user device 14. Alternatively, participant user device 14 may directly notify the licensing server that its application instance 64 of application 58 has terminated.

Figure 11:
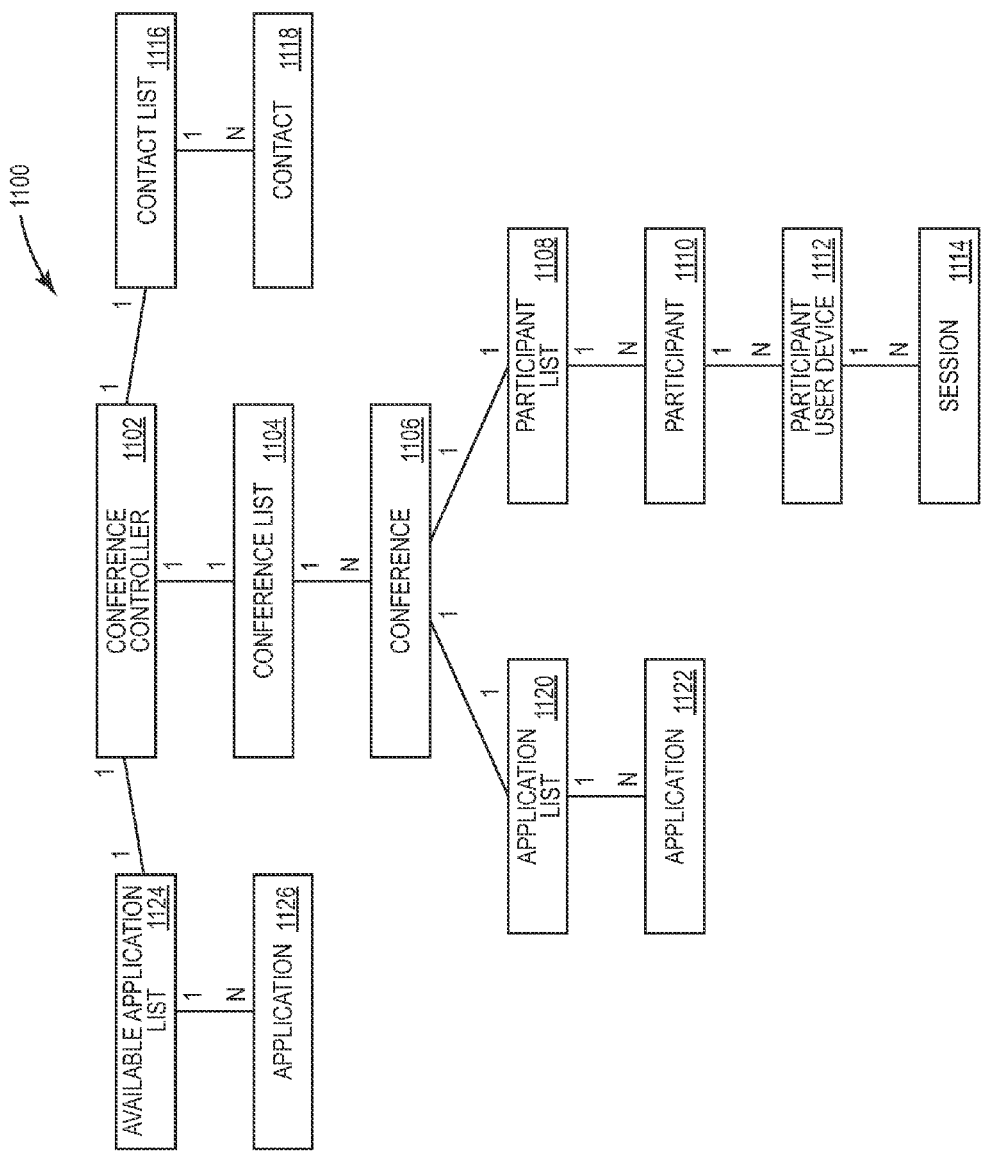
FIG. 11 illustrates an embodiment of a data structure with which embodiments disclosed herein may be practiced.

FIG. 11 illustrates an exemplary data structure 1100 for storage and retrieval of data for a conference. The data structure 1100 may be provided for a participant user device 14 or for a conference controller 12. When provided for a participant user device 14 (such as for any of participant user devices 14A-14D), the data structure 1100 may be used for populating portions of a user interface 84 for conference control for the participant user device 14, such as the exemplary user interface 84 discussed in FIGS. 2A, 2B, 12, 13, 14, 17A and 17B. The data structure 1100 comprises a conference controller record 1102 which may comprise information about the conference controller 12, including the network address of the conference controller 12. A conference list 1104 may be associated with the conference controller record 1102. The conference list 1104 may provide a plurality of conference records 1106, each conference record 1106 providing information about a different conference managed by that conference controller 1102.

A participant list 1108 may be associated with each conference record 1106. The participant list 1108 may provide a list of participants 1110 in the conference 1106. At least one participant user device record 1112 may be associated with each participant record 1110. The at least one participant user device records 1112 provide information about at least one participant user devices 14 that a participant 1110 is using for the conference 1106. Each participant user device 14 may have at least one session 1114 for communicating with the conference 1106.

An application list 1120 may also be associated with each conference record 1106. The application list 1120 may provide a list of applications records 1122 for each application 58 which may be assigned to the conference.

The data structure 1100 may optionally provide an available application list 1124, and at least one application 1126 records indicating at least one application 58 which may be assigned to a conference of the conference controller 12 associated with the conference controller record 1102. The available application list 1124 may alternatively be associated with each conference record 1106.

The data structure 1100 may also optionally provide a contact list 1116 associated with the conference controller record 1102 indicating all contacts 1118 that may assigned to a conference 1106 of the conference controller 1102. A contact list 1116 may also be associated directly with a participant record 1110, enabling the participant 16 to have a participant specific list of contacts that may be assigned to a conference 1106. In other embodiments, the contact list 1116 may additionally or instead be associated with a participant user device record 1112, providing a participant user device 14 specific contact list 1116.

Figure 12:
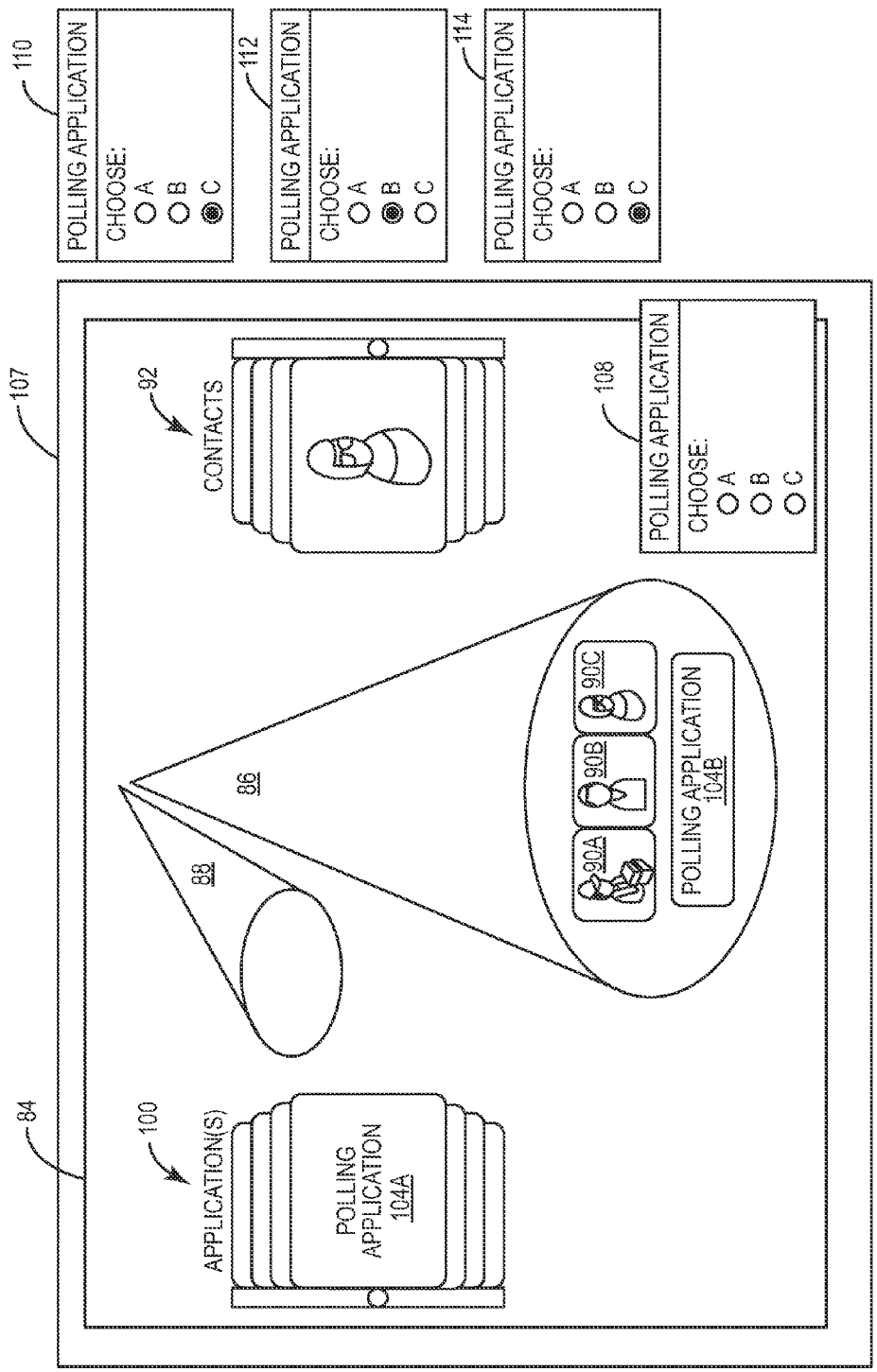
FIG. 12 illustrates the exemplary user interface illustrated in FIG. 2B, after an application has been assigned and initiated, as well as further interfaces provided on other participant user devices in the conference.

FIG. 12 illustrates the exemplary user interface 84 (also depicted previously in FIGS. 2A and 2B) after an application (e.g., polling application 104, represented on the user interface 84 by icons 104A and 104B) has been associated with a first conference represented by first defined area 86. As depicted in FIG. 12, a user interface 108 for polling application 104A is provided for display and control on the screen 107 of participant user device 14A. Because conference controller 12 accepted the requested assignment of the application to the conference (in FIG. 2B), the conference application (e.g., the polling application 104) is also provided on user interfaces 110, 112, 114 of other participant user devices 14B, 14C, 14D in the conference in FIG. 12. As depicted in FIG. 12, each participant user device 14A, 14B, 14C, 14D may be provided a different user interface 108, 110, 112, 114, respectively, which may be independently displayed and controlled only by that participant user device 14A, 14B, 14C, 14D, respectively. In one such embodiment, each separate application instance of the application may only be controllable on the participant user device 14 for which it was initiated.

Figure 13:
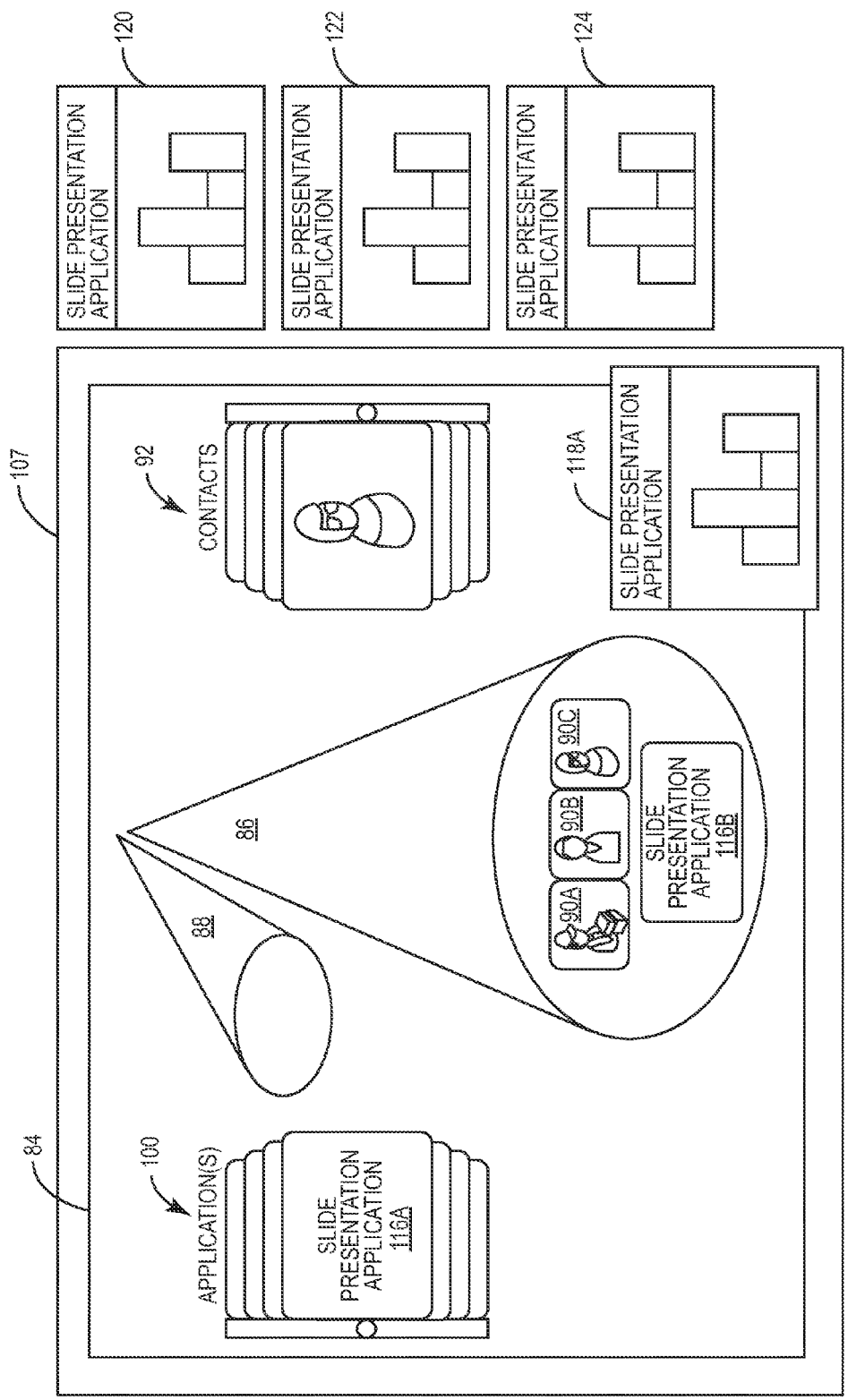
FIG. 13 illustrates another exemplary user interface illustrated in FIG. 2B, after an application has been assigned and initiated, as well as further interfaces provided on other participant user devices in the conference.

FIG. 13 depicts another application (slide presentation application 116, iconically represented on the user interface 84 of participant user device 14A by icons 116A and 116B) which has been assigned to a first conference associated with the first defined area 86 of the user interface 84 for participant user device 14A. A user interface 118A for the slide presentation application 116 may be provided on the screen 107 of the participant user device 14A. Separate instances of the slide presentation application 116 may also be provided on user interfaces 120, 122, 124 of other participant user devices 14B, 14C, and 14D, respectively. The user interface for each application instance (118A, 120, 122, 124) may be independently controlled by the participant (16A, 16B, 16C, 16D, respectively), using that participant's participant user device (14A, 14B, 14C, 14D, respectively). The user interface for application instance 118A may be independently controlled by participant 16A. The user interface for application instance 120 may be independently controlled by participant 16B. The user interface for application instance 122 may be independently controlled by participant 16C. The user interface for application instance 124 may be independently controlled by participant 16D.

Figure 14:
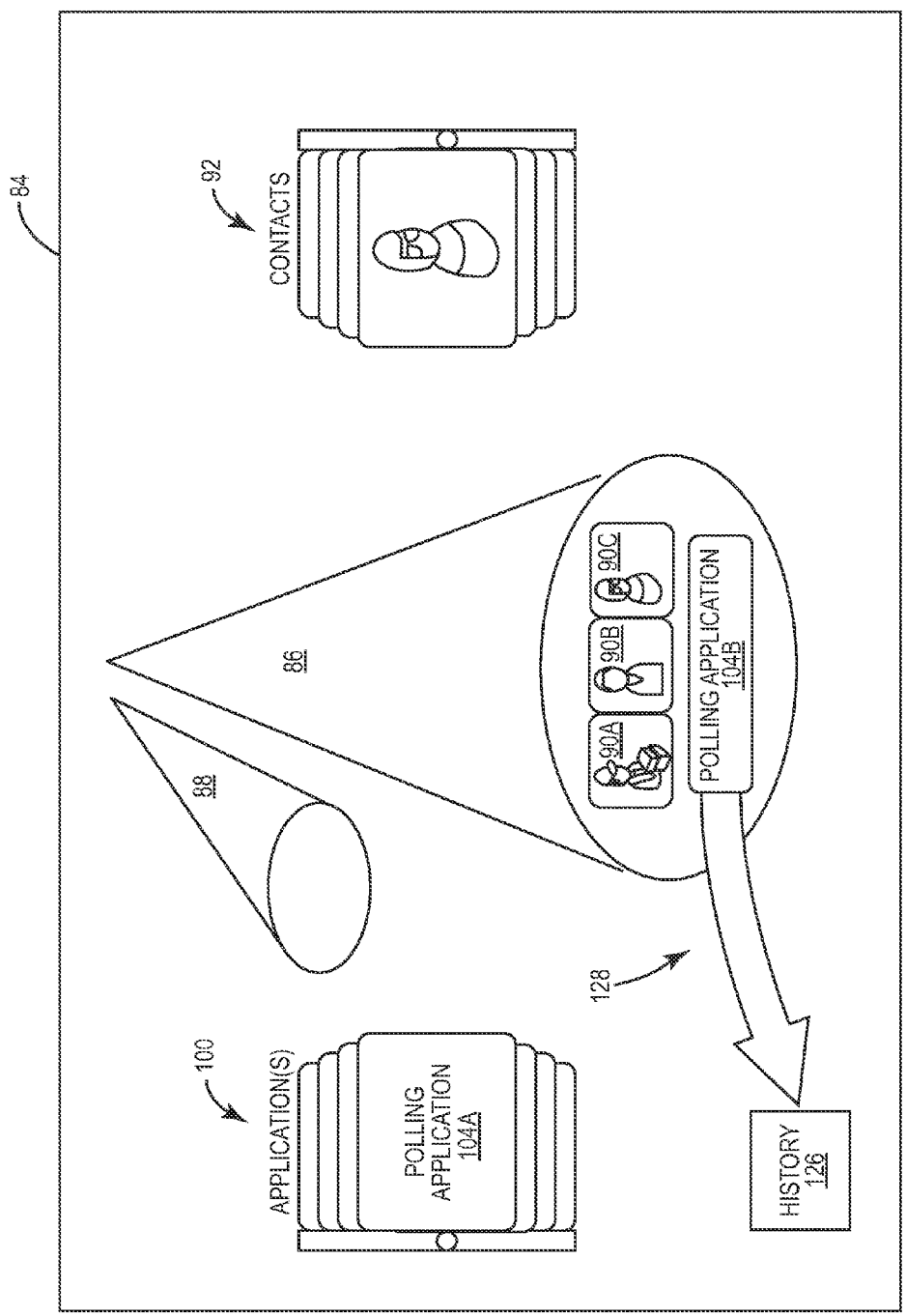
FIG. 14 illustrates the exemplary user interface of FIG. 12, and a user interface manipulation for disassociating the application from the conference.

An application may also be disassociated from a conference. In this regard, FIG. 14 depicts a user interface manipulation 128 of the user interface 84 of participant user device 14A for requesting disassociation of the application 104 from the conference. For example, the icon 104B associated with application 104 may be dragged and dropped away from the first defined area 86 representing the first conference. In one embodiment, as depicted in FIG. 14, the disassociation may result in certain artifacts generated during use of the application 104 during the conference being archived in a history 126. However, any dragging and dropping away of the icon 104B from the first defined area 86 associated with the first conference may disassociate the application 104 from the conference associated with the first defined area 85.

Figure 15A:
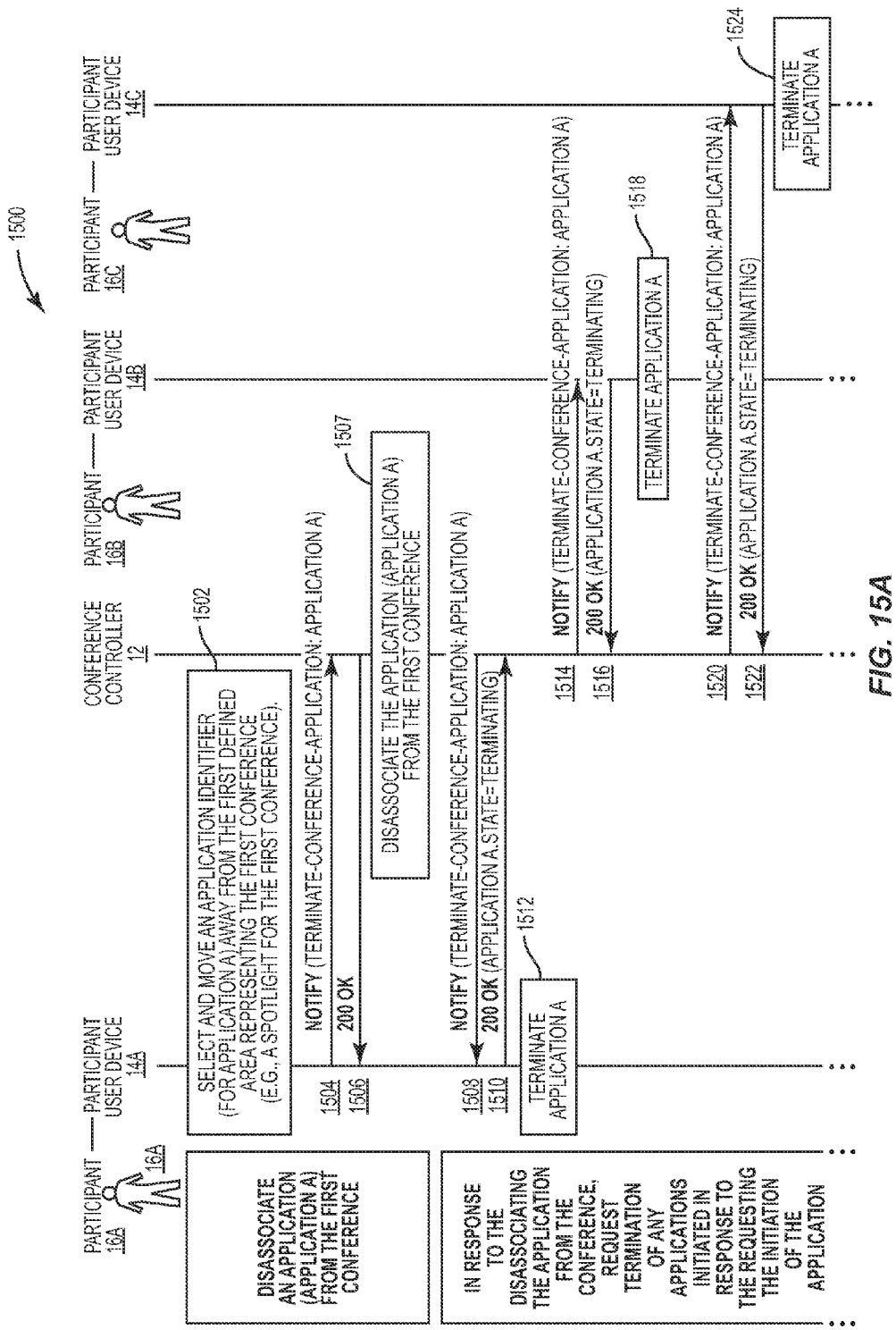
FIGS. 15A and 15B are exemplary message flow diagrams illustrating an exemplary message 1500 flow which may occur after FIG. 4D, for disassociating an application from the conference.
Figure 15B:
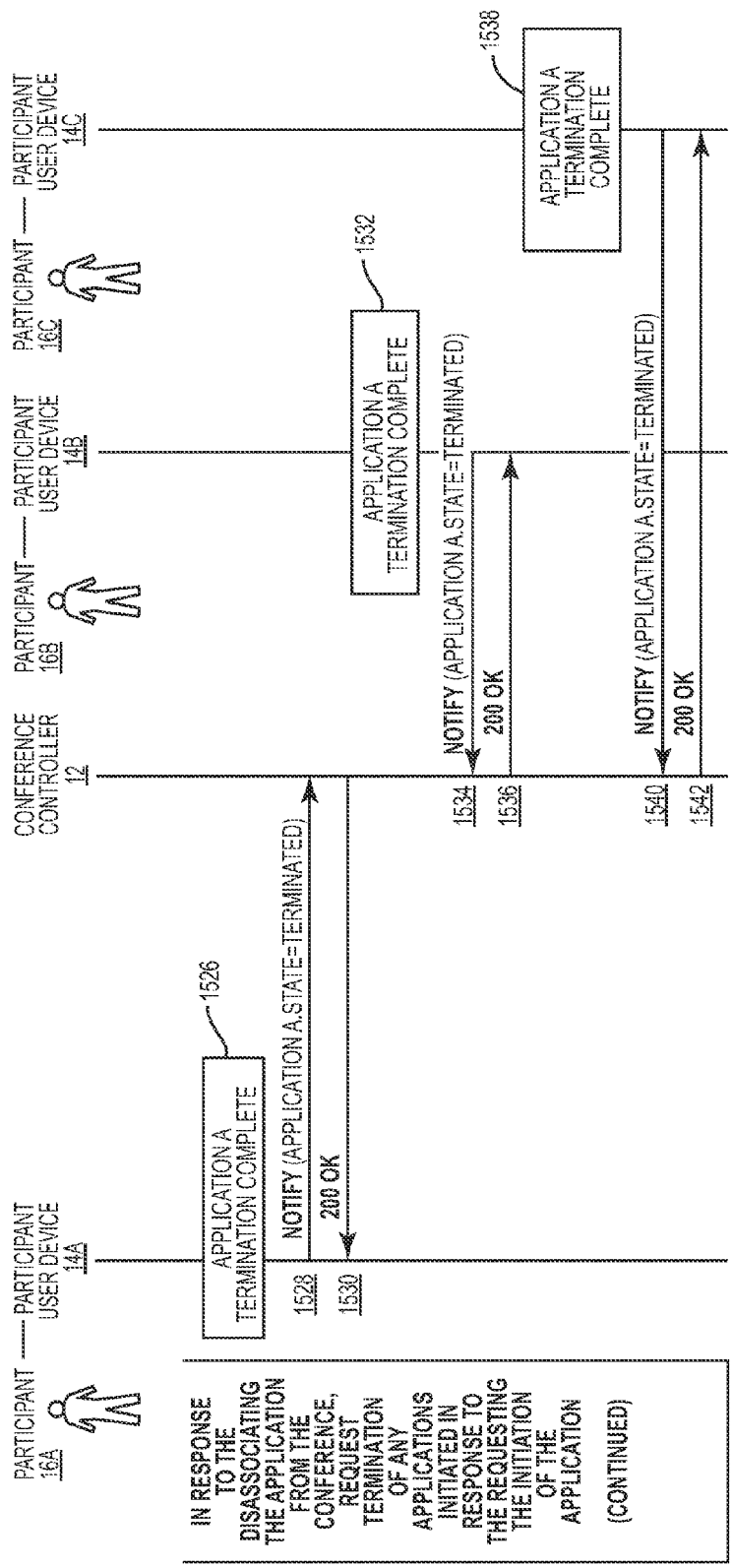

FIGS. 15A and 15B provide a method 1500 depicting one embodiment for disassociating the application from the conference. One of skill in the art will appreciate other embodiments for disassociating the application from the conference that may be provided in accordance with this disclosure. In this embodiment, a participant 16A may manipulate a user interface 84 of the participant user device 14A to select and move an application identifier (for Application A) away from the first defined area 86 representing the first conference. As a non-limiting example, the application identifier may be moved away from the first defined area 86 associated with the first conference (step 1502). As a further non-limiting example, the first defined area 86 (FIG. 14) may be depicted as an image of a spotlight or as any other image on the user interface 84 of the participant user device 14A. Participant user device 14A may transmit a request to the conference controller 12 to assign an application (Application A) to the conference after the conference has been established (step 1504). Conference controller 12 may positively acknowledge the request (step 1506). Conference controller 12 may disassociate the application (Application A) form the conference (step 1507). In response to the disassociating the application (Application A) from the conference, conference controller 12 may request termination of any instances of the application (Application A) initiated in response to the requesting initiation of the application (Application A) (steps 1508, 1514, and 1520). The requested terminations may be transmitted concurrently. In response, the participant user devices 14 (e.g., 14A, 14B, 14C) may positively acknowledge the request from the conference controller 12 (steps 1510, 1516, and 1522, respectively) and terminate the application (Application A) (steps 1512, 1518, and 1524, respectively).

Referring now to FIG. 15B, upon completion of the termination of the application (Application A) (steps 1526, 1532, and 1538), the participant user devices 14A, 14B, 14C in the conference may notify the conference controller 12 that the applications have been terminated (steps 1528, 1534, and 1540, respectively). The conference controller 12 may acknowledge these notifications (steps 1530, 1536, and 1542, respectively). In this manner, an application may be disassociated from the conference. Further, in response to disassociating the application from the conference, conference controller 12 may request termination of any instances of the application initiated in response to the request initiation of the application.

In response to receiving a notification that an application (Application A) for a participant user device 14 has terminated, conference controller 12 may also transmit a notification to licensing server 80. The notification transmitted by conference controller 12 to the licensing server 80 may indicate that the application (Application A) for the participant user device 14 has terminated. This may allow the licensing server 80 to become aware and maintain awareness of the number of concurrent licenses that are in use for a conference.

Figure 16:
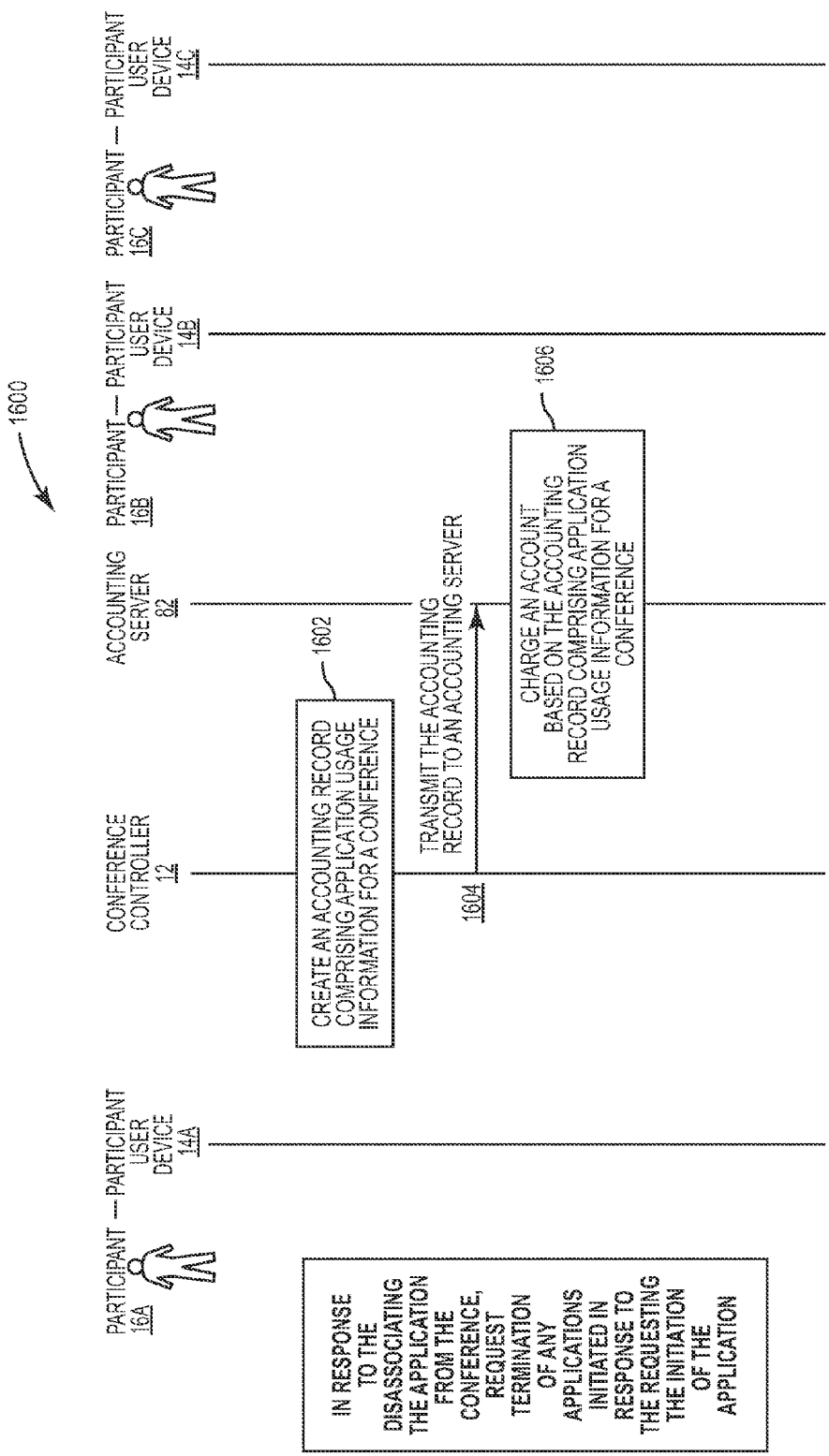
FIG. 16 is an exemplary message flow diagram depicting an exemplary method 1600 according to FIGS. 15A and 15B, further comprising creating an accounting record comprising application usage information for the conference.

Embodiments provided herein may also create and transmit at least one accounting record comprising application usage information for an application assigned to a conference. FIG. 16 illustrates a method 1600 depicting one such embodiment. In response to the disassociating the application from the conference, at least one such accounting record may be created and transmitted. As a non-limiting example, the accounting record may be transmitted from the conference controller 12 to an accounting server 82. However, such an accounting record may also be created and transmitted from a participant user device 14 in the conference to the accounting server 82. As depicted in FIG. 16, an accounting record is created (step 1602). The accounting record comprises application usage information for a conference application assigned to the conference (step 1602). The accounting record may be transmitted from the conference controller 12 to the accounting server 82 (step 1604). The accounting server 82 may be configured to receive at least one accounting record comprising application usage information for conference applications (step 1604).

Various usage information about the use of conference applications may be provided. In this regard in one embodiment, the at least one accounting record may include a timestamp indicating when an application instance was started for at least one participant user device 14 in the conference. The at least one accounting record may include a timestamp indicating when the application instance was terminated for the at least one participant user device in the conference.

The at least one accounting record may include a duration of usage of the application on the at least one participant user device 14 in the conference. The at least one accounting record may include a duration of usage of the application by at least one participant 14 in the conference. The at least one accounting record may include a duration of usage of the application 58 by all participants 16 in the conference.

The at least one accounting record may include an amount of network data transmitted by the application instance started for the at least one participant user device 14 in the conference. The at least one accounting record may include an amount of network data received by the application instance started for the at least one participant user device 14 in the conference.

The at least one accounting record may include a number of messages transmitted by the application instanced started for the at least one participant user device 14 in the conference. The at least one accounting record may include a number of messages received by an application instance started for the at least one participant user device 14 in the conference.

The at least one accounting record may include a maximum number of concurrent participants in the conference. The at least one accounting record may include a maximum number of concurrent application instances that were concurrently used for the plurality of participant user devices in the conference.

In one embodiment, the conference controller 12 may communicate with the accounting server 72 using a RADIUS protocol and/or a DIAMETER protocol. One of skill in the art will appreciate other protocols that the conference controller 12 may use to communicate with the accounting server 72 in accordance with this disclosure.

The accounting server 72 may charge an account based on a participant 16 or other chargeable entity based on the accounting record comprising the application usage information for the conference (step 1606). Thereafter, the participant 16 or another billable entity may be invoiced or billed for the usage of the conference application based on the application usage information for the conference.

Figure 17A:
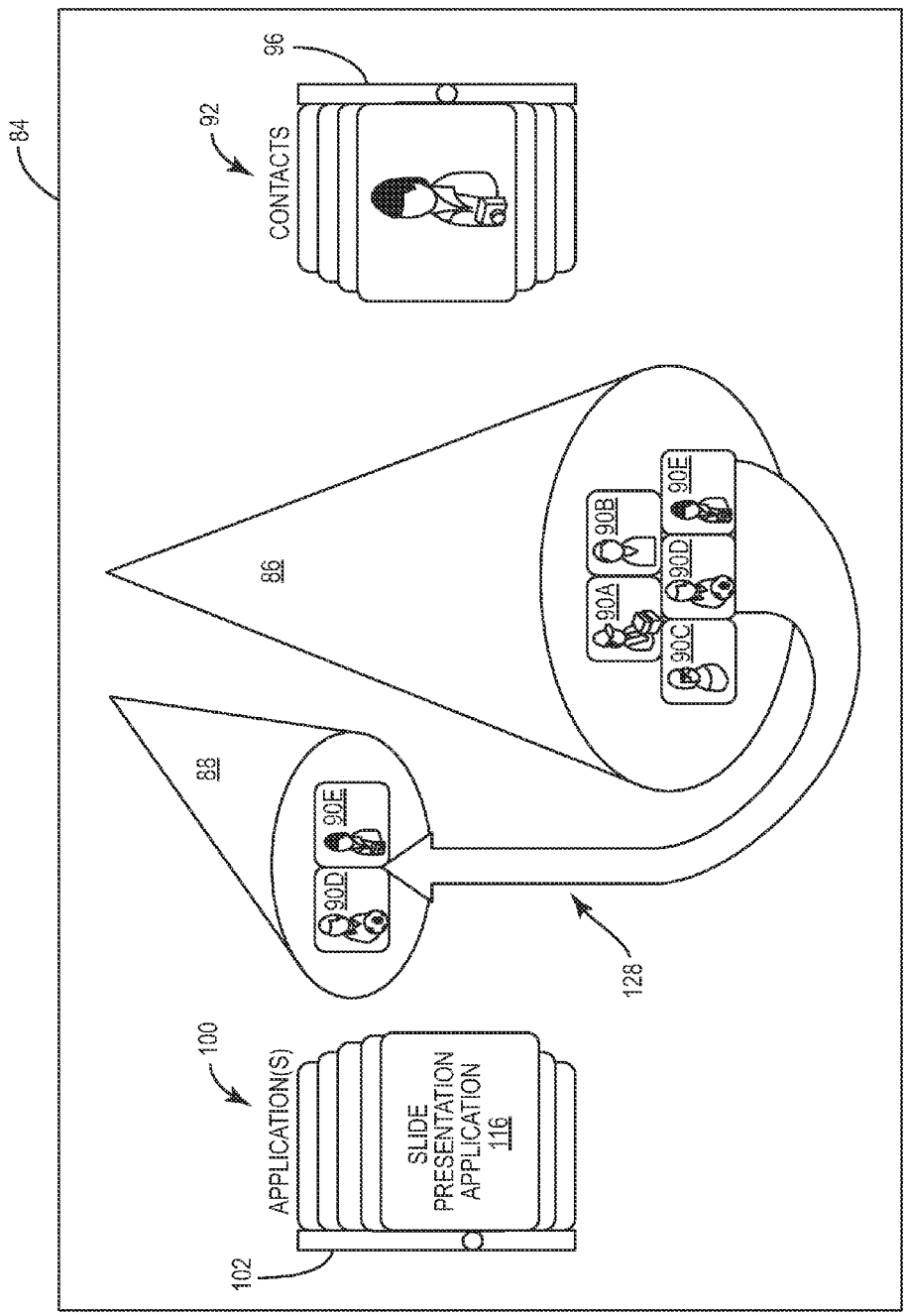
FIG. 17A illustrates the exemplary user interface of FIGS. 2A, 2B, 12, 13, and 14, and a user interface manipulation to create a second conference from a proper subset of the participants of the conference.

Any of the embodiments herein disclosed may also be provided for a second conference. As a non-limiting example, a user interface 84 of a participant user device 14 may provide a second defined area 88 representing the second conference, and the user manipulations herein discussed may also be provided for the second conference associated with the second defined area 88 of the user interface 84. FIG. 17A provides one such embodiment. FIG. 17A depicts a second defined area 88 associated with a second conference. The second conference may also be referred to as a "sidebar" or "sidebar conference." Participants 16 may be assigned to the second conference by dragging and dropping contacts from the contact list 92 to the second defined area 88. Alternatively, as depicted in FIG. 17A, a proper subset of participant icons 90 representing participants 16 may be dragged and dropped from the first defined area 86 associated with the first conference to a second define area 88 associated with the second conference. The dragging and dropping of the participant icons 90 may be accomplished via a user interface manipulation 128 of the user interface 84 of the participant user device 14A.

Figure 17B:
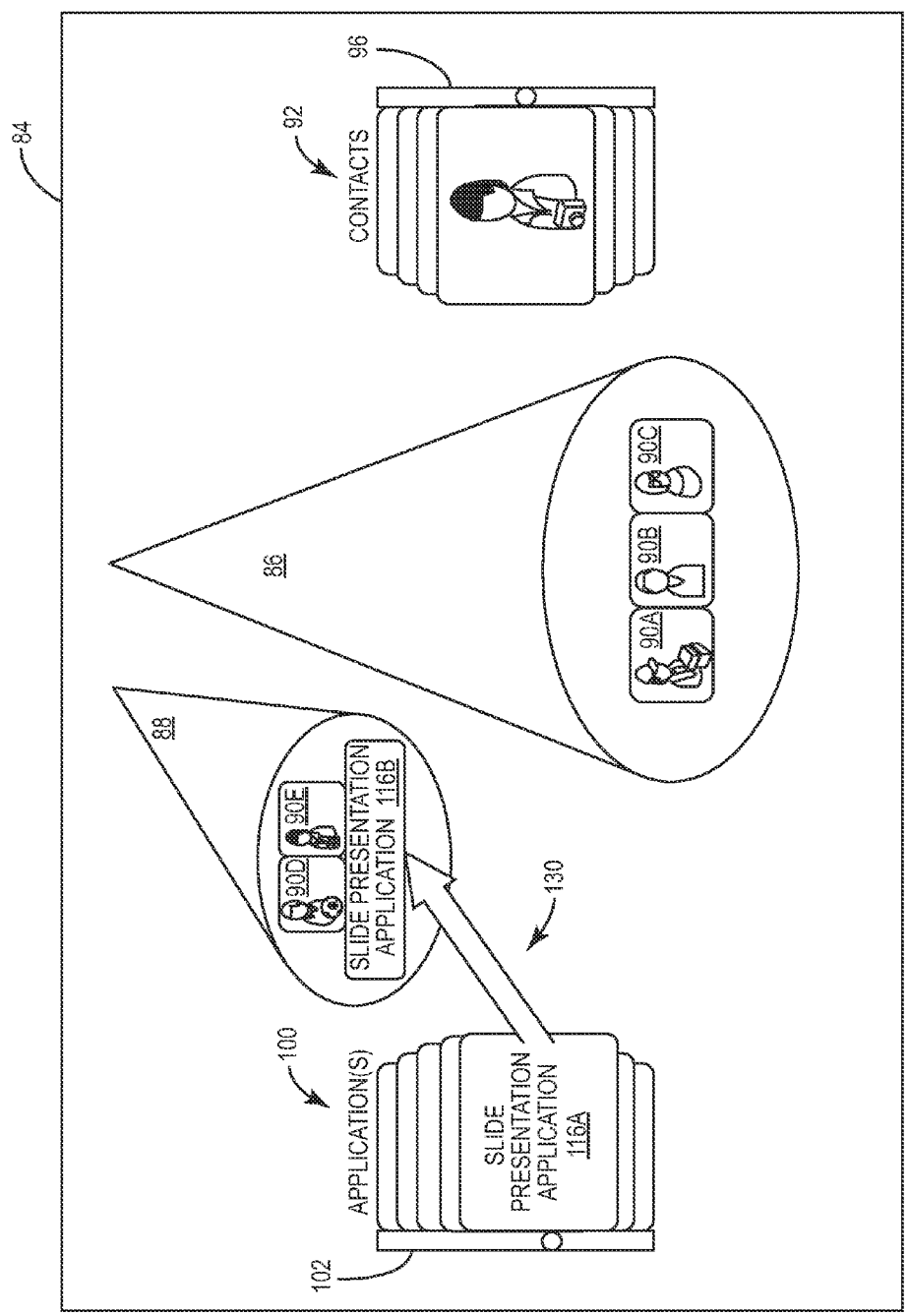
FIG. 17B illustrates the exemplary user interface of FIG. 17A, and a user interface manipulation to associate a second application with the second conference.

A second application may also be assigned to the second conference. FIG. 17B provides one such embodiment. As depicted in FIG. 17B, a slide presentation application 116 may be assigned to a second conference associated with a second defined area 88 of the user interface 84 of the participant user device 14A. As a non-limiting example, a user manipulation 130 of the user interface 84 may be provided to drag and drop an icon representing the slide presentation application 116A to the second defined area 88 (for example, as shown to by application icon 116B). This user interface manipulation 130 will result in the participant user device 14A transmitting a request to conference controller 12.

Similar message flows as herein previously discussed will thereafter occur for the second conference, in accordance with method 300 and other embodiments herein disclosed. In this manner, a second conference including a second plurality of participant user devices 14 represented by second participant identifiers (90D, 90E) may be established. A request for assigning a second application to the second conference may be received from the participant user device 14 by the conference controller 12. Conference controller 12 may assign the second application 116 to the second conference. In response to the assigning the second application 116 represented by icon 116A to the second conference, conference controller 12 may request an initiation of the second application 116 for use on each of the second plurality of participant user devices 14 (associated with the second plurality of icons 90D, 90E) in the second conference.

As previously discussed with regards to FIG. 17A, the second plurality of participant user devices 14 associated with the second conference may be a proper subset of the plurality of the participant user devices 14 associated with the first conference associated with the first defined area 86. As depicted in FIG. 17B, a participant user device 14A may implicitly and concurrently be a member of both the first conference associated with the first defined area 86 and the second conference associated with the second defined area 88.

Alternatively, participant 16A may only be a member of one of the plurality of conferences. To select the conference for active membership, the participant 16A may provide a user interface manipulation to position the active conference provided in a larger or center portion of the user interface 84, such as the position occupied by the first defined area 86 associated with the first conference in FIG. 17B.

In one embodiment, conference controller 12 may be provided as a standalone device. In some embodiments, the conference controller 12 may also be provided as a component of another device herein discussed. As a non-limiting example, conference controller 12 may also be provided as a component of a participant user device 14, a web server 62, a virtualization server 66, an application server 72, a storage device 74, a licensing server 80, and/or an accounting server 82.

Figure 18:
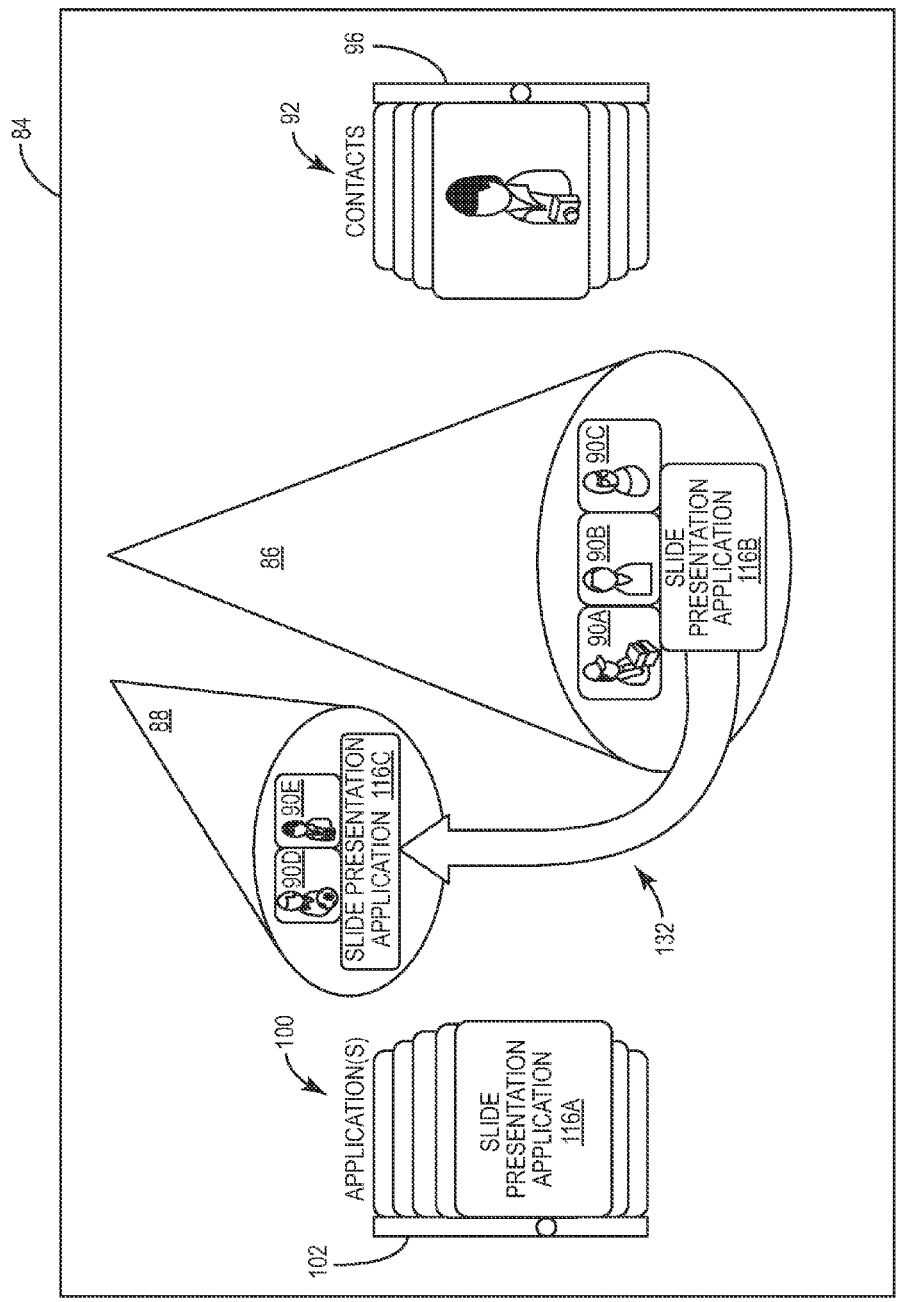
FIG. 18 illustrates the exemplary user interface of FIG. 17A, and a user interface manipulation to disassociate an application from the first conference and associate the application with the second conference.

Referring now to FIG. 18, an application 58 (e.g. slide application 116) may be reassigned from a first conference to a second conference. Reassigning the application from the first conference to the second conference may comprise disassociating the application 58 from the first conference and associating the application 58 with the second conference. In one embodiment, reassigning the application from the first conference to the second conference may comprise establishing a second conference that includes a second plurality of participant user devices. A request from a participant user device 14 to reassign the application to the second conference may be received by the conference controller 12. In response to receiving the request from the participant user device to reassign the application to the second conference, an initiation of the second application for use on each of the second plurality of participant user devices in the second conference may be requested. The application may be disassociated from the first conference. The termination of any instances of the application for any participant user devices not included in the second conference may be requested.

In this regard, FIG. 18 depicts the user interface 84 of FIG. 17A. FIG. 18 also depicts a first defined area 86 associated with a first conference and a second defined area 88 associated with a second conference. A first plurality of participants (90A, 90B, 90C) is assigned to the first conference. A second plurality of participants (90D, 90E) is assigned to the second conference. Slide presentation application 116 may be reassigned from the first conference representing the first defined area 86 to the second conference representing the second defined area 88 by a user interface manipulation 132. The user interface manipulation 132 may drag and drop the icon 116B for the slide presentation application 116 from the first defined area 86 of the first conference to the second defined area 88 of the second conference. As a non-limiting example, slide presentation application icon 116B may be dragged and dropped away from the first defined area 86 to a position indicated by slide presentation application icon 116C in the second defined area 88. As a result of this user interface manipulation 132, a participant user device 14 (e.g. 14A) will transmit a request to the conference controller to reassign the application 116 to the second conference representing the second defined area 88. In response to receiving the request from the participant user device 14, conference controller 12 will reassign application 116 to the second conference. As a result, conference controller 12 may request an initiation of the second application for use on each of the second plurality of participant user devices 14 in the second conference (e.g. participant user devices 14D and 14E associated with participants 16D and 16E represented by participant icons 90D and 90E). Conference controller 12 will disassociate the application 116 from the first conference. As a result, conference controller 12 may request termination of any instances of the application 116 for any participant user devices 14 (e.g., participant user devices 14A, 14B, 14C associated with participants 16A, 16B, 16C represented by participant icons 90A, 90B, 90C) not included in the second conference.

In continuing reference to FIG. 18, as a non-limiting example, exemplary messages 1504-1542 previously discussed in relation to FIGS. 15A and 15B may be used to disassociate application 116 from the first conference associated with the first defined area 86. Other embodiments herein discussed may also be used to provide the disassociation of the application 116 from the first conference. As a non-limiting example, exemplary messages 490-528 previously discussed in relation to FIG. 4D may also be used to associate application 116 with the second conference. Other embodiments herein discussed may also be used to provide the association of the application 116 with the second conference. This disassociation of the application 116 from the first conference and association of the application 116 with the second conference may occur concurrently. Data of the application 116 executing for the first conference may be preserved for use by the second conference. Accordingly, an application 116 disassociated from a first conference may continue to persist, even after being disassociated from the first conference. The application 116 may continue to be provided, though display and control of the application 116 shifts from participants of the first conference to participants of the second conference.

Figure 19:
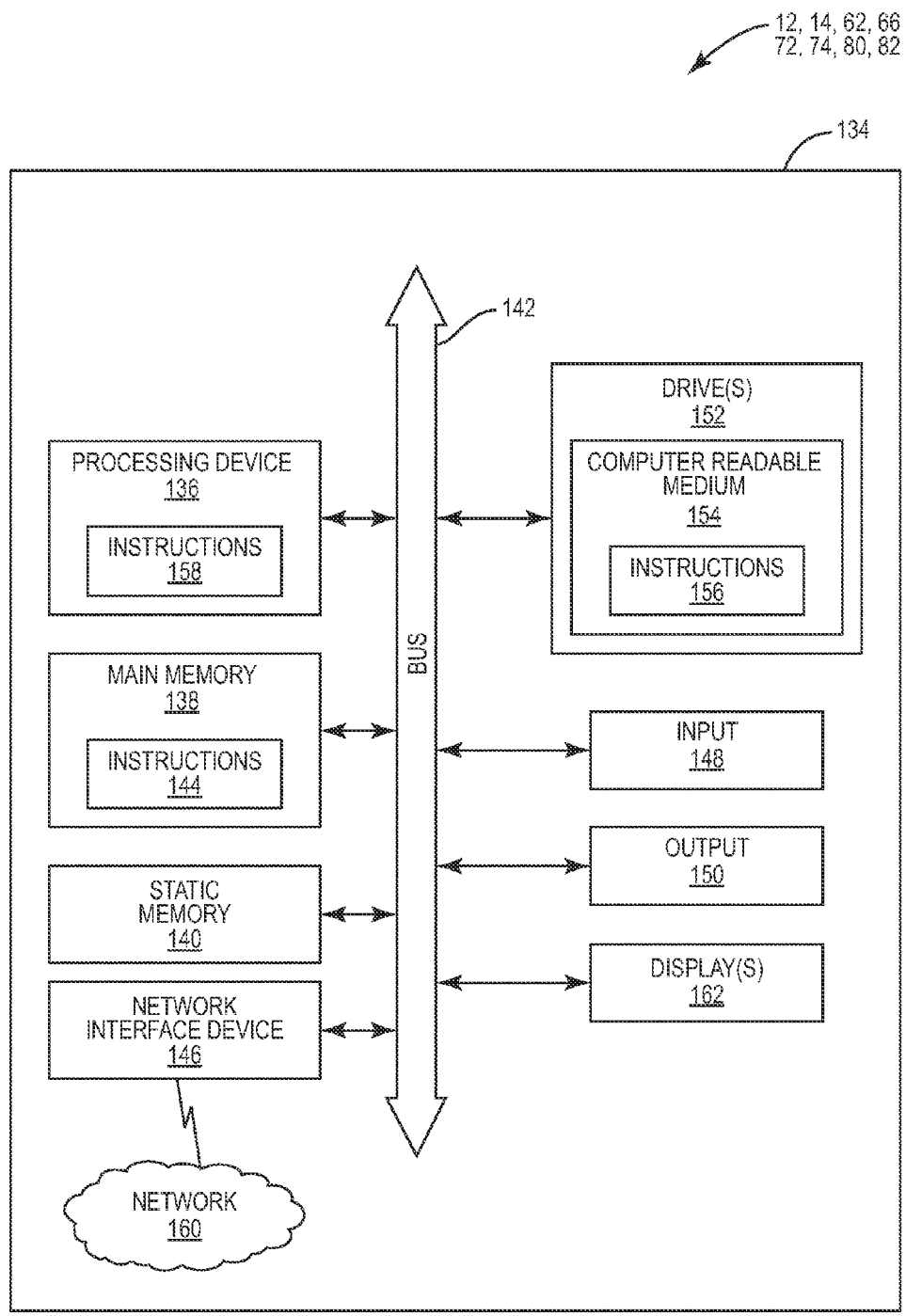
FIG. 19 is a schematic diagram representation of an exemplary device in the system of FIG. 1, for implementing a conference controller, a participant user device, a web server, a virtualization server, an application server, a storage device, an accounting server, and/or a licensing server, and configured to execute instructions from an exemplary computer-readable medium to perform the functions described herein.

FIG. 19 provides a schematic diagram representation of conference controller 12 in the exemplary form of an exemplary computer system 134 adapted to execute instructions from an exemplary computer-readable medium to perform the functions described herein. In this regard, the conference controller 12 may comprise the computer system 134 within which a set of instructions for causing the conference controller 12 to perform any one or more of the methodologies discussed herein may be executed. The conference controller 12 may be connected (e.g., networked) to other machines in a local area network (LAN), an intranet, an extranet, or the Internet. The conference controller 12 may operate in a client-server network environment, or as a peer machine in a peer-to-peer (or distributed) network environment. While only a single conference controller 12 is illustrated, the terms "controller" and "server" shall also be taken to include any collection of machines that individually or jointly execute a set (or multiple sets) of instructions to perform any one or more of the methodologies discussed herein. The conference controller 12 may be a server, a personal computer, a desktop computer, a laptop computer, a personal digital assistant (PDA), a computing pad, a mobile device, or any other device and may represent, for example, a server or a user's computer.

The exemplary computer system 134 includes a processing device or processor 136, a main memory 138 (e.g., read-only memory (ROM), flash memory, dynamic random access memory (DRAM) such as synchronous DRAM (SDRAM), etc.), and a static memory 140 (e.g., flash memory, static random access memory (SRAM), etc.), which may communicate with each other via a bus 142. Alternatively, the processing device 136 may be connected to the main memory 138 and/or static memory 140 directly or via some other connectivity means.

The processing device 136 represents one or more processing devices such as a microprocessor, central processing unit, or the like. More particularly, the processing device 136 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 136 is configured to execute processing logic in instructions 144 and/or cached instructions 158 for performing the operations and steps discussed herein.

The computer system 134 may further include a communications interface in the form of a network interface device 146. It also may or may not include an input 148 to receive input and selections to be communicated to the computer system 134 when executing instructions. It also may or may not include an output 150, including but not limited to display(s) 162, a video display unit (e.g., a liquid crystal display (LCD) or a cathode ray tube (CRT)), an alphanumeric input device (e.g., a keyboard), a cursor control device (e.g., a mouse), and/or a touch screen device (e.g., a tablet input device or screen).

The computer system 134 may or may not include a data storage device that includes using drive(s) 152 to store functions herein described in computer-readable medium 154 on which is stored one or more sets of instructions 156 (e.g., software) embodying any one or more of the methodologies or functions described herein. The functions can include the method 300 or other functions of the conference controller 12, as non-limiting examples. The instructions 156 may also reside, completely or at least partially, within the main memory 138 and/or within the processing device 136 during execution thereof by the computer system 134, the main memory 138 and the processing device 136 also constituting machine-accessible storage media. The instructions 138, 144, and/or 156 may further be transmitted or received over a network 160 via the network interface device 146. The network 160 can be an intra-network or an inter-network.

While the computer-readable medium 154 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium"

shall accordingly be taken to include, but not be limited to, solid-state memories, optical and magnetic media, and carrier wave signals.

As also depicted in FIG. 19, a participant user device 14, web server 62, virtualization server 66, application server 72, storage device 74, licensing server 80, and accounting server 82 may also each be provided in the form of an exemplary computer system 134.

The devices, systems, methods, and computer-readable mediums initiating one or more applications for participants of a conference according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, an internet phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), an field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computer-implemented method for concurrently initiating an application for participants of a conference, comprising:

establishing a conference that includes a plurality of participant user devices;

receiving, by a conference controller, a request from a participant user device in the conference to assign an application to the conference after the conference has been established;

assigning the application to the conference; and in response to assigning the application to the conference, concurrently requesting initiation of a plurality of executable instances of the application on the plurality of participant user devices in the conference;

wherein:

concurrently requesting initiation of the application comprises:

determining, by the conference controller, whether the application is available on one or more of the plurality of participant user devices;

responsive to determining that the application is not available on the one or more of the plurality of participant user devices, providing at least one portion of the application to the one or more of the plurality of participant user devices; and each of the executable instances of the application is independently controlled by one of the participant user devices and comprises one of an instance of the application executing on a virtualization server or a standalone instance of the application executing directly on the one or more of the plurality of participant user devices.

2. The method of claim 1, wherein concurrently requesting initiation of the application on the plurality of participant user devices in the conference comprises concurrently requesting initiation of a separate executable instance of the application for each of the plurality of participant user devices in the conference.

3. The method of claim 2, wherein each separate executable instance of the application is only controllable on a participant user device among the plurality of participant user devices for which it was initiated.

4. The method of claim 2, wherein each separate executable instance of the application communicates through an application programming interface (API) to each of other executable instances of the application on other participant user devices among the plurality of participant user devices in the conference.

5. The method of claim 1, wherein concurrently requesting initiation of the application on each of the plurality of participant user devices in the conference comprises concurrently transmitting a uniform resource locator (URL) for initiating the application to each of the plurality of participant user devices in the conference.

6. The method of claim 5, further comprising providing, based on the uniform resource locator (URL), the application for display and control within a web browser on at least one participant user device among the plurality of participant user devices in the conference.

7. The method of claim 1, wherein concurrently requesting initiation of the application on each of the plurality of participant user devices in the conference comprises concurrently requesting initiation of at least one executable instance of the application on at least one virtualization server for each of the plurality of participant user devices in the conference, each executable instance of the application configured to provide display and control of the executable instance of the application to a different participant user device in the conference.

8. The method of claim 1, wherein concurrently requesting initiation of the application on each of the plurality of participant user devices in the conference comprises concurrently initiating a client application on each of the plurality of participant user devices in the conference, each client application configured to communicate with at least one server application on at least one server.

9. The method of claim 1, wherein concurrently requesting initiation of the application on each of the plurality of participant user devices in the conference comprises concurrently initiating the executable instance of the application on each of the plurality of participant user devices in the conference.

10. The method of claim 1, further comprising:
determining whether each participant user device in the conference is licensed to execute the application; and
in response to determining that at least one participant user device is not licensed to execute the application, requesting a license for the at least one participant user device in the conference for a duration of the conference.

11. The method of claim 1, further comprising providing a license to execute the application for at least one participant user device in the conference for a duration of the conference.

12. The method of claim 1, further comprising initiating the application on each of the plurality of participant user devices in the conference.

13. The method of claim 1, further comprising creating at least one accounting record comprising application usage information, wherein the application usage information comprises at least one from the group consisting of:
a timestamp indicating when the executable instance of the application was started for at least one participant user device in the conference;
a timestamp indicating when the executable instance of the application was terminated for the at least one participant user device in the conference;
a duration of usage of the application on the at least one participant user device in the conference;
a duration of usage of the application by at least one participant in the conference;
a duration of usage of the application by all participants in the conference;
an amount of network data transmitted by the executable instance of the application started for the at least one participant user device in the conference;
an amount of network data received by the executable instance of the application started for the at least one participant user device in the conference;
a number of messages transmitted by the executable instance of the application started for the at least one participant user device in the conference;
a number of messages received by the executable instance of the application started for the at least one participant user device in the conference;
a maximum number of concurrent participants in the conference; and
a maximum number of concurrent executable instance of the application that were concurrently used for the plurality of participant user devices in the conference.

14. The method of claim 1, wherein the conference is at least one from the group consisting of an audio conference, a video conference, and a text messaging conference.

15. The method of claim 1, further comprising disassociating the application from the conference.

16. The method of claim 15, further comprising in response to disassociating the application from the conference, requesting termination of any executable instances of the application initiated in response to the requesting initiation of the application.

17. The method of claim 1, further comprising:
establishing a second conference that includes a second plurality of participant user devices;
receiving a request from the participant user device to assign a second application to the second conference;
assigning the second application to the second conference; and
in response to the assigning the second application to the second conference, requesting initiation of the second application on each of the second plurality of participant user devices in the second conference.

18. The method of claim 1, further comprising:
reassigning the application from the conference to a second conference.

19. The method of 18, wherein reassigning the application from the conference to the second conference comprises:

establishing the second conference that includes a second plurality of participant user devices;

receiving a request from the participant user device to reassign the application to the second conference; and in response to receiving the request from the participant user device to reassign the application to the second conference:

requesting initiation of the second application on each of the second plurality of participant user devices in the second conference;

disassociating the application from the conference; and requesting termination of any executable instances of the application for any participant user devices not included in the second conference.

20. An apparatus for concurrently initiating an application for participants of a conference, comprising:

a communications interface adapted to interface with a network; and a control system coupled to the communications interface and configured to:

establish a conference that includes a plurality of participant user devices;

receive a request from a participant user device in the conference to assign an application to the conference after the conference has been established;

assign the application to the conference; and in response to the assigning the application to the conference, concurrently request initiation of a plurality of executable instances of the application on the plurality of participant user devices in the conference by:

determining whether the application is available on one or more of the plurality of participant user devices; and responsive to determining that the application is not available on the one or more of the plurality of participant user devices, providing at least one portion of the application to the one or more of the plurality of participant user devices; wherein each of the executable instances of the application is independently controllable by one of the participant user devices and comprises one of an instance of the application executing on a virtualization server or a standalone instance of the application executing directly on the one or more of the plurality of participant user devices.

21. A non-transitory computer-readable medium storing one or more programs, the one or more programs comprising instructions, which when executed by an electronic device cause the electronic device to implement a method for concurrently initiating an application for participants of a conference, comprising:

establishing, by a computing device comprising a processor, a conference that includes a plurality of participant user devices;

receiving a request from a participant user device in the conference to assign an application to the conference after the conference has been established;

assigning the application to the conference; and in response to assigning the application to the conference, concurrently requesting initiation of a plurality of executable instances the application on the plurality of participant user devices in the conference;

wherein:

concurrently requesting initiation of the application comprises determining, by the computing device, whether the application is available on one or more of the plurality of participant user devices;

responsive to determining that the application is not available on the one or more of the plurality of participant user devices, providing at least one portion of the application to the one or more of the plurality of participant user devices; and each of the executable instances of the application is independently controlled by one of the participant user devices and comprises one of an instance of the application executing on a virtualization server or a standalone instance of the application executing directly on the one or more of the plurality of participant user devices.

* * * * *